United States Patent
Zohar et al.

(10) Patent No.: US 12,192,269 B2
(45) Date of Patent: Jan. 7, 2025

(54) RESILIENT AND DECENTRALIZED MICROSERVICE ARCHITECTURE

(71) Applicant: Gobaru Limited, Grand Cayman (KY)

(72) Inventors: Ofir Zohar, Tel Aviv (IL); Gal Zuckerman, Holon (IL); Yaron Revah, Tel Aviv (IL); Matan Arazi, Santa Monica, CA (US)

(73) Assignee: Gobaru Limited, Grand Cayman (KY)

( * ) Notice: Subject to any disclaimer, the term of this patent is extended or adjusted under 35 U.S.C. 154(b) by 0 days.

(21) Appl. No.: 18/494,028

(22) Filed: Oct. 25, 2023

(65) Prior Publication Data
US 2024/0163326 A1    May 16, 2024

Related U.S. Application Data

(60) Provisional application No. 63/383,103, filed on Nov. 10, 2022.

(51) Int. Cl.
*G06F 15/16* (2006.01)
*G06F 9/54* (2006.01)
(Continued)

(52) U.S. Cl.
CPC ............ *H04L 67/10* (2013.01); *G06F 9/547* (2013.01); *H04L 9/50* (2022.05)

(58) Field of Classification Search
None
See application file for complete search history.

(56) References Cited

U.S. PATENT DOCUMENTS 10,534,674 B1 *  1/2020  Karmarkar .......... G06F 11/1471
2005/0193222 A1 *  9/2005  Greene ................. H04L 63/102
726/5

(Continued)

OTHER PUBLICATIONS

EPO, extended European search report by the European Patent Office for EP Application No. 23206626.6 dated Mar. 13, 2024.
(Continued)

*Primary Examiner* — Phuoc H Nguyen
(74) *Attorney, Agent, or Firm* — Intrinsic Law Corp.

(57) ABSTRACT

A redundant decentralized microservice architecture, in which each of at least selected some of the microservices is executed multiple times by multiple microservice computing nodes acting as mirror sites after reaching a distributed consensus regarding the correct way/order in which the microservices are to be executed. Clusters of redundant microservice computing nodes work in intra-cluster consensus when responding to remote procedure calls (RPCs) by activating the associated microservices multiple times, and then sending multiple RPCs to additional clusters of redundant microservice computing nodes. The process may repeat as a chain of inter-cluster microservice activation events that facilitate execution of multiple different microservices together constituting a single operation that is executed resiliently even under the most detrimental fault conditions, thus achieving fault tolerant computing that combines multiple mirror sites, multiple operators, consensus mechanisms and cryptography to achieve censorship resistance, decentralized operation and Byzantine Fault Tolerant computing utilizing microservices.

27 Claims, 21 Drawing Sheets

(51) Int. Cl.
*H04L 9/00* (2022.01)
*H04L 67/10* (2022.01)

(56) References Cited

U.S. PATENT DOCUMENTS

| | | | |
|---|---|---|---|
| 2007/0112574 A1* | 5/2007 | Greene | H04W 12/086 |
| | | | 709/201 |
| 2020/0045139 A1 | 2/2020 | Gupta et al. | |
| 2020/0374113 A1* | 11/2020 | Noam | H04L 9/0637 |
| 2022/0038554 A1* | 2/2022 | Merwaday | H04L 45/64 |
| 2022/0201103 A1* | 6/2022 | Keppel | H04L 49/9068 |
| 2022/0342718 A1 | 10/2022 | Iqbal et al. | |
| 2023/0230091 A1* | 7/2023 | Vaughn | G06Q 20/4016 |
| | | | 705/71 |
| 2023/0396647 A1 | 12/2023 | Zohar et al. | |
| 2024/0241978 A1* | 7/2024 | Chopra | G06F 21/6218 |

OTHER PUBLICATIONS

Bronson et al. "TAO: Facebook's Distributed Data Store for the Social Graph", Facebook, Inc. USENIX Association, 2013 USENIX Annual Technical Conference (USENIX ATC '13), pp. 49-60.

* cited by examiner

RESILIENT AND DECENTRALIZED MICROSERVICE ARCHITECTURE

CROSS REFERENCE TO RELATED APPLICATIONS

This application claims priority to U.S. Provisional Patent Application No. 63/383,103 entitled "Resilient and Decentralized Microservice Architecture", filed on Nov. 10, 2022.

TECHNICAL FIELD

This application relates generally to resilient computing and state transition systems and methods.

BACKGROUND

Recent advancements in computer science and algorithms, such as the combining of various blockchain data structures and cryptographic techniques, have given rise to resilient state transition systems that are at the heart of emerging new concepts such as cryptocurrency, smart contracts, and decentralized autonomous organizations. These new concepts all share numerous inherent benefits, including true decentralized operation eliminating single points of failure, autonomous execution bypassing external intervention, and consensus based distributed processing making malicious attacks almost impossible to carry out, to name a few. It would be beneficial to migrate and utilize the advantageous effects of these concepts and technologies into the realm of general computing, thereby making them work for the "greater good". If such migration could be accomplished, then many modern problems plaguing Internet-based services and computers in general could be resolved or at least mitigated. However, current systems suffer from several deficiencies, which make them poorly adapted to scaling, inherently limited in bandwidth, largely incapable of latency critical applications, and therefore mostly unsuitable, in their present form, for general purpose, high-rate, high-bandwidth applications.

A microservice architecture is a distributed computer architecture that breaks an application into a collection of independent "simple" function-oriented services, communicating through existing networks using technology-agnostic protocols, and activating each other using remote procedure calls (RPC). Microservice architecture is the de-facto standard of backend systems servicing modern Internet-based applications. In a Byzantine Fault (BF) condition that may affect computing nodes running microservices, a node can inconsistently appear functioning/non-functioning to an observer, as a result of a malicious attack, a simple malfunction, or other conditions, and consequently jeopardize system integrity while disrupting correct execution of related applications. Methods and systems are required to transform existing microservice architecture into an architecture that is capable of both fault tolerance including Byzantine Fault Tolerance (BFT) and decentralized operation, which are critical for Web 3.0 applications such as cryptocurrency, smart contracts, decentralized social-networks/autonomous-organizations, and metaverses.

Web 3.0, also known as the decentralized web, is an evolution of the World Wide Web that aims to enable greater trust, privacy, and control for users by utilizing decentralized technologies such as blockchain, distributed storage, and peer-to-peer networking. One of the key benefits of web 3.0 is the potential to create more secure and trustworthy systems. By decentralizing data storage and processing, web 3.0 can reduce the risk of single points of failure, hacking, and data breaches that are common in centralized systems. Additionally, with the use of blockchain technology, web 3.0 can enable greater transparency and immutability in actions, which can further enhance security and trust in online interactions. Web 3.0 can enable greater privacy and control for users of social networks. With decentralized social networks, users can own their data and control who has access to it, which can help reduce the risk of data misuse and breaches. Additionally, decentralized social networks can enable more transparent and democratic governance, giving users a greater say in how the network operates. Web 3.0 can also enable more efficient and secure financial actions, e.g., by utilizing blockchain technology, inter-user actions are possible without the need for intermediaries, which can reduce action fees and increase action speed. Furthermore, web 3.0 can enable greater financial inclusion by providing access to financial services to individuals who are currently underserved by traditional financial systems. With decentralized marketplaces, buyers and sellers can transact directly with each other without the need for intermediaries, which can reduce action fees and increase trust between parties. Blockchain technology can enable more secure and transparent supply chain management, which can help reduce the risk of fraud and counterfeiting.

While the concept of web 3.0 promises many benefits, realizing it will require overcoming several challenges with current technologies. Current decentralized technologies such as blockchain face significant scalability limitations. As the number of users and actions on the network grows, the time and cost required for processing actions also increases. This can make it difficult to achieve the level of speed and efficiency needed to support widespread adoption. Web 3.0 relies on multiple decentralized technologies working together seamlessly. However, there is currently not much/inefficient standardization and potentially insecure interoperability between different decentralized technologies, making it difficult for them to work together effectively. Decentralized technologies can be complex and difficult for the average user to understand and navigate. Without a user-friendly interface and experience, it may be challenging to achieve widespread adoption of web 3.0 technologies. Decentralized systems require decentralized governance to ensure transparency and accountability. However, there are currently only partially established frameworks for decentralized governance, making it challenging to establish and maintain effective governance structures.

Relatedly, conventional implementations of web 3.0 have significant problems related to bandwidth and scale, with significant expense occurred in order to achieve high bandwidth and/or scalable systems. Such systems are ordinarily inefficient, requiring substantial amounts of computing resources and energy in order to achieve the concept of web 3.0.

Therefore, new technologies and concepts are needed to overcome these challenges and achieve the vision of web 3.0.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One embodiment (FIG. 3A, FIG. 3B, FIG. 3C, FIG. 3D) is a resilient microservice system, comprising: a plurality of microservice computing nodes; a first distributed computing sub-system comprising a respective combination of at least some of the microservice computing nodes; and a second distributed computing sub-system, comprising a respective different combination of at least some of the microservice computing nodes. In one embodiment, as a result of at least some procedure calls all conveying a same first message that were just made available in the first distributed computing sub-system, each of at least some of the nodes in the first distributed computing sub-system is configured to: execute, in conjunction with at least some of the other nodes of the first distributed computing sub-system, a consensus mechanism associated with the first message; process the first message; and provided that an agreement has been reached in conjunction with said consensus mechanism, send a remote procedure call (RPC) conveying a second message, which is consequent on said processing, to at least one of the nodes of the second distributed computing sub-system; so as to result in the second distributed computing sub-system receiving at least some of the RPCs conveying the same second message.

One embodiment (FIG. 4) is a method for achieving resiliency in execution of microservices, comprising: receiving an activation message for a first microservice; reaching an agreement, via a distributed consensus mechanism, among at least a majority of a first plurality of microservice computing nodes, regarding a correct reaction to the activation message; reacting, by each of at least some of the nodes, to the activation message, by at least executing the first microservice, so as to result in multiple redundant executions of the same first microservice; and pending said execution, sending, by each of at least some of the nodes to at least one node of a second plurality of microservice computing nodes, a remote procedure call (RPC) conveying an activation message for a second microservice, provided that the activation message for the second microservice complies with the correct reaction agreed upon via the distributed consensus mechanism, so as to result in multiple redundant PRCs all conveying the same activation message for the second microservice and received by multiple nodes in the second plurality.

BRIEF DESCRIPTION OF THE DRAWINGS

For a fuller understanding of the nature and advantages of the concepts disclosed herein, reference is made to the detailed description of embodiments and the accompanying drawings. The embodiments are herein described by way of example only, with reference to the accompanying drawings. No attempt is made to show structural details of the embodiments in more detail than is necessary for a fundamental understanding of the embodiments.

DETAILED DESCRIPTION

Figure 1A:
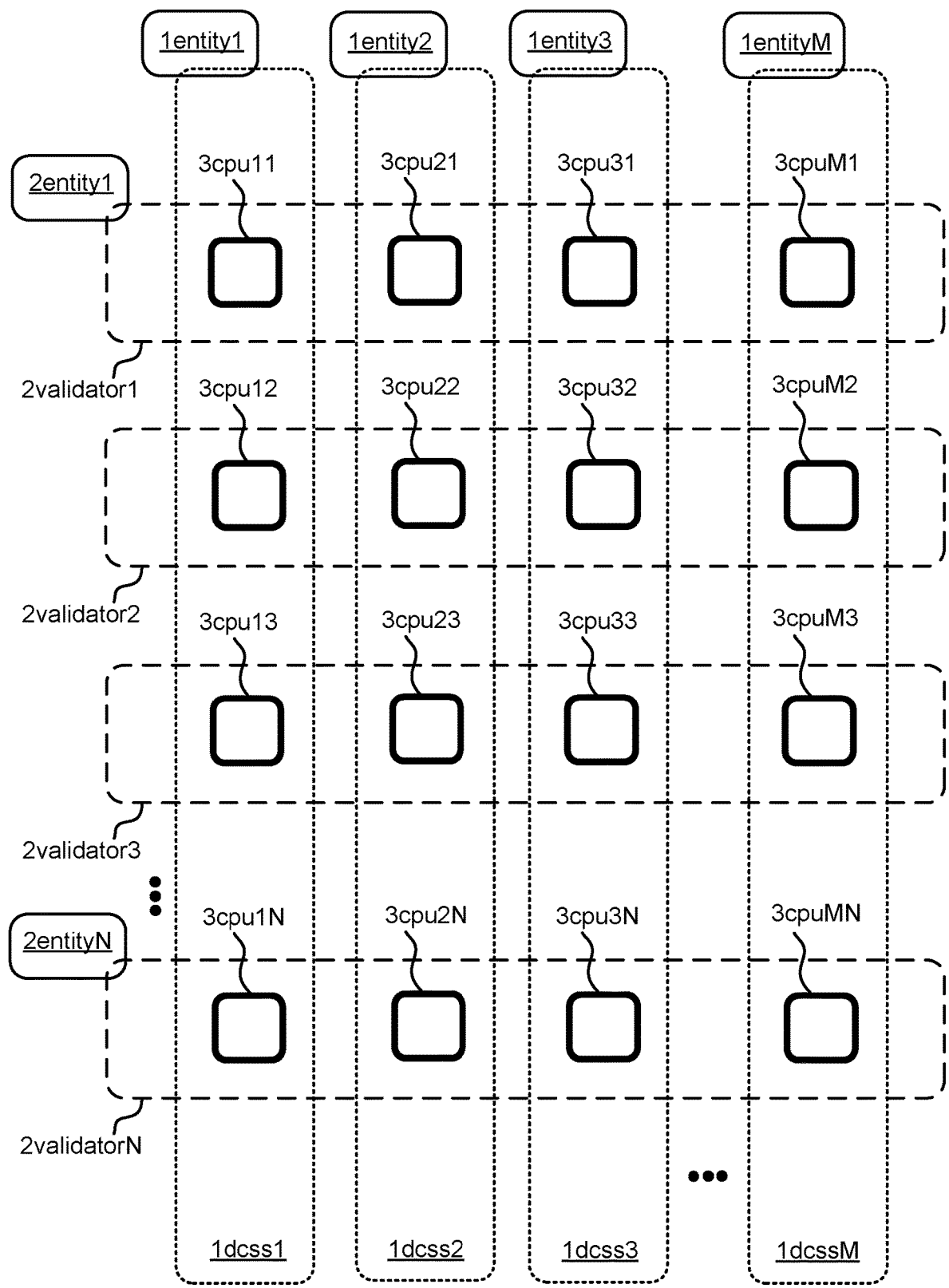
FIG. 1A illustrates a resilient high-bandwidth state-transition computer made in accordance with embodiments having several independent distributed computing sub-systems together forming a first system-level construct and further having several independent validator clusters together forming a second system-level construct.

FIG. 1A illustrates a resilient high-bandwidth state-transition computer made in accordance with embodiments having several independent distributed computing sub-systems $1dcss1$, $1dcss2$, $1dcss3$, $1dcssM$ together forming a first system-level construct and further having several independent validator clusters $2validator1$, $2validator2$, $2validator3$, $2validatorN$ together forming a second system-level construct.

In embodiments, each of the validator clusters includes several computing nodes. For example, cluster $2validator1$ includes the computing nodes $3cpu11$, $3cpu21$, $3cpu31$ and $3cpuM1$; cluster $2validator2$ includes the computing nodes $3cpu12$, $3cpu22$, $3cpu32$ and $3cpuM2$; cluster $2validator3$ includes the computing nodes $3cpu13$, $3cpu23$, $3cpu33$ and $3cpuM3$; and cluster $2validatorN$ includes the computing nodes $3cpu1N$, $3cpu2N$, $3cpu3N$ and $3cpuMN$. Each validator cluster is shown to have four computing nodes by way of example but may have additional or fewer computing nodes. In one example, each validator cluster has hundreds or thousands of computing nodes. Each of the computing nodes $3cpu$ may be or include a general-purpose processor, a central processing unit (CPU), a specialized processor such as a graphical processing unit (GPU), and/or an application specific integrated circuit (ASIC), and/or a neural processing unit (NPU), and/or a tensor processing unit (TPU), a computing core within a processor, a single processing element, and/or a distributed processing element, located in a single location or distributed across multiple locations. Each validator cluster may represent a respective logistical/operational entity $2entity$ such as a data center, several related data centers, a computing infrastructure located in a certain geographical area, a high-performance computing (HPC) infrastructure, a super computer, a cluster of computers interconnected using dedicated communication networks, multiple general-purpose computers connected to the Internet in different locations, and/or a massively parallel computer.

In embodiments, the validator clusters are separated from each other in order to keep them running independently. For example, cluster $2validator1$ may be a certain data center located in a certain continent/country/city and owned by a certain ownership entity $2entity1$, while cluster $2validatorN$ may be a different data center located in a different continent/country/city and owned by a different ownership entity $2entityN$, so that the operation of cluster $2validator1$ is kept independent of the operation of cluster $2validatorN$, and therefore cluster $2validatorN$ may continue normal operation even if/when cluster $2validator1$ experiences a catastrophic event such as loss of power, loss/denial of communication capabilities, physical kinetic damage, malicious cyber attack, detrimental human intervention, financial difficulty, and/or force of nature events.

In embodiments, the validator clusters may be proximate to each other. For example, cluster $2validator1$ may be part of a certain data center located in a certain continent/country/city and cluster $2validatorN$ may be another part of the same data center, or may be a different data center, location in the same continent/country/city as the data center of cluster $2validator1$.

In embodiments, the several computing nodes of the validator clusters may be separated from each other. For example, $3cpu11$ of $2validator1$ may be located in a certain data center located in a certain continent/country/city and $3cpuM1$ may be located in a different continent/country/city.

In embodiments, each of the distributed computing sub-systems includes several of the computing nodes that are spread across the validator clusters $2validator1$, $2validator2$, $2validator3$, $2validatorN$. For example, distributed computing sub-system $1dcss1$ includes the computing nodes $3cpu11$, $3cpu12$, $3cpu13$, $3cpu1N$; distributed computing sub-system $1dcss2$ includes the computing nodes $3cpu21$, $3cpu22$, $3cpu23$, $3cpu2N$; distributed computing sub-system $1dcss3$ includes the computing nodes $3cpu31$, $3cpu32$, $3cpu33$, $3cpu3N$; and distributed computing sub-system $1dcssM$ includes the computing nodes $3cpuM1$, $3cpuM2$, $3cpuM3$, $3cpuMN$. There are four distributed computing sub-systems depicted by way of example, but the system may include additional or fewer distributed computing sub-systems. For example, the system may include hundreds or thousands of distributed computing sub-systems.

In embodiments, each of distributed computing sub-systems $1dcss$ may represent a respective authorizing entity $1entity$ having the cryptographic authority to approve and/or permission actions that are associated with that entity. For example, distributed computing sub-system $1dcss1$ represents and services authorizing entity $1entity1$, $1dcss2$ represents and services authorizing entity $1entity2$, $1dcss3$ represents and services authorizing entity $1entity3$, and $1dcssM$ represents and services authorizing entity $1entityM$. An authorizing entity may be a person, an organization, or a process in possession of the cryptographic means to authorize actions in conjunction with the respective distributed computing sub-system, e.g., having access to a private key capable of producing a correct cryptographic signature to be approved and/or permissioned by the respective distributed computing sub-system. It is noted that although each of the distributed computing sub-systems is illustrated as having a unique set of computing nodes, it is not necessarily required, and it is possible for one of the computing nodes to service two different distributed computing sub-systems, e.g., computing node $3cpu22$ is illustrated as servicing only computing sub-system $1dcss2$, but it could also service computing sub-system $1dcss3$, e.g., by utilizing multi-threading and/or time division techniques and/or splitting computational resources within $3cpu22$ between the two distributed computing sub-systems $1dcss2$, $1dcss3$. In another example, any combination of the computing nodes $3cpu11$, $3cpu21$, $3cpu31$, and $3cpuM1$ may service some or even all of any or all of the authorizing entities $1entity1$, $1entity2$, $1entity3$, $1entityM$, as long as the computing nodes, together, have a sufficient computational power to process all actions, and as long as each of the involved computing nodes handles each of the serviced distributed computing sub-systems separately.

Figure 1B:
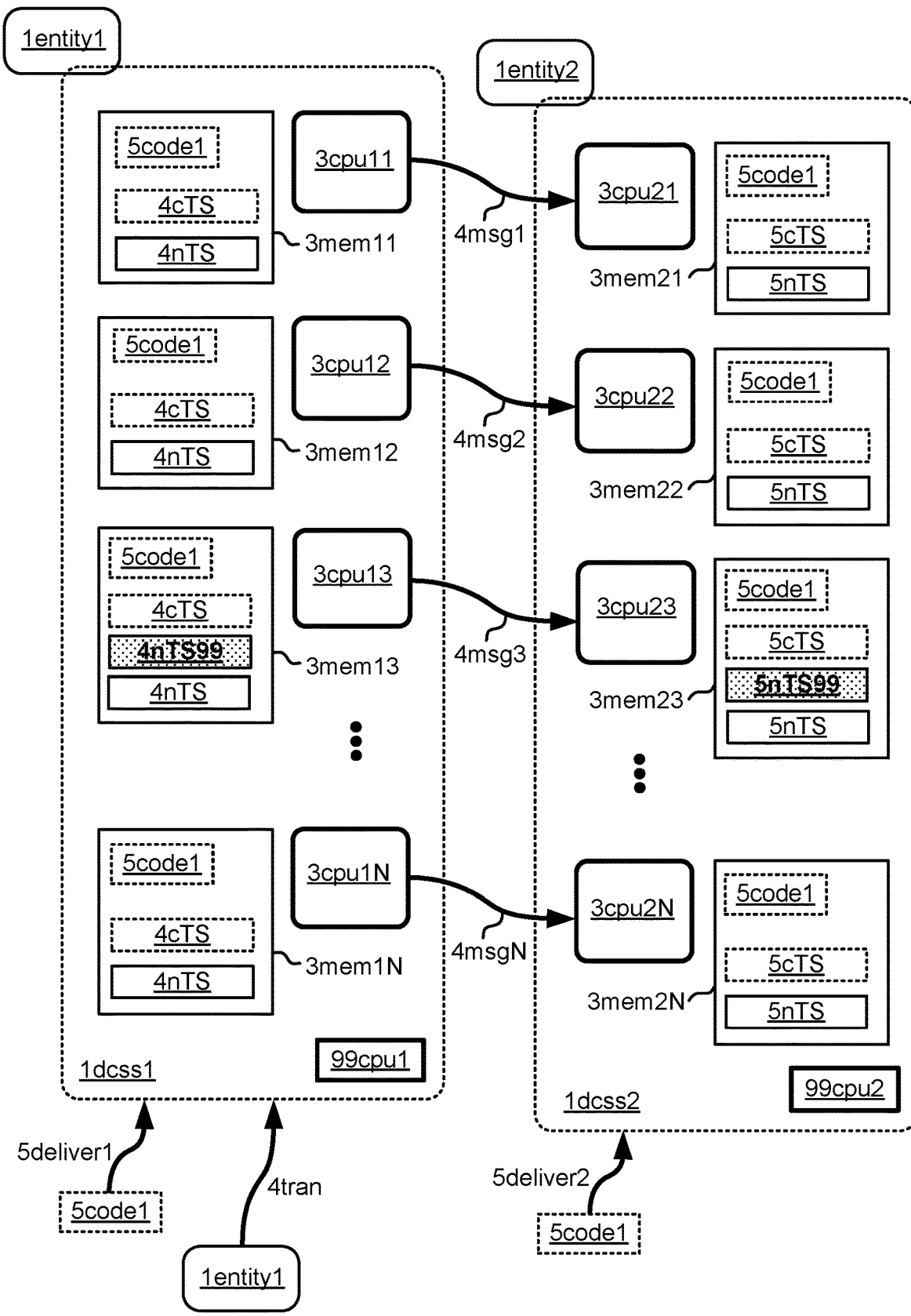
FIG. 1B illustrates a distributed computing sub-systems made in accordance with embodiments interacting with a second distributed computing sub-system in the context of processing a certain action involving the two computing sub-systems.

FIG. 1B illustrates one of the distributed computing sub-system $1dcss1$ made in accordance with embodiments interacting with a second distributed computing sub-system $1dcss2$ in the context of processing a certain action $4tran$ involving the two computing sub-systems $1dcss1$, $1dcss2$. Authorizing entity $1entity1$, which is serviced by distributed computing sub-system $1dcss1$, may issue an action request $4tran$ that is conveyed, together with the appropriate cryptographic signature, to the computing nodes $3cpu11$, $3cpu12$, $3cpu13$, $3cpu1N$ of distributed computing sub-system $1dcss1$. The action request $4tran$ may be, as an example, a request to transfer a certain number of tokens, which are currently in the possession of entity $1entity1$, to entity $1entity2$, which is serviced by computing sub-system $1dcss2$. Upon reception of the request $4tran$, each of computing nodes $3cpu11$, $3cpu12$, $3cpu13$, $3cpu1N$ validates, using the cryptographic signature from $1entity1$, that the action request $4tran$ was issued by an authorized entity, and further validates that the current state $4cTS$, as stored locally in an associated data storage space, allows the action $4tran$. For example, and still using the token transfer case, $3cpu11$ validates the authenticity of the request $4tran$ and further validates that data element $4cTS$ that is stored in data storage space $3mem11$ associated with $3cpu11$, and representing a current number of tokens in the possession of $1entity1$, indicates that there are enough tokens to complete the action $4tarn$. $3cpu12$ validates the authenticity of request $4tran$ and further validates that data element $4cTS$ stored in data storage space $3mem12$ associated with $3cpu12$, and representing the current number of tokens in the possession of $1entity1$, indicates that there are enough tokens to complete the action $4tarn$. $3cpu13$ validates the authenticity of request $4tran$ and further validates that data element $4cTS$ stored in data storage space $3mem13$ associated with $3cpu13$, and representing a current number of tokens in the possession of $1entity1$, indicates that there are enough tokens to complete the action $4tarn$. $3cpu1N$ validates the authenticity of request $4tran$ and further validates that data element $4cTS$ stored in data storage space $3mem1N$ associated with $3cpu1N$, and representing a current number of tokens in the possession of $1entity1$, indicates that there are enough tokens to complete the action $4tarn$.

After performing the above validations, each of the computing nodes $3cpu11$, $3cpu12$, $3cpu13$, $3cpu1N$ changes the local current state, in the respective data storage space $3mem11$, $3mem12$, $3mem13$, $3mem1N$, from $4cTS$ to $4nTS$ to indicate the appropriate reduction in the number of tokens in possession of $1entity1$ after processing action $4tran$ in $1dcss1$. The above-described operation of the different computing nodes $3cpu11$, $3cpu12$, $3cpu13$, $3cpu1N$ may be done independently by each of the nodes or it may be directed and/or ordered by one of the nodes $3cpu11$, $3cpu12$, $3cpu13$, $3cpu1N$ acting as a lead node in accordance with some embodiments. After executing the above state changes, each of the computing nodes $3cpu11$, $3cpu12$, $3cpu13$, $3cpu1N$ sends a message $4msg$ to one or several of the computing nodes $3cpu21$, $3cpu22$, $3cpu23$, $3cpu2N$ of the second distributed computing sub-system $1dcss2$, following which, each of the computing nodes $3cpu21$, $3cpu22$, $3cpu23$, $3cpu2N$, after receiving the message $4msg$, changes the local current state, in the respective data storage space $3mem21$, $3mem22$, $3mem23$, $3mem2N$, from $5cTS$ to $5nTS$ to indicate the appropriate increment in the number of tokens now in possession of $1entity2$ after processing action $4tran$ in $1dcss2$.

In embodiments, the data storage spaces $3mem11$, $3mem12$, $3mem13$, $3mem1N$, $3mem21$, $3mem22$, $3mem23$, $3mem2N$ may be a volatile memory, e.g., random access memory (RAM), and/or a non-volatile memory, e.g., hard drive, disk, and/or flash memory. The data storage spaces may be associated respectively with the computing nodes. For example, $3mem11$ may be associated with, and in close proximity to, $3cpu11$, such as in a case where $3mem11$ is located in the same server/card/chip as $3cpu11$. Each of the data storage spaces $3mem11$, $3mem12$, $3mem13$, $3mem1N$, $3mem21$, $3mem22$, $3mem23$, $3mem2N$ is depicted as being associated with a specific one computing node, but a computing node may be associated with more than one of the storage spaces, and a storage space may be associated at one time with one of the computing nodes and at a different time with another of the computing nodes, as long as they all belong to, and located in, the same validator cluster.

In embodiments, e.g., as a result of a detrimental event affecting validator cluster $2validator3$, computing nodes $3cpu13$ in $1dcss1$ and $3cpu23$ in $1dcss2$ fail to change the state from $4cTS$ to $4nTS$ as a result of processing action $4tran$, and instead change the state from $4cTS$ to an erroneous state $4nTS99$. Now, since the detrimental event does not affect the other validator clusters, then an observation can be made, by an observational computing node $99cpu$, or by each of the unaffected computing nodes $3cpu11$, $3cpu12$, $3cpu1N$, that a consensus exists about the correctness of state $4nTS$ and about the incorrectness of state $4nTS99$, following which a corrective action can be made. The corrective action can include, for example, changing the state $4nTS99$ in data storage spaces $3mem13$, $3mem23$ from $4nTS99$ to $4nTS$, resetting computing nodes $3cpu13$, $3cpu23$, excluding validator cluster $2validator3$ from future actions, and/or another corrective action.

In embodiments, a specific code component $5code1$ contains instructions operative to implement a single specific set of rules, e.g., the rules governing actions involving transfer of a specific token type. The code component is distributed 5dliver1 among the computing nodes of distributed computing sub-systems 1dcss1, 1dcss2, and others sub-systems that may be involved in actions of the specific token type, e.g., the code component 5code1 is delivered to storage spaces 3mem11, 3mem12, 3mem13, 3mem1N, 3mem21, 3mem22, 3mem23, 3mem2N, and executed by the respective computing nodes as part of validating actions such as 4tran associated with the specific token type. For example, node 3cpu11 uses instructions in 5code1 stored in 3mem11 to validate authenticity of request 4tran, to further validate that state 4cTS indicates that 1entity1 has enough tokens to allow the transfer, and to subtract the specific amount requested thereby changing state 4cTS into 4nTS, and node 3cpu21 uses instructions in 5code1 stored in 3mem21 to add the specific amount thereby changing state 5cTS into 5nTS. In one embodiment, code component 5code1 is an application having machine-readable instructions that implement the single specific set of rules associated with the specific token type.

Figure 1C:
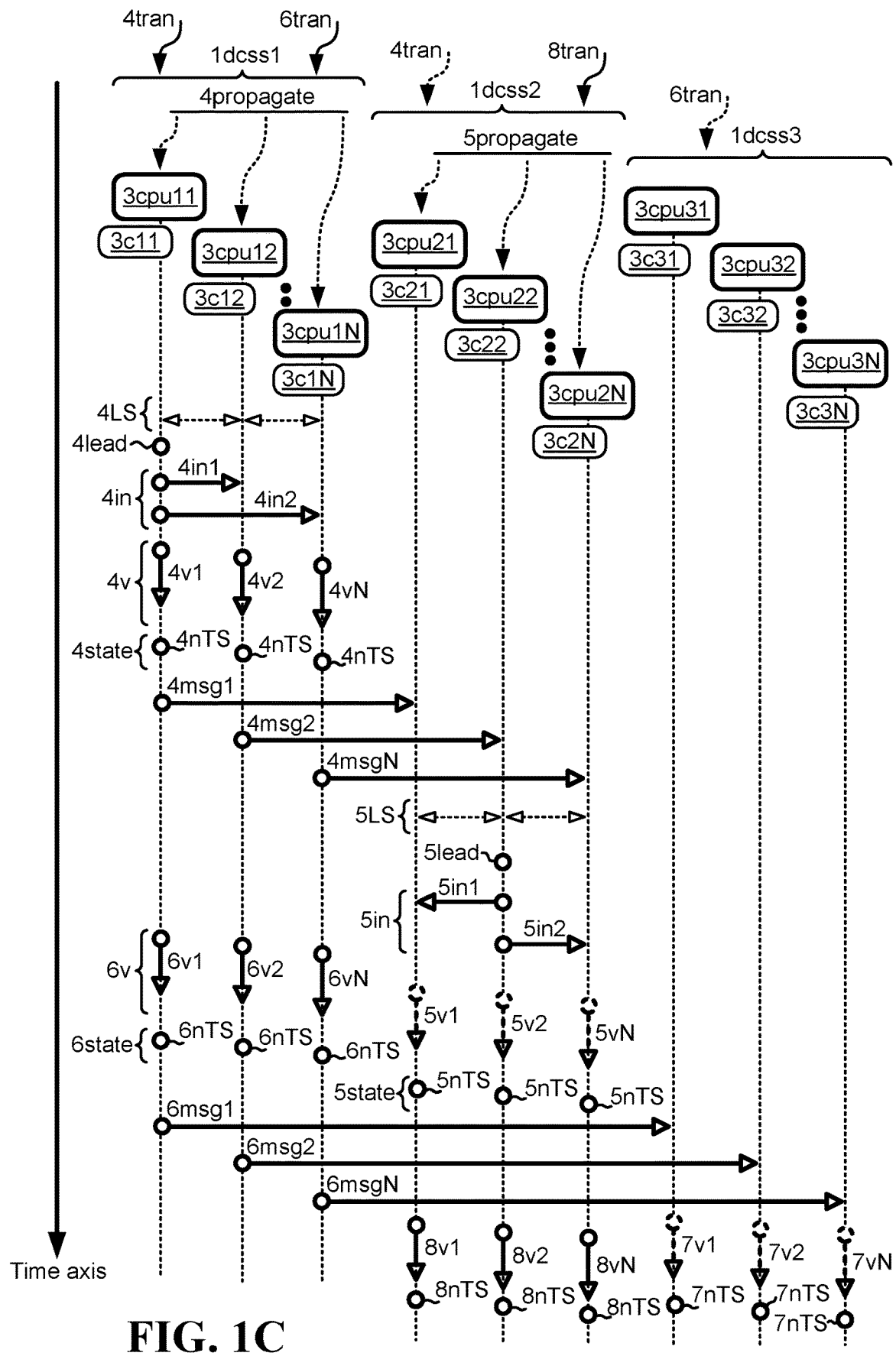
FIG. 1C illustrates several distributed computing sub-systems made in accordance with embodiments interacting with each other in the context of processing several actions while showing signal propagation between the various sub-systems as well as various processes executed inside the various sub-systems.

FIG. 1C illustrates several of the distributed computing sub-systems 1dcss1, 1dcss2, 1dcss3 made In embodiments interacting with each other in the context of processing several actions 4tran, 6tran, 8tran while showing signal propagation between the various sub-systems as well as various processes executed inside the various sub-systems. Signal propagation/message transport between the various sub-systems, as well as inside the sub-systems, is facilitated by communication interfaces/network interface controllers accessible to the various computing nodes. For example, the communication interfaces 3c11, 3c12, 3c1N are associated respectively with computing nodes 3cpu11, 3cpu12, 3cpu1N, the communication interfaces 3c21, 3c22, 3c2N are associated respectively with computing nodes 3cpu21, 3cpu22, 3cpu2N, and the communication interfaces 3c31, 3c32, 3c3N are associated respectively with computing nodes 3cpu31, 3cpu32, 3cpu3N.

In embodiments, action request 4tran, which involves the two computing sub-systems 1dcss1 and 1dcss2 as the interacting entities are 1entity1 and 1entity2, is received in distributed computing sub-system 1dcss1, and is distributed 4propagate among the respective computing modes 3cpu11, 3cpu12, 3cpu13, 3cpu1N. The request 4tran may be distributed 4propagate among the respective computing nodes using a mesh communication topology, e.g., peer-to-peer, and in that case, and since the computing modes 3cpu11, 3cpu12, 3cpu13, 3cpu1N belong to different validator clusters 2validator1, 2validator2, 2validator3, 2validatorN, then such distribution 4propagate includes inter-cluster communication, e.g., using the Internet to communicate between the different data centers associated respectively with the different validator clusters 2validator1, 2validator2, 2validator3, 2validatorN, or using dedicated inter-data center communication links, e.g., using dedicated fiber links. The request 4tran may be distributed 4propagate among the respective computing nodes 3cpu11, 3cpu12, 3cpu13, 3cpu1N directly by the requesting entity 1entity1, e.g., using a personal computer or a smartphone associated with entity 1entity1, and sending the request 4tran via the Internet to the respective computing nodes. In a case where 1entity1 is a computerized process, e.g., an internal process in 1dcss1, then request 4tran may be generated by one of the nodes of 1dcss1, but still has to be distributed 4propagate using inter-cluster communication, e.g., using the Internet.

In embodiments, after receiving the action request 4tran, and in some cases prior to receiving the action request 4tran, the computing modes 3cpu11, 3cpu12, 3cpu13, 3cpu1N may start a negotiation process 4LS to select a lead node 4lead, in which the negotiation process involves inter-node communication, and therefore inter-cluster communication as the nodes belong to different validator clusters, e.g., node 3cpu11 is illustrated as being selected to be the lead node 4lead. Any of various selection processes may be employed in conjunction with the negotiation process 4LS, e.g., selection processes associated with proof of work (PoW), in which the selected party has to prove that a cryptographic work has been applied in order to be considered for selection, selection processes associated with proof of stake (PoS), in which the selected party has to prove that a stake is involved in order to be considered for selection, and selection processes that do not necessarily involve any cryptographic proof. In one embodiment, when a stake/work is involved in the selection process 4LS, then the stake/work is provided by the entity to which the lead node belongs, e.g., in order for 3cpu11 to be selected as a lead node 4lead, 2entity1, via validator cluster 2validator1 to which 3cpu11 belongs, has to provide the proof of stake/work.

In embodiments, the lead node, e.g., node 3cpu11, sends indications 4in to the other nodes of the associated distributed computing sub-system 1dcss1, e.g., 3cpu11 sends indication 4in1 to node 3cpu12 and indication 4in2 to node 3cpu1N. The indications 4in may be used by the lead node to indicate to other nodes in the associated distributed computing sub-system which action to process first, e.g., when two actions 4tran, 6tran are pending, node 3cpu11 may indicate to 3cpu12 and 3cpu1N that action 4tran is to be processed before action 6tran, in which an order of processing actions may be critical to avoid inconsistencies and uncertainties regarding the correct state. For example, if the current state 4cTS can't support both actions 4tran, 6tran, then selecting the order of processing the actions means that if 4tran is to be processed first, then 4tran can be carried through while 6tran has to be rejected, and vice versa.

In embodiments, after receiving the action request 4tran in 1dcss1, the involved nodes 3cpu11, 3cpu12, 3cpu1N, also referred to as validator nodes, may start validating 4v the request 4tran and that the current action state 4cTS allows the action 4tran, in accordance with some embodiments. For example, 3cpu11 may perform such validations 4v1 independently, 3cpu12 may perform such validations 4v2 independently, and 3cpu1N may perform such validations 4vN independently. In one embodiment, the lead node performs such validations 4v1, and sends the validation results and/or the next state 4nTS to the other nodes for confirmation.

In embodiments, after concluding the validation processes 4v of action 4tran, which involves the interacting entities 1entity1 and 1entity2, and assuming all validations are successful, each of the involved nodes 3cpu11, 3cpu12, 3cpu1N of 1dcss1 associated with 1entity1, which is the initiating entity of 4tran, changes the respective current state 4state (FIG. 1C) from 4cTS to 4nTS, and sends a message 4msg (FIG. 1C) to at least one of the computing nodes of distributed computing sub-system 1dcss2 associated with entity 1entity2. For example, node 3cpu11 changes the state from 4cTS to 4nTS and sends a message 4msg1 to node 3cpu21; node 3cpu12 changes the state from 4cTS to 4nTS and sends a message 4msg2 to node 3cpu22; and node 3cpu1N changes the state from 4cTS to 4nTS and sends a message 4msgN to node 3cpu2N. The messages sent are used as a trigger by 3cpu21, 3cpu22, 3cpu23, 3cpu2N to commence processing of action 4tran in the context of the receiving entity, which is entity 1entity2 in the case of 4tran. It is noted that contrary to the sending of the indications 4in, which are done inter-validation-cluster, the sending of messages 4msg1, 4msg2, 4msgN are not necessarily intervalidation-cluster, and may be done purely intra-validation-cluster, e.g., since 3*cpu*11 and 3*cpu*21 belong to the same validator cluster 2validator1, then message 4msg1 is sent within the validation cluster 2validator1, e.g., using an internal communication network servicing a data center associated with 2validator1. In a similar fashion, 4msg2 is done intra-cluster 2validator2, and 4msgN is done intra-cluster 2validatorN.

In embodiments, after receiving messages 4msg1, 4msg2, 4msgN, the computing nodes 3*cpu*21, 3*cpu*22, 3*cpu*23, 3*cpu*2N of 1*dcss*2 start processing action 4tran from the side of 1entity2 associated with 1*dcss*2, and eventually change the current state 5state (FIG. 1C) of 1entity2 from 5*c*TS to 5*n*TS, e.g., 3*cpu*21 receives message 4msg1 and consequently changes the respective state from 5*c*TS to 5*n*TS, 3*cpu*22 receives message 4msg2 and consequently changes the respective state from 5*c*TS to 5*n*TS, and 3*cpu*2N receives message 4msgN and consequently changes the respective state from 5*c*TS to 5*n*TS.

In embodiments, prior to the changing of the current state 5state of 1entity2 from 5*c*TS to 5*n*TS, computing nodes 3*cpu*21, 3*cpu*22, 3*cpu*2N of 1*dcss*2 may perform additional validations 5*v*1, 5*v*2, 5*v*N (FIG. 1C) respectively, e.g., 3*cpu*21 may validate 5*v*1 that message 4msg1 was indeed sent by node 3*cpu*11 of 1*dcss*1 using a cryptographic signature embedded in 4msg1.

In embodiments, after receiving the messages 4msg1, 4msg2, 4msgN, and in some cases prior to receiving the messages, the computing nodes 3*cpu*21, 3*cpu*22, 3*cpu*2N may start a negotiation process 5LS (FIG. 1C) to select a lead node 5lead, in which the negotiation process involves inter-node communication, and therefore inter-cluster communication as the nodes belong to different validator clusters, e.g., node 3*cpu*22 is illustrated as being selected to be the lead node 5lead. Any of various selection processes may be employed in conjunction with the negotiation process 5LS, similar to process 4LS. In one embodiment, when a proof of stake/work is involved in the selection process 5LS, then the proof of stake/work is provided by the entity to which the lead node belongs, e.g., in order for 3*cpu*22 to be selected as a lead node 5lead, 2entity2, via validator cluster 2validator2 to which 3*cpu*22 belongs, has to provide the proof of stake/work.

In embodiments, the current lead node 5lead of 1*dcss*2, e.g., node 3*cpu*22, sends indications 5in to the other nodes of the associated distributed computing sub-system 1*dcss*2, e.g., 3*cpu*22 sends indication 5in1 to node 3*cpu*21 and indication 5in2 to node 3*cpu*2N. The indications 5in may be used by the lead node to indicate other nodes in the associated distributed computing sub-system which action to process first, e.g., when two actions 4tran, 8tran (FIG. 1C) are pending in conjunction with 1*dcss*2, node 3*cpu*22 may indicate to 3*cpu*21 and 3*cpu*2N that action 4tran is to be processed before action 8tran, in which an order of processing actions may be critical to avoid inconsistencies and/or uncertainties regarding the correct state. For example, if the current state 5*c*TS of 1entity2 needs the update of action 4tran (into 5*n*TS) to support action 8tran, then selecting the order of processing the actions means that if 4tran is to be processed first, then 8tran can be carried through, but 8tran will fail if attempted to be processed before 4tran in 1*dcss*2. Process 5in makes sure that actions 4tran and 8tran are processed in the same order by all the involved nodes 3*cpu*21, 3*cpu*22, 3*cpu*2N.

In embodiments, action request 6tran (FIG. 1C), which involves the two computing sub-systems 1*dcss*1 and 1*dcss*3 as the interacting entities are 1entity1 and 1entity3, is received in distributed computing sub-system 1*dcss*1, and is distributed 4propagate among the respective computing modes 3*cpu*11, 3*cpu*12, 3*cpu*13, 3*cpu*1N.

In embodiments, after receiving the action request 6tran in 1*dcss*1, the involved nodes 3*cpu*11, 3*cpu*12, 3*cpu*1N may start validating 6*v* the request 6tran and that the current action state 4*n*TS (after 4tran was already processed) allows the action 6tran, in accordance with some embodiments. For example, 3*cpu*11 may perform such validations 6*v*1 independently, 3*cpu*12 may perform such validations 6*v*2 independently, and 3*cpu*1N may perform such validations 6*v*N independently. In one embodiment, the lead node performs such validations 6*v*1, and sends the validation results and/or the next state 6*n*TS to the other nodes for confirmation.

In embodiments, after concluding the validation processes 6*v* of action 6tran, which involves the interacting entities 1entity1 and 1entity3, and assuming all validations are successful, each of the involved nodes 3*cpu*11, 3*cpu*12, 3*cpu*1N of 1*dcss*1 associated with 1entity1, which is the initiating entity of 6tran, changes the respective current state 6state (FIG. 1C) from 4*n*TS to 6*n*TS, and sends a message 6msg (FIG. 1C) to at least one of the computing nodes of distributed computing sub-system 1*dcss*3 associated with entity 1entity3. For example, node 3*cpu*11 changes the state from 4*n*TS to 6*n*TS and sends a message 6msg1 to node 3*cpu*31; node 3*cpu*12 changes the state from 4*n*TS to 6*n*TS and sends a message 6msg2 to node 3*cpu*32; and node 3*cpu*1N changes the state from 4*n*TS to 6*n*TS and sends a message 6msgN to node 3*cpu*3N. The messages sent are used as a trigger by 3*cpu*31, 3*cpu*32, 3*cpu*33, 3*cpu*3N to commence processing of action 6tran in the context of the receiving entity, which is entity 1entity3 in the case of 6tran. It is noted that the sending of messages 6msg1, 6msg2, 6msgN are not necessarily inter-validation-cluster, and may be done purely intra-validation-cluster, e.g., since 3*cpu*11 and 3*cpu*31 belong to the same validator cluster 2validator1, then message 6msg1 is sent within the validation cluster 2validator1. In a similar fashion, 6msg2 is done intra-cluster 2validator2, and 6msgN is done intra-cluster 2validatorN.

In embodiments, after receiving messages 6msg1, 6msg2, 6msgN, the computing nodes 3*cpu*31, 3*cpu*32, 3*cpu*33, 3*cpu*3N of 1*dcss*3 start processing action 6tran from the side of 1entity3 associated with 1*dcss*3, and eventually change the current state of 1entity3 from a current state to 7*n*TS, e.g., 3*cpu*31 receives message 6msg1 and consequently changes the respective state to 7*n*TS, 3*cpu*32 receives message 6msg2 and consequently changes the respective state to 7*n*TS, and 3*cpu*3N receives message 6msgN and consequently changes the respective state to 7*n*TS.

In embodiments, prior to the changing of the state of 1entity3 from to 7*n*TS, computing nodes 3*cpu*31, 3*cpu*32, 3*cpu*3N of 1*dcss*3 may perform additional validations 7*v*1, 7*v*2, 7*v*N (FIG. 1C) respectively, e.g., 3*cpu*31 may validate 7*v*1 that message 6msg1 was indeed sent by node 3*cpu*11 of 1*dcss*1 using a cryptographic signature embedded in 6msg1.

In embodiments, action request 8tran (FIG. 1C), which involves the two computing sub-systems 1*dcss*2 and 1*dcss*M as the interacting entities are 1entity2 and 1entityM, is received in distributed computing sub-system 1*dcss*2, and is distributed 5propagate among the respective computing modes 3*cpu*21, 3*cpu*22, 3*cpu*23, 3*cpu*2N.

In embodiments, after receiving the action request 8tran in 1*dcss*2, the involved nodes 3*cpu*21, 3*cpu*22, 3*cpu*2N may start validating 8*v* the request 8tran that the current action state 5*n*TS (after 4tran was already processed) allows the action 8tran, in accordance with some embodiments. For example, 3*cpu*21 may perform such validations 8*v*1 independently, 3cpu22 may perform such validations 8v2 independently, and 3cpu2N may perform such validations 8vN independently. In one embodiment, the lead node performs such validations 8v2, and sends the validation results and/or the next state 8nTS to the other nodes for confirmation.

In embodiments, after concluding the validation processes 8v of action 8tran, which involves the interacting entities 1entity2 and 1entityM, and assuming all validations are successful, each of the involved nodes 3cpu21, 3cpu22, 3cpu2N of 1dcss2 associated with 1entity2, which is the initiating entity of 8tran, changes the respective current state from 5nTS to 8nTS, and sends a message (not shown) to at least one of the computing nodes of distributed computing sub-system 1dcssM associated with entity 1entityM, after which distributed computing sub-system 1dcssM processes action 8tran in the context of the receiving entity 1dcssM (not shown).

It is emphasized that all of actions 4tran, 6tran, and 8tran are done in the context of the same single specific set of rules, e.g., rules describing a single monetary/specific token type system, which is defined by instructions in code component 5code1, e.g., application SW 5code1 that is distributed among all participating computing sub-systems 1dcss1, 1dcss2, 1dcss3, and 1dcssM. It is noted that even though all of actions 4tran, 6tran, 8tran are done in the context of the same set of rules—e.g., when all actions 4tran, 6tran, 8tran are associated with the transferring of a single token type among the several entities and the respective recording of states implements a distributed ledger—the multi-sub-system 1dcss construct, as described above, still allows many of the actions to be executed in parallel with each other and in an uncoupled manner. For example, action 6tran may be executed by the pair 1dcss1-1dcss3 in parallel and in an uncoupled manner with action 8tran that is executed by the pair 1dcss2-1dcssM, as the two actions 6tra, 8tan do not share a common entity, thus allowing creating a token that can be transferred between numerous controlling entities in parallel while maintaining the integrity of the governing rules of the token.

Figure 1D:
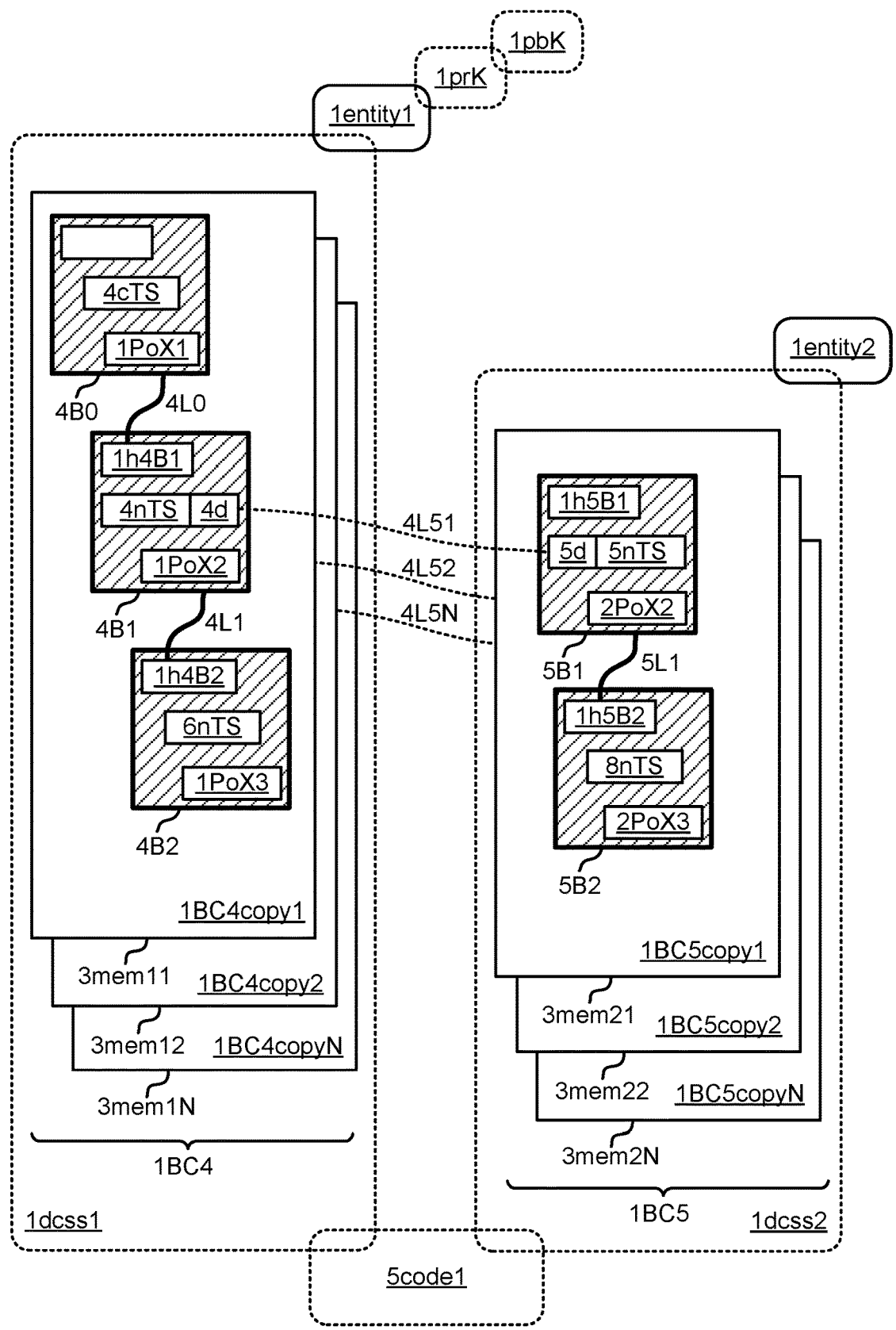
FIG. 1D illustrates two independently created blockchain data structures that are formed during and/or after processing of actions by two of the distributed sub-systems made in accordance with embodiments and further showing an action-specific linking of the two blockchain data structures.

FIG. 1D illustrates two independently created blockchain data structures 1BC4 and 1BC5 that are formed during and/or after the processing of actions 4tran, 6tran, and 8tran by two of the distributed sub-systems 1dcss1 and 1dcss 2 made in embodiments and further showing an action-specific linking 4L5 of the two blockchain data structures. It is noted that two additional blockchain data structures and additional action-specific linking are also created as a result of 4tran, 6tran, and 8tran, in conjunction with 1dcss3 and 1dcssM which are involved entities, but these additional blockchain data structures and linking are not shown in order to simplify FIG. 1D.

In embodiments, the initial state 4cTS of entity 1entity1, in the context of 5code1 rules and as maintained by 1dcss1, is placed in block 4B0 (FIG. 1D). Block 4B0 is stored in multiple copies 1BC4copy in data storage spaces 3mem11, 3mem12, 3mem13, 3mem1N associated with nodes 3cpu11, 3cpu12, 3cpu13, 3cpu1N of 1dcss1. Block 4B0 may contain, in addition to 4cTC, other data sets, e.g., 1PoX1 associated with the way 4B0 was created. When action 4tran is processed in 1dcss1, and decisions are made to change the state from 4cTS to 4nTS, a new block 4B1 is generated in 1dcss1 and stored in multiple copies 1BC4copy in data storage spaces 3mem11, 3mem12, 3mem13, 3mem1N associated with nodes 3cpu11, 3cpu12, 3cpu13, 3cpu1N of 1dcss1. Block 4B1 may include, in addition to the new state 4nTC, other data sets, e.g., 1h4B1, which is a cryptographic hash of the previous block 4B0, and e.g., 1PoX2 associated with the way 4B1 was created. In one embodiment, 1PoX2 is a PoW, and/or a PoS, and/or another cryptographic proof provided by one of the nodes 3cpu11, 3cpu12, 3cpu13, 3cpu1N that was possibly selected 4LS as a lead node 4lead based on that proof, and in that case, the block itself may be generated by the lead node 4lead (e.g., 3cpu11), sent to the other nodes 3cpu12, 3cpu13, 3cpu1N, verified/validated by the other nodes, and recorded in the respective data storage spaces. When action 6tran is processed in 1dcss1, and decisions are made to change the state from 4nTS to 6nTS, a new block 4B2 is generated in 1dcss1 and stored in multiple copies 1BC4copy in data storage spaces 3mem11, 3mem12, 3mem13, 3mem1N associated with nodes 3cpu11, 3cpu12, 3cpu13, 3cpu1N of 1dcss1. Block 4B2 may include, in addition to the new state 6nTC, other data sets, e.g., 1h4B2, which is a cryptographic hash of the previous block 4B1, and e.g., 1PoX3 associated with the way 4B2 was created. The blocks 4B0, 4B1, 4B2 are linked 4L0, 4L1 thereby creating a blockchain data structure 1BC4 associated specifically with the actions 4tran, 6tran processed in 1dcss1 and in conjunction with 1entity1.

In embodiments, when action 4tran is processed in 1dcss2, and decisions are made to change the state from 5cTS to 5nTS, a new block 5B1 is generated in 1dcss2 and stored in multiple copies 1BC5copy in data storage spaces 3mem21, 3mem22, 3mem23, 3mem2N associated with nodes 3cpu21, 3cpu22, 3cpu23, 3cpu2N of 1dcss2. Block 5B1 may include, in addition to the new state 5nTC, other data sets, e.g., 2PoX2 associated with the way 5B1 was created. In one embodiment, 2PoX2 is a PoW, and/or a PoS, and/or another cryptographic proof provided by one of the nodes 3cpu21, 3cpu22, 3cpu23, 3cpu2N that was possibly selected 5LS as a lead node 5lead based on that proof, and in that case, the block itself may be generated by the lead node 5lead (e.g., 3cpu22), sent to the other nodes 3cpu21, 3cpu23, 3cpu2N, verified/validated by the other nodes, and recorded in the respective data storage spaces. When action 8tran is processed in 1dcss2, and decisions are made to change the state from 5nTS to 8nTS, a new block 5B2 is generated in 1dcss2 and stored in multiple copies 1BC5copy in data storage spaces 3mem21, 3mem22, 3mem23, 3mem2N associated with nodes 3cpu21, 3cpu22, 3cpu23, 3cpu2N of 1dcss2. Block 5B2 may include, in addition to the new state 8nTS, other data sets, e.g., 1h5B2, which is a cryptographic hash of the previous block 5B1, and e.g., 2PoX3 associated with the way 5B2 was created. The blocks 5B1, 5B2 are linked 5L1 thereby creating another blockchain data structure 1BC5 associated specifically with the actions 4tran, 8tran processed in 1dcss2 and in conjunction with 1entity2.

In embodiments, the blockchain data structure 1BC4 is linked 4L5 to another blockchain data structure 1BC5, in which the link 4L5 represents the action 4tran involving both 1entity1 and 1entity2. For example, block 4B1 (copy 1BC4copy1) is linked 4L51 with block 5B1 (copy 1BC5copy1); block 4B1 (copy 1BC4copy2) is linked 4L52 with block 5B1 (copy 1BC5copy2); and block 4B1 (copy 1BC4copyN) is linked 4L5N with block 5B1 (copy 1BC5copyN).

In embodiments, 5B1 includes a data set 5d associated with the respective inter-blockchain link 4L5, e.g., data set 5d may include a cryptographic hash of block 4B1, and thus cryptographically links 4B1 and 5B1 together, thereby forming a "horizontal" cryptographically protected blockchain-like data structure 4B1+5B1. In one embodiment, 4B1 includes a data set 4d associated with the respective inter-blockchain link 4L5, e.g., data set 4d may include a cryptographic hash of block 5B1, and thus cryptographically links 4B1 and 5B1 together, thereby forming a "horizontal" cryptographically protected blockchain-like data structure 4B1+5B1.

In embodiments, the blocks 4B0, 4B1, 4B2, 5B1, 5B2, in conjunction with the links 4L, 4L5, 5L, and the associated data sets 1h4B1, 1h4B2, 1h5B1, 1h5B2, 4d, 5d, together create a multi-dimensional cryptographic blockchain-like data structure that includes "vertical" blockchain data constructs 4B0+4B1+4B2, 5B1+5B2 intertwined with "horizontal" blockchain-like data constructs 4B1+5B1, having at least the property that blocks can be added "vertically" to both constructs 4B0+4B1+4B2 and 5B1+5B2 in parallel and in an uncoupled manner, provided that the added blocks do not, and are not going to, be linked as a "horizontal" construct, thereby facilitating high-bandwidth operation in conjunction with resiliency. For example, blocks 4B2 and 5B2 can be processed/created in parallel, but blocks 4B1 and 5B1 have to be processed serially. In one embodiment, the multi-dimensional cryptographic blockchain-like data structure—that includes the blocks 4B0, 4B1, 4B2, 5B1, 5B2, in conjunction with the links 4L, 4L5, 5L, and the associated data sets 1h4B1, 1h4B2, 1h5B1, 1h5B2, 4d, 5d—resembles, in a topological sense, a directed a-cyclical graph (DAG).

Figure 1E:
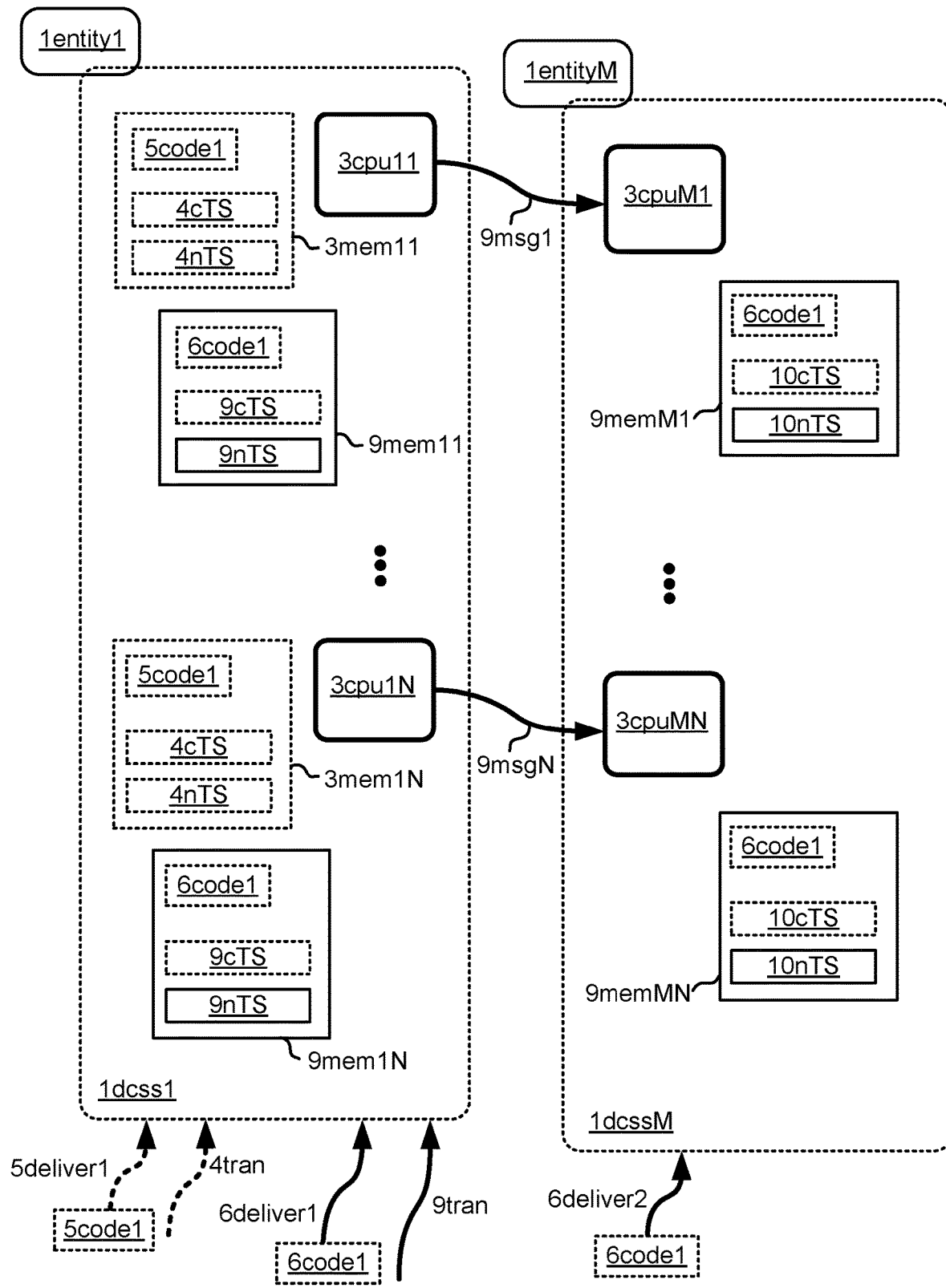
FIG. 1E illustrates several types of code components associated respectively with several different sets of rules to be selected and used by each of the distributed computing sub-systems according to the type of action being currently processed in accordance with embodiments.

FIG. 1E illustrates several types of code components 5code1, 6code1 associated respectively with several different sets of rules to be selected and used by each of the distributed computing sub-systems 1dcss according to the type of action being currently processed in embodiments. When the computing nodes 3cpu11, 3cpu1N of distributed computing sub-system 1dcss1 receive the action request 4tran, they determine according to which rules to process 4tran, e.g., if 4tran is associated with a transfer of a specific type of token between 1entity1 and 1entity2, then code component 5code1 will be selected as the application to be executed in 3cpu11, 3cpu1N in conjunction with the processing of action 4tran, in which code component 5code1 is associated by definition with the specific type of token in this example. The decision to use 5code1 may be reached, for example, by including in the request 4tran a certain field that identifies 5code1 as the governing code, or it may be reached by other deductive means. After processing 4tran at the 1dcss1 side, the respective state is updated from 4cTS to 4nTS in the respective data storage spaces 3mem11, 3mem1N. When the computing nodes 3cpu11, 3cpu1N of distributed computing sub-system 1dcss1 receive a different action request 9tran, that is not associated with 5code1 and the related rules, they determine according to which rules to process 9tran, e.g., if 9tran is associated with an interaction between an avatar of 1entity1 and an avatar of 1entityM in a particular virtual metaverse, then code component 6code1 will be selected as the application to be executed in 3cpu11, 3cpu1N in conjunction with the processing of the action 9tran, in which code component 6code1 is associated by definition with the particular virtual metaverse. The decision to use 6code1 may be reached, for example, by including in the request 9tran a certain field that identifies 6code1 as the governing code for the particular metaverse, or it may be reached by other deductive means.

In embodiments, after processing 9tran at the 1dcss1 side, the respective state is updated from 9cTS to 9nTS in the respective data storage spaces 9mem11, 9mem1N. Consequently, after sending the messages 9msg from 1dcss1 to 1dcssM to continue processing 9tran in conjunction with 1entityM, the computing nodes 3cpuM1, 3cpuMN of distributed computing sub-system 1dcssM receive the messages 9msg and determine according to which rules to process 9msg associated with 9tran, e.g., code component 6code1 will be selected as the application to be executed in 3cpuM1, 3cpuMN in conjunction with processing message 9msg. The decision to use 6code1 may be reached, for example, by including in the message 9msg a certain field that identifies 6code1 as the governing code for the particular metaverse, or it may be reached by other deductive means. After processing 9tran at the 1dcssM side, the respective state is updated from 10cTS to 10nTS in the respective data storage spaces 9memM1, 9memMN. Code component 6code1 is delivered 6deliver1 to the involved sub-systems 1dcss1, 1dcssM in a similar fashion that code component 5code1 was delivered 5deliver1 and in accordance with some embodiments.

In embodiments, a system operative to combine two distributed computing sub-systems to record a single action involving at least two interacting entities comprises: a plurality of validator computing nodes 3cpu (FIG. 1A, FIG. 1B) associated with a respective plurality of data storage spaces 3mem (FIG. 1B, e.g., 3cpu11 associated with 3mem11); a first distributed computing sub-system 1dcss1 (FIG. 1A, FIG. 1B), comprising a respective combination of at least some of the validator computing nodes 3cpu11, 3cpu12, 3cpu13, 3cpu1N (FIG. 1B), and operative to redundantly store, in the respectively associated data storage spaces 3mem11, 3mem12, 3mem13, 3mem1N (FIG. 1B), a state 4cTS (FIG. 1B) of a first entity 1entity1 (FIG. 1A, FIG. 1B), e.g., the current state 4cTS is redundantly stored in data storage spaces 3mem11, 3mem12, 3mem13, 3mem1N; and a second distributed computing sub-system 1dcss2 (FIG. 1A, FIG. 1B), comprising a respective different combination of at least some of the validator computing nodes 3cpu21, 3cpu22, 3cpu23, 3cpu2N (FIG. 1B), and operative to redundantly store, in the respectively associated data storage spaces 3mem21, 3mem22, 3mem23, 3mem2N (FIG. 1B), a state 5cTS (FIG. 1B) of a second entity 1entity2 (FIG. 1A, FIG. 1B), e.g., the current state 5cTS is redundantly stored in data storage spaces 3mem21, 3mem22, 3mem23, 3mem2N.

In embodiments, as a result of an action request 4tran (FIG. 1B) that affects the two entities 1entity1, 1entity2, each of at least some of the validator computing nodes of the first distributed computing sub-system 1dcss1 is configured to: validate 4v (FIG. 1C) the action request 4tran, e.g., each of 3cpu11, 3cpu12 and 3cpu1N validates 4tran independently: 4v1, 4v2, 4vN respectively in FIG. 1C; further validate 4v that the state 4cTS, as stored in the respective data storage space, allows completion of the action 4tran as requested, e.g., each of 3cpu11, 3cpu12 and 3cpu1N validates independently that the current state 4cTS, as stored locally, allows the action; change the state 4cTS in the respective data storage space to reflect an initial effect of executing the action 4tran as perceived by the first entity 1entity1, e.g., each of 3cpu11, 3cpu12 and 3cpu1N changes the state from the current 4cTS to a new state 4nTS, and stores the new state 4nTS locally; and consequent on said validations 4v, convey a message 4msg to at least one of the validator computing nodes of the second distributed computing sub-system 1dcss2, e.g., 3cpu11 conveys a message 4msg1 to 3cpu21, 3cpu12 conveys a message 4msg2 to 3cpu22, and 3cpu1N conveys a message 4msgN to 3cpu2N; and wherein each of at least some of the validator computing nodes of the second distributed computing sub-system 1dcss2 is configured to: obtain, from at least one of the validator computing nodes of the first distributed computing sub-system 1dcss1, said message 4msg, e.g., 3cpu21 obtains the message 4msg1 from 3cpu11, 3cpu22 obtains the message 4msg2 from 3cpu12, and 3cpu2N obtains the message 4msgN from 3cpu1N; and consequent on obtaining said message 4msg, change the state 5cTS in the respective data storage space to reflect a further effect of executing the action 4tran as perceived by the second entity 1entity2, e.g., each of 3cpu21, 3cpu22 and 3cpu2N changes the state from the current 5cTS to a new state 5nTS, and stores the new state 5nTS locally.

In embodiments, one of the validator computing nodes (e.g., 3cpu11, FIG. 1C) of the first distributed computing sub-system 1dcss1 is designated, prior to the action 4tran, as a lead node 4lead (FIG. 1C); and prior to said conveying of the message 4msg, each of the other validator computing nodes of the first distributed computing sub-system 1dcss1 is configured to obtain, from the lead node 3cpu11, an indication 4in (FIG. 1C) confirming and/or informing that the action 4tran is to be processed in a certain order relative to other actions, e.g., the lead node 3cpu11 sends the indications 4in1 and 4in2 (FIG. 1C) to nodes 3cpu12 and 3cpu1N respectively, in which the indications 4in indicate that action 4tran is to be processed prior to another action 6tran (FIG. 1C) that is associated with 1dcss1 but that is not necessarily associated with 1dcss2.

In embodiments, one of the validator computing nodes (e.g., 3cpu21, FIG. 1C) of the second distributed computing sub-system 1dcss2 is designated, prior to the action 4tran, as a second lead node 5lead (FIG. 1C); and prior to changing of the state (e.g., from 4cTS to 4nTS), each of the other validator computing nodes of the second distributed computing sub-system 1dcss2 is configured to obtain, from the second lead node 3cpu21, an indication 5in (FIG. 1C) confirming and/or informing that the action 4tran is to be processed in a certain order relative to other actions, e.g., the lead node 3cpu22 sends the indications 5in1 and 5in2 (FIG. 1C) to nodes 3cpu21 and 3cpu2N respectively, in which the indications 5in indicate that action 4tran is to be processed prior to another action 8tran (FIG. 1C) that is associated with 1dcss2 but that is not necessarily associated with 1dcss1.

In embodiments, one of the validator computing nodes (e.g., 3cpu11) of the first distributed computing sub-system 1dcss1 is selected, specifically per a set of actions comprising at least the action 4tran, as a lead node 4lead for enabling the action 4tran, using a selection process 4LS (FIG. 1C) associated with at least one of: (i) PoW, (ii) PoS, and/or (iii) any process operative to select a lead node with an associated cost and/or potential penalty; and prior to said conveying of the message 4msg, each of the other validator computing nodes of the first distributed computing sub-system 1dcss1 is configured to obtain, from the lead node 3cpu11, information 4in that is necessary to further validate the action 4tran before conveying the message, e.g., the lead node 3cpu11 sends the information 4in1 and 4in2 (FIG. 1C) to nodes 3cpu12 and 3cpu1N respectively.

In embodiments, the action is governed by a single specific set of rules 5code1 (FIG. 1B) that are shared among the validator computing nodes 3cpu; and said necessary information 4in is information that indicates that the action 4tran was verified to be in compliance with the rules 5code1.

In embodiments, the system further comprises observational computing nodes 99cpu (FIG. 1B), in which at least one of the observational computing nodes is configured to: validate that a consensus exists, among the validator computing nodes of the first distributed computing sub-system 1dcss1, in respect to said change of the state associated with the first entity 1entity1, e.g., that a consensus exists regarding the validity of changing the state from 4cTS to 4nTS.

In embodiments, at least one of the observational computing nodes is configured to validate that a consensus exists, among the validator computing nodes of the second distributed computing sub-system 1dcss2, in respect to said change of the state associated with the second entity 1entity2, e.g., that a consensus exists regarding the validity of changing the state from 5cTS to 5nTS, thereby validating that the requested action 4tran has already been executed and recorded correctly and/or that the requested action 4tran is a valid action to be executed and recorded.

In embodiments, at least one of the observational computing nodes, e.g., 99cpu1, is at least one of the validator computing nodes of one of the sub-systems, e.g., 3cpu11.

In embodiments, each of the validator computing codes 3cpu is also an observational computing node 99cpu.

In embodiments, the consensus is a consensus associated with at least one of: (i) a simple majority consensus, (ii) a special majority consensus, and/or (iii) a specific threshold consensus.

In embodiments, said respective combination of the validator computing nodes 3cpu11, 3cpu12, 3cpu13, 3cpu1N of the first distributed computing sub-system 1dcss1, comprises a combination of at least 7 (seven) of the validator computing nodes; said respective combination of the validator computing nodes 3cpu21, 3cpu22, 3cpu23, 3cpu2N of the second distributed computing sub-system 1dcss2, comprises a combination of at least 7 (seven) different ones of the validator computing nodes; said consensus, among the validator computing nodes of the first distributed computing sub-system 1dcss1, is a majority consensus of at least 4 (four) of the validator computing nodes of the first distributed computing sub-system; said consensus, among the validator computing nodes of the second distributed computing sub-system 1dcss2, is a majority consensus of at least 4 (four) of the validator computing nodes of the second distributed computing sub-system; and therefore, the requested action 4tran, that has been executed and recorded, had done so even under detrimental conditions comprising at least one of: (i) malfunction of one or more of the validator computing nodes 3cpu, (ii) a malicious attack on one or more of the validator computing nodes 3cpu, (iii) a communication outage affecting one or more of the validator computing nodes 3cpu, and/or (iv) a malicious behavior of one or more of the validator computing nodes 3cpu that is facilitated by an entity having access to the computing node and having a malicious intent.

In embodiments, said respective combination of the validator computing nodes 3cpu11, 3cpu12, 3cpu13, 3cpu1N of the first distributed computing sub-system 1dcss1, comprises a combination of at least 100 (one hundred) of the validator computing nodes; said respective combination of the validator computing nodes 3cpu21, 3cpu22, 3cpu23, 3cpu2N of the second distributed computing sub-system 1dcss2, comprises a combination of at least 100 (one hundred) different ones of the validator computing nodes; said consensus, among the validator computing nodes of the first distributed computing sub-system 1dcss1, is a majority consensus of at least 51 (fifty one) of the validator computing nodes of the first distributed computing sub-system; said consensus, among the validator computing nodes of the second distributed computing sub-system 1dcss2, is a majority consensus of at least 51 (fifty one) of the validator computing nodes of the second distributed computing sub-system; and therefore, the requested action 4tran, that has been executed and recorded, had done so even under extreme malicious conditions comprising a distributed denial of service attack on the sub-systems 1dcss.

In embodiments, each of the validator computing nodes 3*cpu*11, 3*cpu*12, 3*cpu*13, 3*cpu*1N of the first distributed computing sub-system 1*dcss*1 is located in a different geographical region than other validator computing nodes of the first distributed computing sub-system, e.g., in a different city, and/or a different country, and/or a different continent; each of the validator computing nodes 3*cpu*21, 3*cpu*22, 3*cpu*23, 3*cpu*2N of the second distributed computing sub-system 1*dcss*2 is located in a different geographical region than other validator computing nodes of the second distributed computing sub-system; and therefore the requested action 4tran, that has been executed and recorded, had done so even under extreme detrimental conditions comprising at least one of: (i) a natural catastrophic event such as floods and/or fire and/or (ii) global war events, affecting one or more of the geographical locations.

In embodiments, each of the validator computing nodes, e.g., 3*cpu*11, of the first distributed computing sub-system 1*dcss*1 is located in a different data center than other validator computing nodes, e.g., 3*cpu*12, of the first distributed computing sub-system 1*dcss*1; each of the validator computing nodes, e.g., 3*cpu*21, of the second distributed computing sub-system 1*dcss*2 is located in a different data center than other validator computing nodes, e.g., 3*cpu*22, of the second distributed computing sub-system 1*dcss*2; and therefore the requested action 4tran, that has been executed and recorded, had done so even under detrimental conditions affecting at least one of the data centers.

In embodiments, each of the validator computing nodes of the first distributed computing sub-system 1*dcss*1 is co-located, together with a respective one of the validator computing nodes of the second distributed computing sub-system 1*dcss*2, in the same data center; and said messages 4msg conveyed between the first distributed computing sub-system 1*dcss*1 and the second distributed computing sub-system 1*dcss*2 are intra-data center messages, e.g., the message 4msg1 is sent between network interface 3*c*11 and 3*c*21 within a first datacenter comprising the nodes 3*cpu*11 and 3*cpu*21, the message 4msg2 is sent between network interface 3*c*12 and 3*c*22 within a second datacenter comprising the nodes 3*cpu*12 and 3*cpu*22, the message 4msg3 is sent within a third datacenter comprising the nodes 3*cpu*13 and 3*cpu*23, and the message 4msgN is sent between network interface 3*c*1N and 3*c*2N within an N-th data center comprising the nodes 3*cpu*1N and 3*cpu*2N.

In embodiments, each of the validator computing nodes, e.g., 3*cpu*11, of the first distributed computing sub-system 1*dcss*1, together with a respective one of the validator computing nodes, e.g., 3*cpu*21, of the second distributed computing sub-system 1*dcss*2, constitute a part of a same validation cluster, e.g., the validation cluster 2validator1 (FIG. 1A); and each of the validation clusters 2validator (FIG. 1A) belongs to a respective ownership entity, in which each of the ownership entities is configured to participate in a PoS mechanism, in which said PoS mechanism comprises each of the respective ownership entities putting down a stake that is collected by the system in conjunction with events in which ownership entities misalign with the consensus, thereby acting as a penalty algorithm, e.g., the validation cluster 2vlaidator1 belongs to a first ownership entity associated with a first stake, the validation cluster 2vlaidator2 belongs to a second ownership entity associated with a second stake, the validation cluster 2vlaidator3 belongs to a third ownership entity associated with a third stake, and the validation cluster 2vlaidatorN belongs to an N-th ownership entity associated with an N-th stake.

In embodiments, the system is configured to take an action in conjunction with the validator computing nodes that are not aligned with the consensus, in which said action comprises at least one of: (i) excluding the misaligned validator computing node from current and/or future actions and/or (ii) resetting the misaligned validator computing node, and/or (iii) aligning the misaligned validator computing node with the consensus by at least correcting the respective state according to the state that is in consensus. For example, a consensus is reached that a correct state change, following the processing of action 4tran, is the state transition 4*c*TS to 4*n*TS for the first entity, and the state transition 5*c*TS to 5*n*TS for the second entity. However, node 3*cpu*13 has executed, for some reason, the erroneous state transition 4*c*TS to 4*n*TS99 (FIG. 1B), and consequently, node 3*cpu*23 has executed the erroneous state transition 5*c*TS to 5*n*TS99 (FIG. 1B). Since the states 4*n*TS99 and 5*n*TS99 are not in consensus, the system will take one or more of the steps mentioned above, including an attempt to correct the states 4*n*TS99 and 5*n*TS99 respectively into 4*n*TS and 5*n*TS.

In embodiments, the system further comprises a third distributed computing sub-system 1*dcss*3 (FIG. 1A, FIG. 1C), comprising a respective different combination of at least some of the validator computing nodes 3*cpu*31, 3*cpu*32, 3*cpu*33, 3*cpu*3N (FIG. 1A, FIG. 1C), and operative to redundantly store, in the respectively associated data storage spaces, a state of a third entity 1entity3 (FIG. 1A); wherein as a result of another action request 6tran (FIG. 1C) that affects the first and third entities 1entity1, 1entity3, each of at least some of the validator computing nodes of the first distributed computing sub-system 1*dcss*1 is configured to: validate 6*v* (FIG. 1C) said another action request 6tran, e.g., each of 3*cpu*11, 3*cpu*12 and 3*cpu*1N validates 4tran independently: 6*v*1, 6*v*2, 6*v*N respectively in FIG. 1C; further validate 6*v* that the state 4*n*TS, as stored in the respective data storage space, allows completion of the another action 6tran as requested; change the state 4*n*TS in the respective data storage space to reflect an initial effect of executing the another action 6tran as perceived by the first entity 1entity1, e.g., each of 3*cpu*11, 3*cpu*12 and 3*cpu*1N changes the state from 4*n*TS to a new state 6*n*TS (FIG. 1C), and stores the new state 6*n*TS locally; and consequent on said validations 6*v*, convey another message 6msg (FIG. 1C) to at least one of the validator computing nodes of the third distributed computing sub-system 1*dcss*3, e.g., 3*cpu*11 conveys a message 6msg1 to 3*cpu*31, 3*cpu*12 conveys a message 6msg2 to 3*cpu*32, and 3*cpu*1N conveys a message 6msgN to 3*cpu*3N; and wherein each of at least some of the validator computing nodes of the third distributed computing sub-system 1*dcss*3 is configured to: obtain, from at least one of the validator computing nodes of the first distributed computing sub-system 1*dcss*1, said another message 6msg, e.g., 3*cpu*31 obtains the message 6msg1 from 3*cpu*11, 3*cpu*32 obtains the message 6msg2 from 3*cpu*12, and 3*cpu*3N obtains the message 6msgN from 3*cpu*1N; and consequent on obtaining said another message 6msg, change the state in the respective data storage space to reflect a further effect of executing the another action 6tran as perceived by the third entity 1*dcss*3, e.g., each of 3*cpu*31, 3*cpu*32 and 3*cpu*3N changes the state from the current state to a new state 7*n*TS (FIG. 1C), and stores the new state 7*n*TS locally.

In embodiments, the system further comprises observational computing nodes 99*cpu* (FIG. 1B), in which at least one of the observational computing nodes is configured to: validate that a consensus exists, among the validator computing nodes of the first distributed computing sub-system 1*dcss*1, in respect to which one of: (i) the respective state change associated with the action request 4tran and/or (ii) the respective state change associated with the another action request 6tran was made first and/or is to be made first; thereby validating that a consensus exists regarding the order according to which the two actions 4tran, 6tran were and/or are to be executed, e.g., the consensus may be that action 4tran should be processed and executed before action 6tran as a result of various considerations associated, for example, with rules governing actions 4tran, 6tran that are of the same type, and with various transient consideration including which of the action requests was received first.

In embodiments, each of at least some of the validator computing nodes 3*cpu*11, 3*cpu*12, 3*cpu*13, 3*cpu*1N of the first computing sub-system 1*dcss*1 is configured to: record in a first block 4B1 (FIG. 1D), in the respective data storage space and/or a different data storage space, the state change (into 4nTS) associated with the action request 4tran, e.g., 4B1 is recorded in 3mem11 of 3*cpu*11, in 3mem12 of 3*cpu*12, and in 3mem1N of 3*cpu*1N (FIG. 1D); and record in a second block 4B2 (FIG. 1D), in the respective data storage space and/or a different data storage space, the state change (into 6nTS) associated with the another action request 6tran, e.g., 4B2 is recorded in 3mem11 of 3*cpu*11, in 3mem12 of 3*cpu*12, and in 3mem1N of 3*cpu*1N (FIG. 1D); in which said first and second blocks, 4B1 and 4B2, are linked 4L1 (FIG. 1D) so as to create a first blockchain data structure 1BC4, e.g., 3mem11 stores a first instance 1BC4copy1 (FIG. 1D) of the first blockchain data structure, 3mem12 stores a second instance 1BC4copy2 of the first blockchain data structure, and 3mem1N stores an N-th instance 1BC4copyN of the first blockchain data structure. It is noted that, as common with blockchain data structures, each block, e.g., 4B2, may contain a hash, e.g., 1*h*4B2 (FIG. 1D), of the previous block 4B1, and may further contain a proof-of-work/stake/other related data element 1PoX3 (FIG. 1D) that may have been provided by one of the nodes that was possibly designated as a lead node/block creator for the respective action using various selection/consensus mechanisms including PoW and/or PoS.

In embodiments, each of at least some of the validator computing nodes 3*cpu*21, 3*cpu*22, 3*cpu*23, 3*cpu*2N of the second computing sub-system 1*dcss*2 is configured to: record in a first block 5B1 (FIG. 1D), in the respective data storage space and/or a different data storage space, the state change (into 5nTS) associated with the action request 4tran, e.g., 5B1 is recorded in 3mem21 of 3*cpu*21, in 3mem22 of 3*cpu*22, and in 3mem2N of 3*cpu*2N (FIG. 1D); and record in a second block 5B2 (FIG. 1D), in the respective data storage space and/or a different data storage space, a state change (into 8nTS) associated with yet another action request 8ran (FIG. 1C) associated with a fourth entity, e.g., 1entityM (FIG. 1A) and respective validator computing nodes of a respective fourth distributed computing sub-system 3*cpu*M1, 3*cpu*M2, 3*cpu*M3, 3*cpu*MN, e.g., 5B2 is recorded in 3mem21 of 3*cpu*21, in 3mem22 of 3*cpu*22, and in 3mem2N of 3*cpu*2N (FIG. 1D); in which said first and second blocks, 5B1 and 5B2, are linked 5L1 (FIG. 1D) so as to create a second blockchain data structure, which is independent of the first blockchain data structure, e.g., 3mem21 stores a first instance 1BC5copy1 (FIG. 1D) of the second blockchain data structure, 3mem22 stores a second instance 1BC5copy2 of the second blockchain data structure, and 3mem2N stores an N-th instance 1BC5copyN of the second blockchain data structure. Each block, e.g., 5B2, may contain a hash, e.g., 1*h*5B2 (FIG. 1D), of the previous block 5B1, and may further contain a proof-of-work/stake/other related data element 2PoX3 (FIG. 1D).

In embodiments, the action 4tran between the first and third entities 1entity1, 1entity3 is done independently of, and therefore possibly in parallel with, the action 8tran between the second and fourth entities 1entity2, 1entityM, in which said independence is facilitated by the four respective independent distributed computing sub-systems 1*dcss*1, 1*dcss*2, 1*dcss*3, 1dsccM and the respective blockchain data structures and/or states that are generated, managed and stored independently per each of the entities 1entity1, 1entity3, 1entity2, 1entityM, and further facilitated by the fact that none of the entities of action 4tran are involved in action 8tran, and in which all of the actions 4tran, 6tran, 8tran are made in the context of a single specific set of rules 5code1.

In embodiments, said independence facilitates massive parallelism, in which at least 1,000 (one thousand) actions are made in parallel and in the context of a respective 2,000 (two thousand) different entities, all of which is made and governed in the context of a single specific set of rules 5code1 and using a respective 2,000 (two thousand) distributed computing sub-systems.

In embodiments, the first block 4B1 in the first blockchain data structure 1BC4 is linked 4L5 (FIG. 1D) with the first block 5B1 in the second data structure 1BC5; the first block 4B1 in the first blockchain data structure 1BC4 further comprises a data element 4*d* (FIG. 1D) providing information comprising at least an identification associated with the second entity 1entity2 with which the first entity 1entity1 has interacted 4tran, and optionally further providing a hash of 5B1 and further providing time of action 4tran; and the first block 5B1 in the second blockchain data structure 1BC5 further comprises a data element 5*d* (FIG. 1D) providing information comprising at least an identification associated with the first entity 1entity1 with which the second entity 1entity2 has interacted 4tran, and optionally further providing a hash of 4B1 and further providing time of action 4tran; thereby generating a multidimensional blockchain-like data structure 1BC4+1BC5.

In embodiments, the action request 4tran is made and/or approved and/or permissioned in conjunction with a cryptographic signature using a private key 1prK (FIG. 1D) associated with the first entity 1entity1 as authorization to process the action 4tran, in which said validation 4*v* of the action request comprises at least a validation of the cryptographic signature using a respective public key 1pbK (FIG. 1D) associated with said private key 1prK.

In embodiments, the action 4tran is governed by a single specific set of rules 5code1 (FIG. 1B, FIG. 1D) that are shared among the validator computing nodes 3*cpu*; and said validation v4 further comprises a validation that the action request 4tran is processed according to the rules 5code1.

In embodiments, the action 4tran is a transfer of a specific number of tokens between the first entity 1entity1 and the second entity 1entity2, in which said token is of a single specific type and the transfer is governed by a single specific set of rules 5code1 that are shared among the validator computing nodes 3*cpu*, e.g., the instructions embedded in the computer code 5code1 are stored in the memories 3mem associated with the validator computing nodes 3*cpu*, and are executed by the validator computing nodes in the context of processing the action 4tran; the state of the first entity 1entity1 is a number of tokens associated with the first entity, in which said initial effect is a deduction of the specific number of tokens in conjunction with the first entity, i.e., the initial state 4*c*TS represents the number of tokens in possession of 1entity1 prior to processing action 4tran, and the new state 4nTS represents the reduced number of tokens in possession of 1entity1 after processing action 4tran; and the state of the second entity 1entity2 is a number of tokens associated with the second entity, in which said further effect is an addition of the specific number of tokens in conjunction with the second entity, i.e., the initial state 5cTS represents the number of tokens in possession of 1entity2 prior to processing action 4tran, and the new state 5nTS represents the increased number of tokens in possession of 1entity2 after processing action 4tran.

In embodiments, said further validation 4v, that the state 4cTS allows completion of the action as requested, comprises: validating, by each of the respective validator computing nodes 3cpu11, 3cpu12, 3cpu13, 3cpu1N of the first distributed computing sub-system 1dcss1, that the specific number of tokens 4cTS registered in the respective data storage space 3mem11, 3mem12, 3mem13, 3mem1N is sufficiently large to facilitate the transfer of the specific number of tokens.

In embodiments, said validation 4v further comprises a validation that the action request 4tran is processed according to the rules 5code1, in which the rules comprise a rule associated with allowing spending the token only once, in which executing said rule comprises validating, by each of 3cpu11, 3cpu12, 3cpu13, 3cpu1N, that the specific number of tokens was not previously spent in conjunction with another action.

In embodiments, the action 4tran is a transfer of a digital asset, existing in a context of a specific digital domain such as a specific metaverse, from a first account associated with the first entity 1entity1 to a second account associated with the second entity 1entity2 and in conjunction with a single specific set of rules 5code1 defining the specific rules governing transfers in conjunction with said specific digital domain; the state 4cTS of the first entity 1entity1 is at least an indication of whether the digital asset is in possession of the first entity, in which said initial effect is an indication 4nTS that the digital asset is no longer in possession of the first entity 1entity1; and the state 5cTS of the second entity 1entity2 is at least an indication of whether the digital asset is in possession of the second entity, in which said further effect is an indication 5nTS that the digital asset is now in possession of the second entity 1entity2.

In embodiments, the action 4tran is an interaction between the first entity 1entity1 and the second entity 1entity2 existing in a context of a specific digital domain such as a specific metaverse and in conjunction with a single specific set of rules 5code1 defining the specific rules governing inter-entity interactions in conjunction with said specific digital domain; the change in state (4cTS to 4nTS) of the first entity 1entity1 is a state transition in conjunction with the first entity as a result of said interaction; and the change in state (5cTS to 5nTS) of the second entity 1entity2 is a state transition in conjunction with the second entity as a result of said interaction.

In embodiments, the action 4tran is a transfer of a non-fungible token (NFT) from a first account associated with the first entity 1entity1 to a second account associated with the second entity 1entity2 and in conjunction with a single specific set of rules 5code1 defining the specific rules governing transfers in conjunction with NFTs; the state of the first entity 4cTS is at least an indication of whether the NFT is in possession of the first entity 1entity1; and the state of the second entity 5cTS is at least an indication of whether the NFT is in possession of the second entity 1entity2.

In embodiments, said message, e.g., 4msg1, is a message confirming that the respective validator computing node, e.g., 3cpu11, of the first distributed computing sub-system 1dcss1, which issued the message, has already validated 4v1 that all conditions have been met to allow computing nodes of the second distributed computing sub-system 3cpu21, 3cpu22, 3cpu23, 3cpu2N to carry on with achieving said further effect, e.g., the transition from 5cTS to 5nTS.

In embodiments, said message 4msg comprises parameters that are needed by the computing nodes 3cpu21, 3cpu22, 3cpu23, 3cpu2N of the second distributed computing sub-system 1dcss2 to carry on with achieving said further effect, in which said parameters were included in the action request 4tran that has been distributed among the computing nodes 3cpu11, 3cpu12, 3cpu13, 3cpu1N of the first distributed computing sub-system 1dcss1.

In embodiments, the message 4msg is conveyed by each of the validator computing nodes of the first distributed computing sub-system 1dcss1 to a designated specific one of the validator computing nodes of the second distributed computing sub-system 1dcss2, so as to cause each of the validator computing nodes of the second distributed computing sub-system to receive the message exactly once. For example, 3cpu11 conveys the message 4msg1 only to 3cpu21; 3cpu12 conveys the message 4msg2 only to 3cpu22; 3cpu13 conveys the message 4msg3 only to 3cpu23; and 3cpu1N conveys the message 4msgN only to 3cpu2N.

In embodiments, the message 4msg is conveyed by each of the validator computing nodes of the first distributed computing sub-system 1dcss1 to several designated validator computing nodes of the second distributed computing sub-system 1dcss2, so as to cause each of the validator computing nodes of the second distributed computing sub-system to receive the message several times, but while changing the respective state only once. For example, 3cpu11 conveys the message 4msg1 to both 3cpu21 and 3cpu22; 3cpu12 conveys the message 4msg2 to both 3cpu22 and 3cpu23; and 3cpu13 conveys the message 4msg3 to both 3cpu23 and 3cpu2N.

In embodiments, a system comprises: a plurality of validator computing nodes associated with a respective plurality of data storage spaces; a first distributed computing sub-system, including at least a first group of the validator computing nodes, and operative to redundantly store, in the respectively associated data storage spaces, first state information associate with a first state of a first entity; and a second distributed computing sub-system, comprising a second group of the validator computing nodes, different from the first group of validator computing nodes, and operative to redundantly store, in the respectively associated data storage spaces, second state information associated with a second state of a second entity.

In embodiments, as a result of an action request associated with at least the first entity and the second entity, each of the validator computing nodes of the first group of validator computing nodes may be configured to: validate the action request; confirm that the first state of the first entity allows completion of an action associated with the action request; change the first state information based on an initial effect of executing the action associated with the action request; and after the action request is validated and the first state of the first entity is determined to allow completion of the action, convey a message to at least one of the validator computing node of the second group of validator computing nodes. In embodiments, each validator computing node of the second group of validator computing nodes may be configured to obtain, from at least one validator computing node of the first group of validator computing nodes, said message; and after obtaining said message, change the second state information associated with the second state of the second entity in the respective data storage space to reflect a further effect of executing the action.

In embodiments, one of the validator computing nodes of the first group of validator computing nodes may be designated, prior to executing the action, as a lead node; prior to said conveying of the message, each of the other validator computing nodes of the first group of validator computing nodes may be configured to obtain, from the lead node, an indication that the action is to be processed in a certain order relative to other actions; one of the validator computing nodes of the second group of validator computing nodes may be designated, prior to executing the action, as a second lead node; and prior to changing of the second state information, each of the other validator computing nodes of the second group of validator computing nodes may be configured to obtain, from the second lead node, an indication that the action is to be processed in the certain order relative to other actions.

In embodiments, one of the validator computing nodes of the first group of validator computing nodes may be selected as a lead node for enabling the action, using a selection process based on a consensus protocol; and prior to conveying the message, each of the other validator computing nodes of the first group of validator computing nodes may be configured to obtain, from the lead node, first validation information to further validate the action request before conveying the message. In embodiments, the consensus protocol may include a proof of work protocol. In embodiments, the consensus protocol may include a proof of stake protocol.

In embodiments, the system may include at least a first observational computing node configured to validate a first consensus among the first group of validator computing nodes in respect to said change of the first state information associated with the first state of the first entity.

In embodiments, the first observational computing node may be one of the first group of validator computing nodes.

In embodiments, the first observational computing node may be one of the second group of validator computing nodes.

In embodiments, each validator computing node of the first group of validator computing nodes may be located at a second geographical location; and each validator computing node of the second group of validator computing nodes may be located a second geographical location. In embodiments, the first geographical location may be different from the second geographical location. In embodiments, the first geographical location may be the same as the second geographical location.

In embodiments, each validator computing node of the first group of validator computing nodes may be located in a different geographical region than other validator computing nodes of the first validator computing system; and each validator computing node of the second group of validator computing nodes may be located in a different geographical region than other validator computing nodes of the second group of validator computing nodes.

In embodiments, each validator computing node of the first group of validator computing nodes may be co-located, together with a respective validator computing node of the second group of validator computing nodes in a first data center; and the said message conveyed between the first distributed computing sub-system and the second distributed computing sub-system may be an intra-data center message.

In embodiments, the system may include a third distributed computing sub-system, including a third group of validator computing nodes, and operative to redundantly store, in the respectively associated data storage spaces, third state information associated with a third state of a third entity. In embodiments, as a result of a second action request that affects the first and third entities, each validator computing node of the first group of validator computing nodes may be configured to validate said second action request; determine that the first state of the first entity, as stored in the respective data storage space, allows completion of the second action as requested; change the first state information of the first entity in the respective data storage space to reflect an initial effect of executing the second action as perceived by the first entity; and when the second action request is validated and the first state is determined to allow completion of the second action, convey a third message to at least one of the validator computing nodes of the third group of validator computing nodes. In embodiments, each validator computing node of the third group of validator computing nodes may be configured to: obtain, from at least one validator computing node of the first group of validating computing nodes, said third message; and after obtaining the third message, change the third state information of the third entity in the respective data storage space to reflect a further effect of executing the second action as perceived by the third entity.

In embodiments, each of at least some of the validator computing nodes of the first group of validator computing nodes may be configured to record in a first block, a first state change of the first entity associated with the first action request; and record in a second block, a second state change associated with the second action request; in which said first block and said second block are linked so as to create a first blockchain data structure.

In embodiments, the first block may be stored in a first data storage space and the second block is stored in a second data storage space and the first data storage space and the second data storage space are different.

In embodiments, the first block may be stored in a first data storage space and the second block is stored in a second data storage space and the first data storage space and the second data storage space are the same.

In embodiments, each validator computing node of the second group of validator computing nodes may be configured to: record in a third block, in the respective data storage space, a state change associated with the first action request; and record in a fourth block, in the respective data storage space, a state change associated with a third action request associated with a fourth entity and a fourth group of validator computing nodes of a respective fourth distributed computing sub-system;

in which said third and fourth blocks are linked so as to create a second blockchain data structure, which is independent of the first blockchain data structure.

In embodiments, the third block may be stored in a third data storage space and the fourth block is stored in a fourth data storage space and the third data storage space and the fourth data storage space are different.

In embodiments, the third block may be stored in a third data storage space and the fourth block is stored in a fourth data storage space and the third data storage space and the fourth data storage space are the same.

In embodiments, the first block in the first blockchain data structure may be linked with the third block in the second blockchain data structure; the first block in the first blockchain data structure further may comprise a data element providing information comprising at least an identification associated with the second entity with which the first entity has interacted; and the third block in the second blockchain data structure may further comprise a data element providing information comprising at least an identification associated with the first entity with which the second entity has interacted.

Figure 2A:
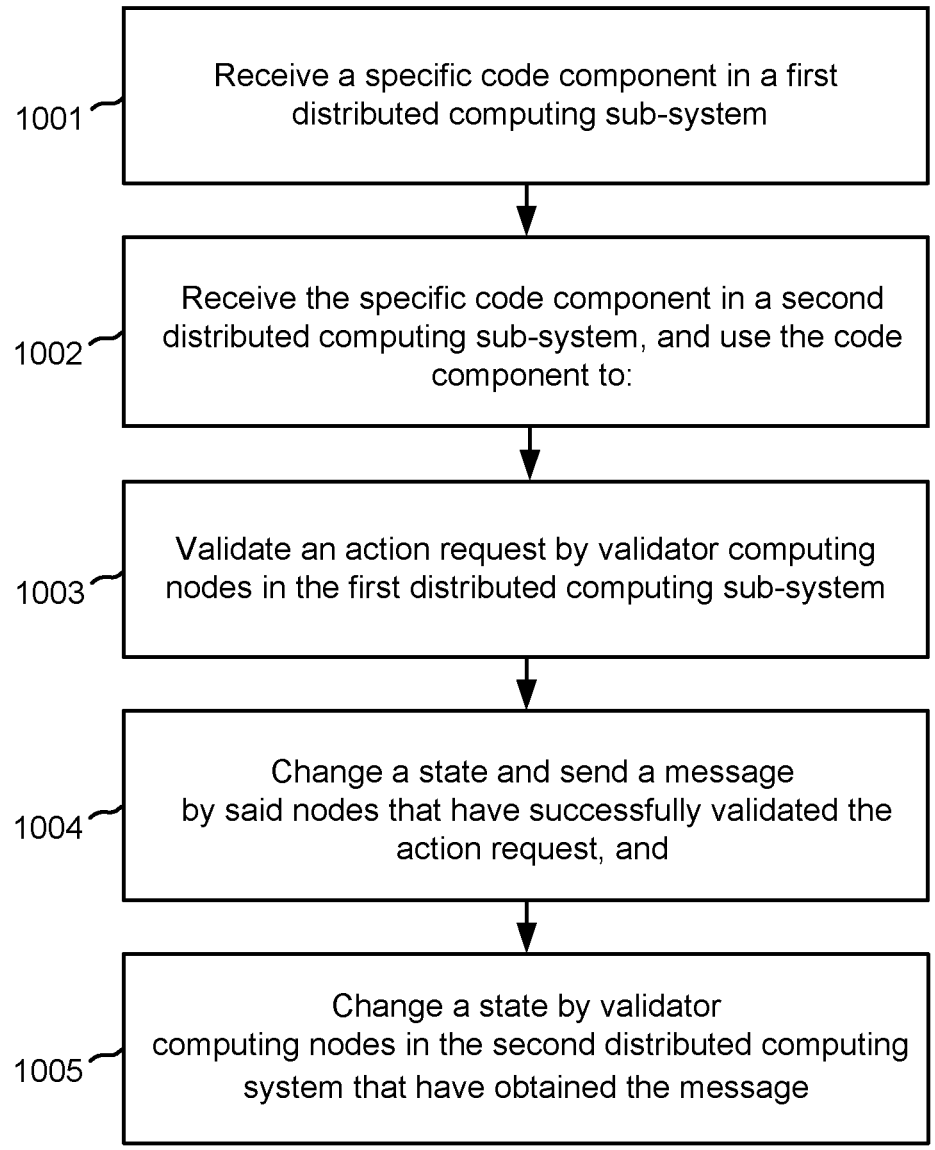
FIG. 2A illustrates a method in accordance with embodiments for combining two distributed computing sub-systems to record a single action involving at least two interacting entities.

FIG. 2A illustrates a method in embodiments for combining two distributed computing sub-systems to record a single action involving at least two interacting entities, including: in step 1001, receiving, in conjunction with each of a first plurality of validator computing nodes 3cpu11, 3cpu12, 3cpu13, 3cpu1N of a first distributed computing sub-system 1dcss1 that is associated with a first entity 1entity1, a respective copy of a specific code component 5code1 operative to govern a single specific set of rules. In step 1002, receiving, in conjunction with each of a first plurality of validator computing nodes 3cpu21, 3cpu22, 3cpu23, 3cpu2N of a second distributed computing sub-system 1dcss2 that is associated with a second entity 1entity2, a respective copy of the specific code component 5code1, and upon receiving, in conjunction with the first distributed computing sub-system 1dcss1, an action request 4tran that affects the two entities 1entity1, 1entity2 and that is made in conjunction with the single specific set of rules 5code1: using instructions embedded in the code components for: in step 1003, validating, 4v, by each of at least some of the validator computing nodes 3cpu11, 3cpu12, 3cpu13, 3cpu1N of the first distributed computing sub-system 1dcss1, (i) the action request 4tran and (ii) that a state, e.g., 4cTS, as currently registered in conjunction with the validator computing node, allows completion of the action 4tran as requested; in step 1004, changing the state, e.g., from 4cTS to 4nTS, according to the action request 4nts to reflect an initial effect of executing the action and sending a message 4msg accordingly to the second distributed computing sub-system 1dcss2, by each of the validating computing modes 3cpu11, 3cpu12, 3cpu13, 3cpu1N of the first computing sub-system 1dcss1 that has successfully completed said validation 4v; and in step 1005, changing a state, e.g., from 5cTS to 5nTS, according to the action request 4tran to reflect a further effect of executing the action, by each of the validating computing modes 3cpu21, 3cpu22, 3cpu23, 3cpu2N of the second computing sub-system 1dcss2 that has obtained at least one instance of said messages 4msg.

In embodiments, the method further comprises: in an additional step, receiving 6deliver1 (FIG. 1E), in conjunction with each of a first plurality of validator computing nodes 3cpu11, 3cpu12, 3cpu13, 3cpu1N (FIG. 1E) of the first distributed computing sub-system 1dcss1 that is associated with the first entity 1entity1, a respective copy of a different specific code component 6code1 (FIG. 1E) operative to govern a different single specific set of rules. In another additional step, receiving 6deliver2, in conjunction with each of a first plurality of validator computing nodes 3cpuM1, 3cpuM2, 3cpuM3, 3cpuMN (FIG. 1E) of a fourth distributed computing sub-system 1dcssM (FIG. 1E) that is associated with a fourth entity 1entityM (FIG. 1E), a respective copy of the different specific code component 6code1; and upon receiving, in conjunction with the first distributed computing sub-system 1dcss1, a different action request 9tran (FIG. 1E) that affects the first and fourth entities 1entity1, 1entityM and that is made in conjunction with the different single specific set of rules 6code1: using instructions embedded in the different code components 6code1 for: validating, by each of at least some of the validator computing nodes 3cpu11, 3cpu12, 3cpu13, 3cpu1N of the first distributed computing sub-system 1dcss1, (i) the different action request 9tran and (ii) that a state, e.g., 9cTS (FIG. 1E), as currently registered in conjunction with the validator computing node, allows completion of the action 9tran as requested; changing the state, e.g., from 9cTS to 9nTS, according to the action request 9tran to reflect an initial effect of executing the action and sending a message 9msg (FIG. 1E) accordingly to the fourth distributed computing sub-system 1dcssM, by each of the validating computing modes 3cpu11, 3cpu12, 3cpu13, 3cpu1N of the first computing sub-system 1dcss1 that has successfully completed said validation; and changing a state, e.g., from 10cTS to 10nTS (FIG. 1E), according to the action request 9tran to reflect a further effect of executing the action, by each of the validating computing modes 3cpuM1, 3cpuM2, 3cpuM3, 3cpuMN of the fourth computing sub-system 1dcssM that has obtained at least one instance of said messages 9msg.

In embodiments, the method further comprises: selecting, by the validating computing nodes 3cpu11, 3cpu12, 3cpu13, 3cpu1N of the first distributed computing sub-system 1dcss1, which one of the code components, 5code1 or 6code1, to use in conjunction with the actions by associating each of the action requests 4tran, 9tran with a correct one of the set of rules to use.

Figure 2B:
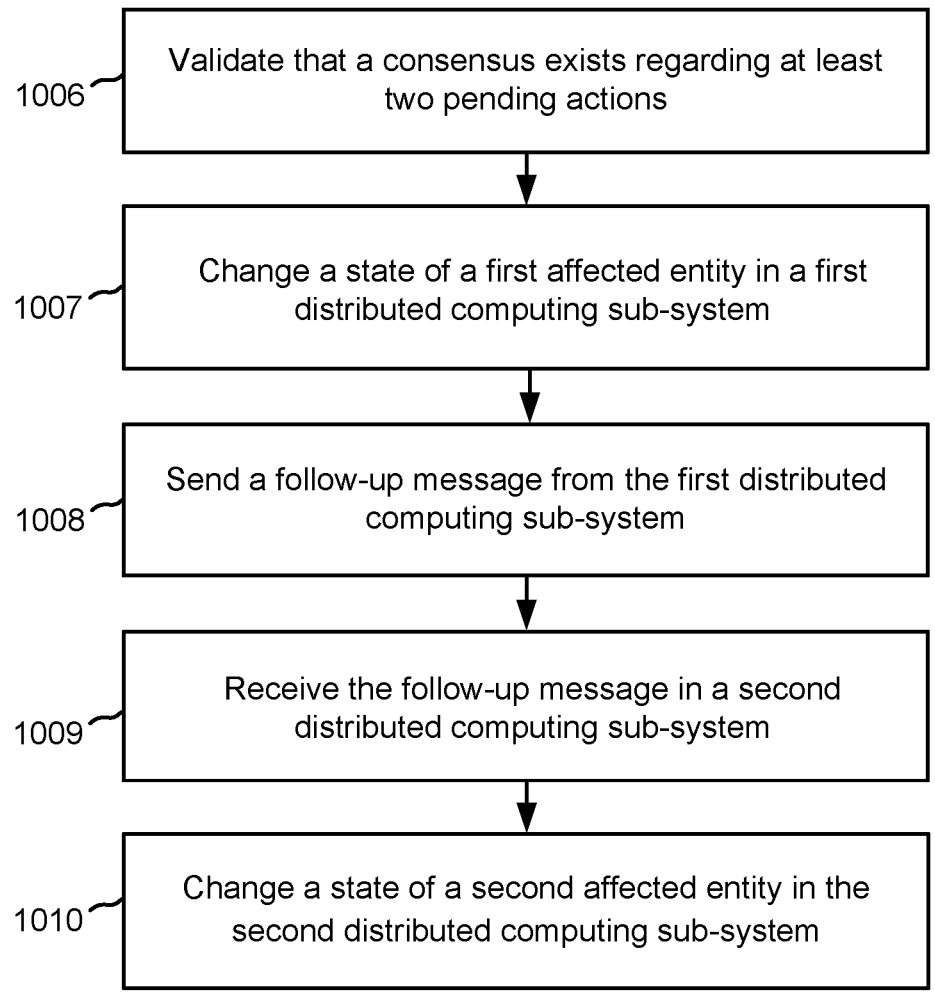
FIG. 2B illustrates a method in accordance with embodiments for combining two distributed computing sub-systems to record a single action involving at least two interacting entities.

FIG. 2B illustrates a method in accordance with embodiments for combining two distributed computing sub-systems to record a single action involving at least two interacting entities, including: in step 1006, validating, at least by one validator computing node 3cpu12 belonging to a first plurality of validator computing nodes 3cpu11, 3cpu12, 3cpu1N together constituting a first distributed computing sub-system 1dcss1 associated with a first 1entity1 of the two interacting entities 1entity1, 1entity2, that a consensus exists 4cm (FIG. 3A), among the first plurality of validator computing nodes 3cpu11, 3cpu12, 3cpu1N, regarding which, of at least two pending actions 4tran, 6tran, is to be processed first. In step 1007, processing, by at least said one validator computing node 3cpu12, the pending action 4tran that was validated to be in consensus to be processed first, in which said processing comprises at least accessing and changing, in conjunction with a data storage space 3mem12 in the first distributed computing sub-system 1dcss1, a state (4cTS changed to 4nTS) associated with the first entity 1etity1. In step 1008, sending, in conjunction with said processing, a message 4msg2, by said one validator computing node 3cpu12, to at least one validator computing node 3cpu22 belonging to a second plurality of validator computing nodes 3cpu21, 3cpu22, 3cpu2N together constituting a second distributed computing sub-system 1dcss2 associated with a second 1entity2 of the interacting entities 1entity1, 1entity2. In step 1009, receiving the message 4msg2, and/or a similar message 4msgN sent by another one 3cpu1N of the first plurality of validator computing nodes 3cpu11, 3cpu12, 3cpu1N, in at least one 3cpu22 of the second plurality of validator computing nodes 3cpu21, 3cpu22, 3cpu2N. In step 1010, consequent on said reception, continue processing, by at least said one 3cpu22 of the second plurality of validator computing nodes 3cpu21, 3cpu22, 3cpu2N that has received the message 4msg2, the pending action 4tran that was validated to be in consensus to be processed first, in which said continued processing comprises at least accessing and changing, in conjunction with a data storage space 3mem22 in the second distributed computing sub-system 1dcss2, a state (5cTS changed to 5nTS) associated with the second entity 1entity2.

In embodiments, said accessing and changing of the state (4cTS changed to 4nTS) associated with the first entity 1entity1, in conjunction with the data storage space 3mem12 of the first distributed computing sub-system 1dcss1, constitutes a mirroring, by said one validator computing node 3cpu12 belonging to the first plurality of validator computing nodes 3cpu11, 3cpu12, 3cpu1N, of multiple acts of accessing and changing of the state associated with the first entity done in conjunction with a respective multiple other data storage spaces 3mem11, 3mem1N in the first distributed computing sub-system 1dcss1 that are accessed and changed by a respective multiple others 3cpu11, 3cpu1N of the first plurality of validator computing nodes, thereby facilitating a redundant storage of the state (4cTS changed to 4nTS) associated with the first entity 1entity1; and said accessing and changing of the state (5cTS changed to 5nTS) associated with the second entity 1entity2, in conjunction with the data storage space 3mem22 of the second distributed computing sub-system 1dcss2, constitutes a mirroring, by said one 3cpu22 of the second plurality of validator computing nodes 3cpu21, 3cpu22, 3cpu2N, of multiple acts of accessing and changing of the state associated with the second entity done in conjunction with a respective multiple other data storage spaces 3mem21, 3mem2N in the second distributed computing sub-system 1dcss2 that are accessed and changed by a respective multiple others 3cpu21, 3cpu2N of the second plurality of validator computing nodes, thereby facilitating a redundant storage of the state (5cTS changed to 5nTS) associated with the second entity 1entity2.

In embodiments, said validating that the consensus exists comprises participating, by said one validator computing node 3cpu12 belonging to the first plurality of validator computing nodes 3cpu11, 3cpu12, 3cpu1N, in a consensus mechanism 4cm comprising: receiving, in conjunction with a pre-prepare phase 4cm1 (FIG. 3A), in said one validator computing node 3cpu12 belonging to the first plurality of validator computing nodes 3cpu11, 3cpu12, 3cpu1N, from another one of the validator computing nodes 3cpu11 belonging to the first plurality of validator computing nodes and acting as a lead node 4lead, a communication conveying an assumption regarding at least which, of the at least two pending actions 4tran, 6tran, is to be processed first; communicating, in conjunction with a prepare phase 4cm2 (FIG. 3A), by said one validator computing node 3cpu12 belonging to the first plurality of validator computing nodes 3cpu11, 3cpu12, 3cpu1N, with others of the validator computing nodes 3cpu11, 3cpu1N belonging to the first plurality of validator computing nodes, so as to conclude that there is an agreement among the first plurality of validator computing nodes 3cpu11, 3cpu12, 3cpu1N about said assumption regarding at least which, of the at least two pending actions 4tran, 6tran, is to be processed first; and further communicating, in conjunction with a commit phase 4cmk (FIG. 3A), by said one validator computing node 3cpu12 belonging to the first plurality of validator computing nodes 3cpu11, 3cpu12, 3cpu1N, with others of the validator computing nodes 3cpu11, 3cpu1N belonging to the first plurality of validator computing nodes, so as to make sure that at least most nodes of the first plurality of validator computing nodes have successfully completed the prepare phase 4cm2 and are therefore aware that there is an agreement among the first plurality of validator computing nodes 3cpu11, 3cpu12, 3cpu1N about said assumption regarding at least which, of the at least two pending actions 4tran, 6tran, is to be processed first.

In embodiments, said validating that the consensus exists comprises participating, by said one validator computing node 3cpu12 belonging to the first plurality of validator computing nodes 3cpu11, 3cpu12, 3cpu1N, in a consensus mechanism 4cm comprising: receiving 4cm1, in said one validator computing node belonging to the first plurality of validator computing nodes, from another one of the validator computing nodes belonging to the first plurality of validator computing nodes and acting as a lead node, a communication conveying an assumption regarding at least which, of the at least two pending actions, is to be processed first; communicating 4cm2, by said one validator computing node 3cpu12 belonging to the first plurality of validator computing nodes 3cpu11, 3cpu12, 3cpu1N, with others of the validator computing nodes belonging to the first plurality of validator computing nodes, so as to notify and get notified among the first plurality of validator computing nodes about reception of the communication 4cm1 regarding said assumption; and further communicating 4cmk, by said one validator computing node 3cpu12 belonging to the first plurality of validator computing nodes 3cpu11, 3cpu12, 3cpu1N, with others of the validator computing nodes belonging to the first plurality of validator computing nodes, so as to further notify and further get notified among the first plurality of validator computing nodes about reception of the communication 4cm2 regarding reception of the communication 4cm1 regarding said assumption; thereby allowing said one validator computing node belonging to the first plurality of validator computing nodes to conclude that a consensus exists among the first plurality of validator computing nodes regarding at least which, of the at least two pending actions, is to be processed first.

In embodiments, a system operative to combine two distributed computing sub-systems to record a single action involving at least two interacting entities comprises: a first validator computing node 3cpu12 belonging to a first plurality of validator computing nodes 3cpu11, 3cpu12, 3cpu1N together constituting a first distributed computing sub-system 1dcss1 associated with a first 1entity1 of the two interacting entities 1entity1, 1entity2; a first data storage space 3mem12 associated with the first validator computing node 3cpu12; a second validator computing node 3cpu22 belonging to a second plurality of validator computing nodes 3cpu21, 3cpu22, 3cpu2N together constituting a second distributed computing sub-system 1dcss2 associated with a second 1entity2 of the two interacting entities 1entity1, 1entity2; and a second data storage space 3mem22 associated with the second validator computing node 3cpu22.

In embodiments, the first validator computing node 3cpu12 is configured communicate with others 3cpu11, 3cpu1N of the validator computing nodes belonging to the first plurality of validator computing nodes 3cpu11, 3cpu12, 3cpu1N, so as to validate that a consensus exists 4cm (FIG. 3A), among the first plurality of validator computing nodes 3cpu11, 3cpu12, 3cpu1N, regarding which, of at least two pending actions 4tran, 6tran, is to be processed first; the first validator computing node 3cpu12 is further configured to process the pending action 4tran that was validated to be in consensus to be processed first, in which as part of said processing, the first validator computing node 3cpu12 is configured to: access and change, in conjunction with the first data storage space 3mem12, a state (4cTS changed to 4nTS) associated with the first entity 1entity1, and send a message 4msg2 to the second distributed computing sub-system 1dcss2; and the second validator computing node 3cpu22 is configured to receive the message 4msg2, and/or a similar message 4msgN sent by another one 3cpu1N of the first plurality of validator computing nodes $3cpu11$, $3cpu12$, $3cpu1N$, and consequent on said reception, continue processing the pending action 4tran that was validated to be in consensus to be processed first, in which as part of said continued processing, the second validator computing node $3cpu22$ is further configured to access and change, in conjunction with the second data storage space 3mem22, a state (5cTS changed to $5n$TS) associated with the second entity 1entity2; in which said validation, that the consensus exists 4cm, is configured to: facilitate a state-coherence among a group comprising the first storage space 3mem12 and other storage spaces 3mem11, 3mem1N associated with said others of the validator computing nodes $3cpu11$, $3cpu1N$ belonging to the first plurality of validator computing nodes $3cpu11$, $3cpu12$, $3cpu1N$ and redundantly storing said state (4cTS changed to $4n$TS) associated with the first entity 1entity1; and facilitate a state-coherence among a group comprising the second storage space 3mem22 and other storage spaces 3mem21, 3mem2N associated with others $3cpu21$, $3cpu2N$ of the validator computing nodes belonging to the second plurality of validator computing nodes $3cpu21$, $3cpu22$, $3cpu2N$ and redundantly storing said state (5cTS changed to $5n$TS) associated with the second entity 1entity2.

A method in accordance with embodiments may include validating, by a first validator computing node belonging to a first plurality of validator computing nodes of a first distributed computing sub-system associated with a first entity, that a consensus exists, among the first plurality of validator computing nodes, regarding which of a first pending action and a second pending action is to be processed first, where the first pending action is associated with the first entity and a second entity; processing, by the first validator computing node, the first pending action including accessing and changing, in conjunction with a data storage space in the first distributed computing sub-system, first state information associated with a first state associated with the first entity; after processing, sending a message, by the first validator computing node, to at least one validator computing node belonging to a second plurality of validator computing nodes of a second distributed computing sub-system associated with the second entity; receiving in at least one validator computing node of the second plurality of validator computing nodes, the message; and processing, by said at least one validator computing node of the second plurality of validator computing nodes, the first pending action including at least accessing and changing, in conjunction with a data storage space in the second distributed computing sub-system, second state information associated with a second state of the second entity.

A microservice architecture is a distributed computer architecture that breaks an application into a collection of independent "simple" function-oriented services, communicating through existing networks using technology-agnostic protocols, and activating each other using remote procedure calls (RPC). Microservice architecture is the de-facto standard of backend systems servicing modern Internet-based applications. In a Byzantine Fault (BF) condition that may affect computing nodes running microservices, a node can inconsistently appear functioning/non-functioning to an observer, as a result of a malicious attack, a simple malfunction, or other conditions, and consequently jeopardize system integrity while disrupting correct execution of related applications. Methods and systems are required to transform existing microservice architecture into an architecture that is capable of both fault tolerance including Byzantine Fault Tolerance (BFT) and decentralized operation, which are critical for Web 3.0 applications such as cryptocurrency, smart contracts, decentralized social-networks/autonomous-organizations, and metaverses.

In embodiments, a redundant decentralized microservice architecture, in which each of at least selected some of the microservices is executed multiple times by multiple microservice computing nodes acting as mirror sites after reaching a consensus regarding the correct way/order in which the microservices are to be executed. Clusters of redundant microservice computing nodes work in intra-cluster consensus when responding to remote RPCs by activating the associated microservices multiple times, and then sending multiple RPCs to additional clusters of redundant microservice computing nodes. The process may repeat as a chain of inter-cluster microservice activation events that facilitate execution of multiple different microservices together constituting a single operation that is executed resiliently even under the most detrimental fault conditions, thus achieving fault tolerant computing that combines multiple mirror sites, multiple operators, consensus mechanisms and cryptography to achieve censorship resistance, decentralized operation and Byzantine Fault Tolerant computing utilizing microservices.

Figure 3A:
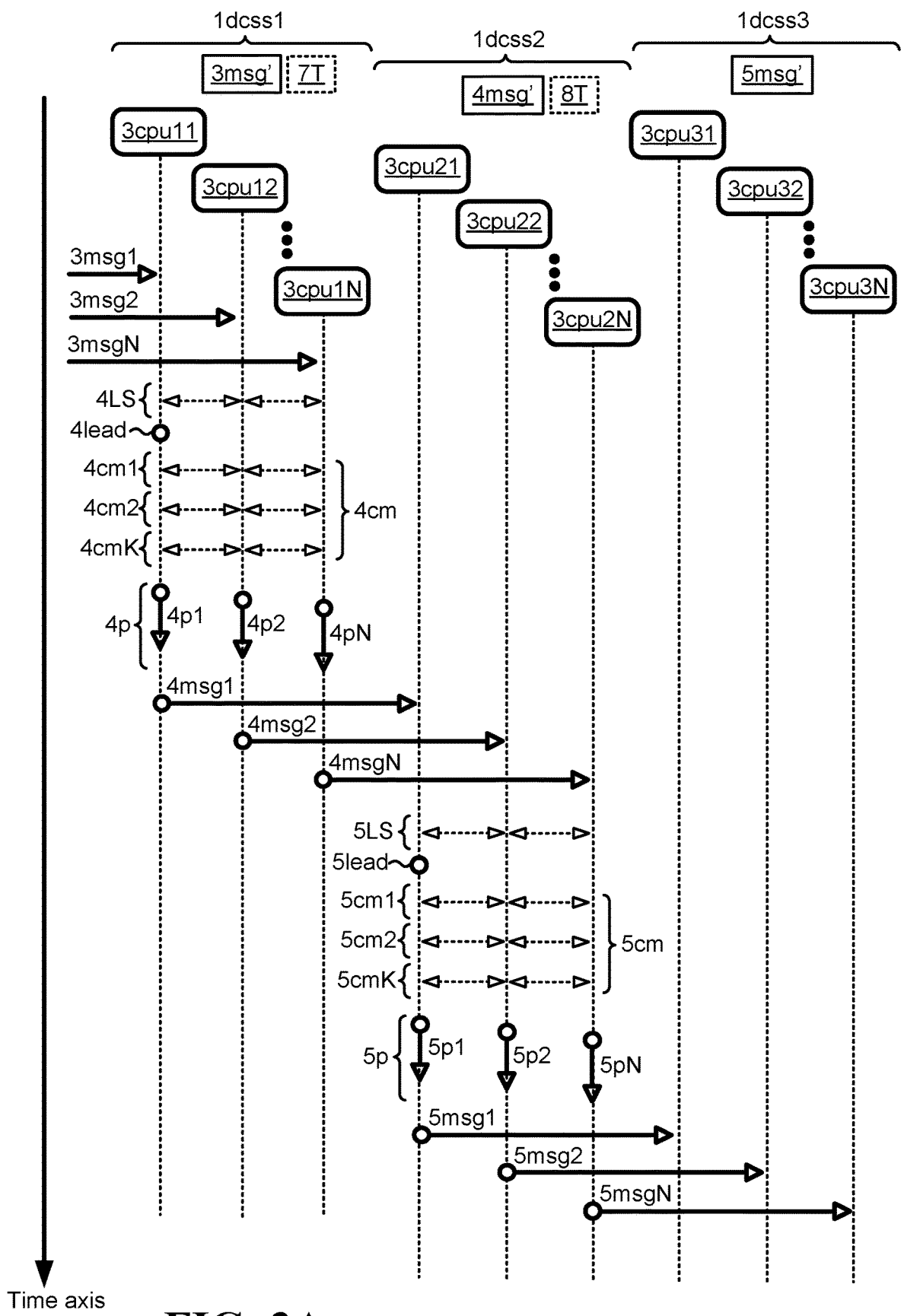
FIG. 3A illustrates several distributed computing sub-systems made in accordance with embodiments interacting with each other in the context of activating and processing microservices while showing signal propagation between the various sub-systems as well as various processes executed inside the various sub-systems.

FIG. 3A illustrates an exemplary embodiment of several distributed computing sub-systems $1dcss1$, $1dcss2$, $1dcss3$, interacting with each other in the context of activating and processing microservices while showing signal propagation between the various sub-systems as well as various processes executed inside the various sub-systems.

In embodiments, computing sub-system $1dcss1$ receives a single message 3msg' multiple times respectively via multiple procedure calls 3msg1, 3msg2, 3msgN, in which the single message 3msg' is an instruction to activate a certain microservice 7T. The message 3msg' is made available 3msg1, 3msg2, 3msgN to several microservice computing nodes $3cpu11$, $3cpu12$, $3cpu1N$ of the computing sub-system $1dcss1$, with the intention of executing 4p the same microservice 7T several times 4p1, 4p2, 4pN as a way to achieve redundancy and consequently fault tolerance. However, execution of the same microservice 7T several times 4p1, 4p2, 4pN respectively by the several microservice computing nodes $3cpu11$, $3cpu12$, $3cpu1N$ should be done in a way that assures consistent results by hopefully all, or at least most, of the microservice computing nodes $3cpu11$, $3cpu12$, $3cpu1N$, and therefore certain mechanisms should be in place to assure coherent behavior of the different computing nodes $3cpu11$, $3cpu12$, $3cpu1N$, in which such mechanisms can be executed in a decentralized fashion that avoids a centralized/single point of failure.

In embodiments, a mechanism 4cm is in place to assure coherent behavior of the different microservice computing nodes $3cpu11$, $3cpu12$, $3cpu1N$ in responding to a request 3msg' to execute microservice 7T, in which such mechanism may be a consensus mechanism. In a consensus mechanism 4cm, the different nodes $3cpu11$, $3cpu12$, $3cpu1N$ of computing sub-system $1dcss1$ communicate with each other a series of messages that, eventually, brings a majority of the nodes $3cpu11$, $3cpu12$, $3cpu1N$ to a state of consensus regarding a correct response to and/or a way of handling the activation message 3msg'. For example, the consensus may be with respect to agreeing that indeed microservice 7T was requested 3msg', and/or with respect to agreeing to a timing of executing the microservice 7T in conjunction with other events in the sub-system $1dcss1$ or external to the sub-system, and/or with respect to agreeing to the order in which microservice 7T needs to be executed in conjunction with other requests pending in the sub-system $1dcss1$. Such a consensus can assure, for example, state coherence between the different nodes 3*cpu*11, 3*cpu*12, 3*cpu*1N, since any change in the way/order of executing microservice 7T may result in different resultant states for some of the nodes 3*cpu*11, 3*cpu*12, 3*cpu*1N, which may create an uncertainty regarding what is the correct state of the system, and assuming that the system must produce a single coherent state.

In embodiments, the consensus mechanism 4*cm* includes three phases 4cm1, 4cm2, 4cmK, that are designed to achieve, in a decentralized fashion, a consensus regarding how/when to handle execution of microservice 7T. In the first phase 4cm1, the different nodes 3*cpu*11, 3*cpu*12, 3*cpu*1N of computing sub-system 1*dcss*1 are being informed of an assumption according to which microservice 7T is to be executed. For example, the assumption may be a supposition that microservice 7T needs to be executed in a certain order relative to other events, in which such supposition may be produced by a node, e.g., 3*cpu*11, that was selected 4LS, optionally in a decentralized fashion, as a lead node 4lead. The other nodes in computing sub-system 1*dcss*1 validate the supposition using information in their disposal, e.g., using 3msg'. In the second phase 4cm2, each of the nodes of computing sub-system 1*dcss*1 checks with the other nodes that they have received and validated the supposition, and in the third phase 4cmK, each of the nodes of computing sub-system 1*dcss*1 checks with the other nodes that they have completed successfully the second phase, and if so, then the system is in a state of consensus, in which each of the nodes 3*cpu*11, 3*cpu*12, 3*cpu*1N knows for sure that each of the other nodes also knows for sure that the supposition is known and accepted by all, or at least a majority, of the nodes 3*cpu*11, 3*cpu*12, 3*cpu*1N of computing sub-system 1*dcss*1. The three phases 4cm1, 4cm2, 4cmK are a way of achieving a Byzantine Fault Tolerance (BFT) in conjunction with consenting on the supposition at hand, and are related to Practical Byzantine Fault Tolerance (PBFT) techniques that are designed as a practical solution against a malicious, e.g., byzantine, attempts by some of the nodes to disrupt proper operation of the microservice system.

In embodiments, after a consensus has been achieved regarding the way/order to execute microservice 7T, each of the different nodes 3*cpu*11, 3*cpu*12, 3*cpu*1N executes independently 4*p*1, 4*p*2, 4*p*N the microservice 7T, so as to produce several results that are, hopefully, a same single result or at least predominantly a same single result. It is noted that the nodes may choose to start executing the microservice 7T even before a consensus is reached, as long as the result/state of executing 7T is not finalized/committed prior to achieving said consensus.

In embodiments, after executing the same microservice 7T several times by the several microservice computing nodes 3*cpu*11, 3*cpu*12, 3*cpu*1N of the computing sub-system 1*dcss*1, the results of executing the same microservice 7T may require further activation of other microservices, e.g., the activation of microservice 8T. In that case, each of the nodes 3*cpu*11, 3*cpu*12, 3*cpu*1N may independently send a procedure call 4msg1, 4msg2, 4msgN, which may be a remote procedure call (RPC), to the nodes 3*cpu*21, 3*cpu*22, 3*cpu*2N of another computing sub-system 1*dcss*2, instructing them 4msg' to execute the microservice 8T as a follow-up to microservice 7T that was already executed. Each the RPCs 4msg1, 4msg2, 4msgN is depicted as being sent by one nodes of 1*dcss*1 to one of the nodes of 1*dcss*2, but a single node may send multiple RPCs to multiple nodes, provided that all RPCs 4msg1, 4msg2, 4msgN convey the same activation message 4msg'.

In embodiments, computing sub-system 1*dcss*2 receives the single activation message 4msg' multiple times respectively via multiple procedure calls 4msg1, 4msg2, 4msgN, in which the single message 4msg' is an instruction to activate microservice 8T. The message 4msg' is made available 4msg1, 4msg2, 4msgN to several microservice computing nodes 3*cpu*21, 3*cpu*22, 3*cpu*2N of the computing sub-system 1*dcss*2, with the intention of executing 5*p* the same microservice 8T several times 5*p*1, 5*p*2, 5*p*N as a way to achieve redundancy and consequently fault tolerance. However, execution of the same microservice 8T several times 5*p*1, 5*p*2, 5*p*N respectively by the several microservice computing nodes 3*cpu*21, 3*cpu*22, 3*cpu*2N is done in a way that assures consistent results by hopefully all, or at least most, of the microservice computing nodes 3*cpu*21, 3*cpu*22, 3*cpu*2N, and therefore a consensus mechanism 5*cm* is used again.

In embodiments, a mechanism 5*cm* is in place to assure coherent behavior of the different microservice computing nodes 3*cpu*21, 3*cpu*22, 3*cpu*2N in responding to a request 4msg' to execute microservice 8T, in which such mechanism may be a consensus mechanism similar to mechanism 4*cm*.

In embodiments, the consensus mechanism 5*cm* includes three phases 5cm1, 5cm2, 5cmK, that are designed to achieve, in a decentralized fashion, a consensus regarding how/when to handle execution of microservice 8T, in a similar fashion to phases 4cm1, 4cm2, 4cmK. In the first phase 5cm1, the different nodes 3*cpu*21, 3*cpu*22, 3*cpu*2N of computing sub-system 1*dcss*2 are being informed of an assumption according to which microservice 8T is to be executed, in which such assumption may be suggested in a supposition produced by a node, e.g., 3*cpu*21, that was selected 5LS, optionally in a decentralized fashion, as a lead node 5lead. In the second phase 5cm2, each of the nodes of computing sub-system 1*dcss*2 checks with the other nodes that they have received and validated the supposition, and in the third phase 5cmK, each of the nodes of computing sub-system 1*dcss*2 checks with the other nodes that they have completed successfully the second phase, and if so, then the system is in a state of consensus, in which each of the nodes 3*cpu*21, 3*cpu*22, 3*cpu*2N knows for sure that each of the other nodes of computing sub-system 1*dcss*2 also knows for sure that the supposition is known and accepted by all, or at least a majority, of the nodes 3*cpu*21, 3*cpu*22, 3*cpu*2N of computing sub-system 1*dcss*2.

In embodiments, after a consensus have been achieved regarding the way/order to execute microservice 8T, each of the different nodes 3*cpu*21, 3*cpu*22, 3*cpu*2N executes independently 5*p*1, 5*p*2, 5*p*N the microservice 8T, so as to produce several results that are, hopefully, a same single result or at least predominantly a same single result.

In embodiments, after executing the same microservice 8T several times by the several microservice computing nodes 3*cpu*21, 3*cpu*22, 3*cpu*2N of the computing sub-system 1*dcss*2, the results of executing the same microservice 8T may require further activation of yet another microservices. In that case, each of the nodes 3*cpu*21, 3*cpu*22, 3*cpu*2N may independently send a procedure call 5msg1, 5msg2, 5 msgN, which may be an RPC, to the nodes 3*cpu*31, 3*cpu*32, 3*cpu*3N of yet another computing sub-system 1*dcss*3, instructing them 5msg' to execute the yet another microservice as a follow-up to microservice 8T that was already executed.

Figure 3B:
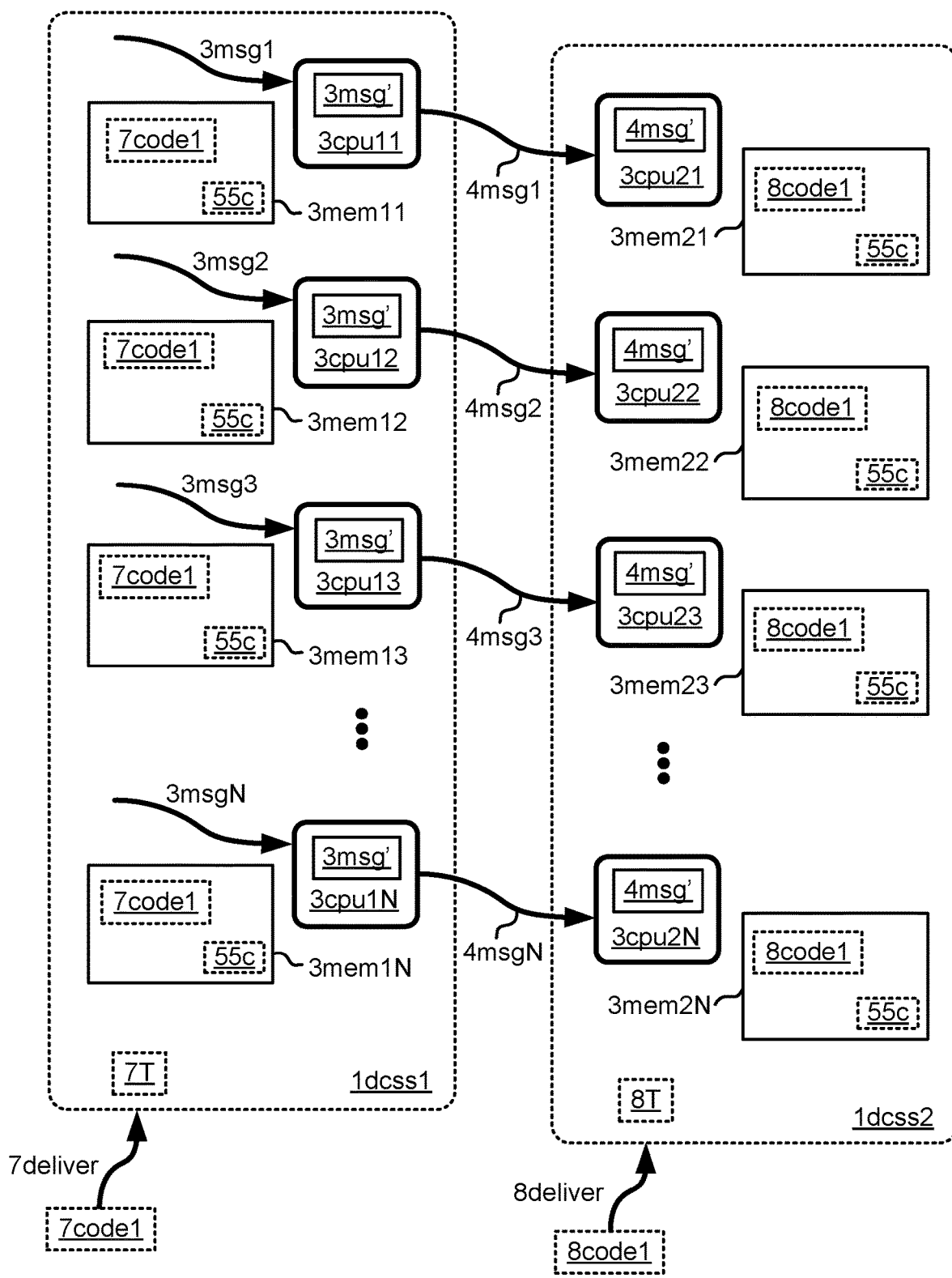
FIG. 3B illustrates the distributed computing sub-systems made in accordance with embodiments interacting with a second distributed computing sub-system in the context of executing two microservice tasks.

FIG. 3B illustrates one of the distributed computing sub-systems 1*dcss*1 made in embodiments interacting with a second distributed computing sub-system 1*dcss*2 in the context of executing two microservice tasks 7T, 8T.

In embodiments, data storage spaces 3mem11, 3mem12, 3mem13, 3mem1N are associated respectively with microservice computing nodes 3cpu11, 3cpu12, 3cpu13, 3cpu1N of computing sub-system 1dcss1. Each of the nodes 3cpu11, 3cpu12, 3cpu13, 3cpu1N receives 7deliver an executable code 7code1 operative to execute the microservice 7T and stores the executable code 7code1 in the respective data storage space 3mem11, 3mem12, 3mem13, 3mem1N. When RPCs 3msg1, 3msg2, 3 msg3, 3msgN are received by the respective nodes 3cpu11, 3cpu12, 3cpu13, 3cpu1N with the instruction 3msg' to execute microservice 7T, each of the microservice computing nodes 3cpu11, 3cpu12, 3cpu13, 3cpu1N utilizes the respective executable code 7code1 to independently execute microservice 7T.

In embodiments, data storage spaces 3mem21, 3mem22, 3mem23, 3mem2N are associated respectively with microservice computing nodes 3cpu21, 3cpu22, 3cpu23, 3cpu2N of computing sub-system 1dcss2. Each of the nodes 3cpu21, 3cpu22, 3cpu23, 3cpu2N receives 8deliver an executable code 8code1 operative to execute the microservice 8T and stores the executable code 8code1 in the respective data storage space 3mem21, 3mem22, 3mem23, 3mem2N. When RPCs 4msg1, 4msg2, 4msg3, 4msgN are received by the respective nodes 3cpu21, 3cpu22, 3cpu23, 3cpu2N with the instruction 4msg' to execute microservice 8T, each of the microservice computing nodes 3cpu21, 3cpu22, 3cpu23, 3cpu2N utilizes the respective executable code 8code1 to independently execute microservice 8T.

In embodiments, the reception/delivery of the activation messages 3msg', 4msg', the execution of the consensus mechanisms 4cm, 5cm, and all other functions described in embodiments associated with sub-systems 1dcss2, 1dcss2, 1dcss3, 1dcssM, are all governed and implemented by executable code components 55c stored in the respective data memory spaces 3mem that may be non-transitory. Code components 55c may be non-transitory as well.

Figure 3C:
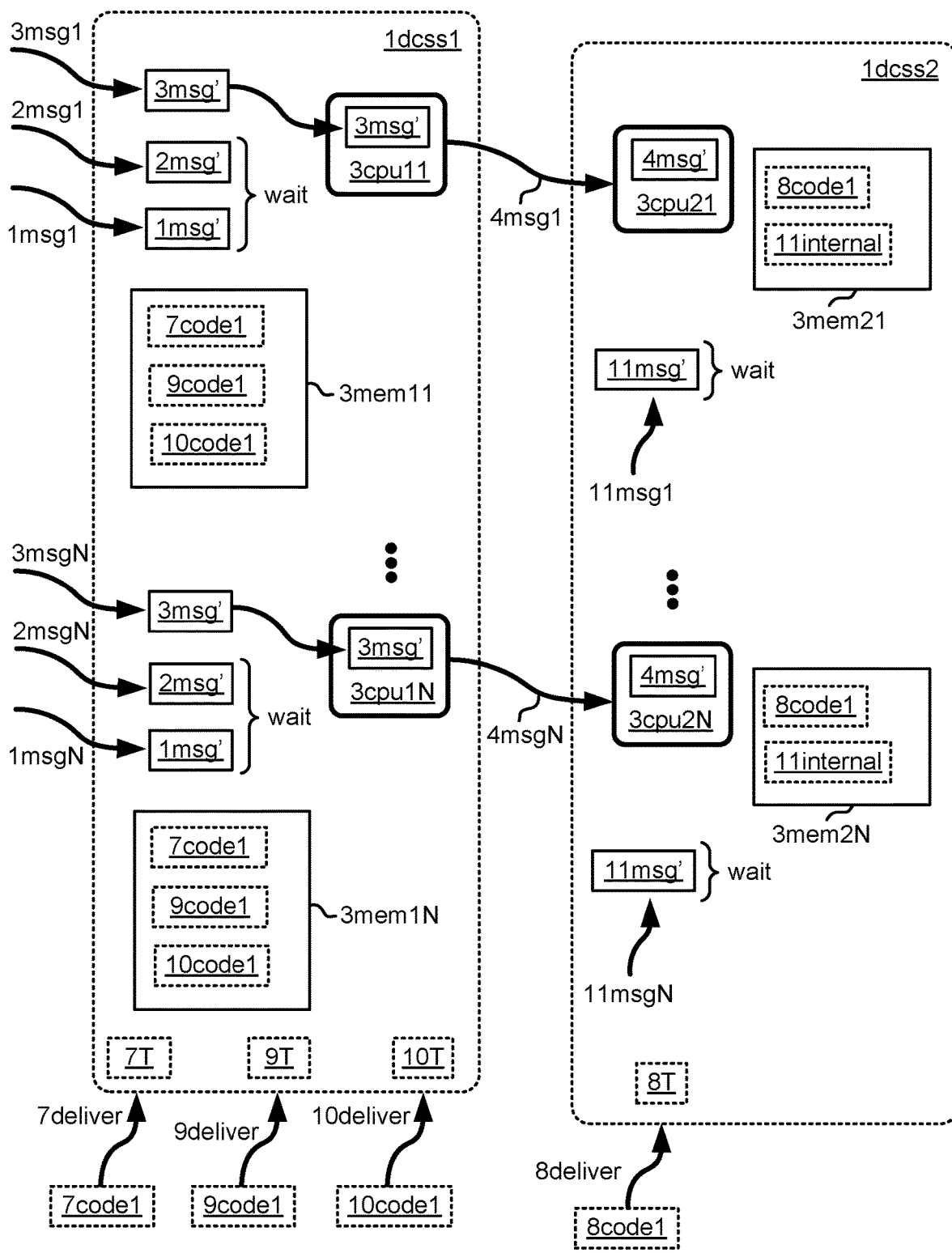
FIG. 3C illustrates one of the distributed computing sub-systems made in accordance with embodiments interacting with a second distributed computing sub-system in the context of reaching a consensus regarding an order to process pending requests to execute microservices.

FIG. 3C illustrates one of the distributed computing sub-systems 1dcss1 made in accordance with embodiments interacting with a second distributed computing sub-system 1dcss2 in the context of reaching a consensus regarding an order to process pending requests to execute microservices.

In embodiments, the microservice computing nodes 3cpu11, 3cpu1N of distributed computing sub-system 1dcss1 (and additional nodes of 1dcss1 not depicted) receive multiple requests to execute microservices, in which the multiple requests include: the request 3msg' to execute microservice 7T, received in 3cpu11, 3cpu1N respectively via RPCs 3msg1, 3msgN, the request 2msg' to execute microservice 9T, received in 3cpu11, 3cpu1N respectively via RPCs 2msg1, 2msgN, and the request 1msg' to execute microservice 10T, received in 3cpu11, 3cpu1N respectively via RPCs 1msg1, 1msgN.

In embodiments, the microservice computing nodes 3cpu11, 3cpu1N of distributed computing sub-system 1dcss1 (and additional nodes of 1dcss1 not depicted) need to reach a consensus regarding which of the pending requests 3msg', 2msg', 1msg' to execute first. The order in which to execute the pending requests 3msg', 2msg', 1msg' is critical in some embodiments, since a state of the system, such as a state in accordance with some embodiments, may depend on the order of executing the requests. In one embodiment, the lead node 4lead, e.g., node 3cpu11, makes a suggestion, as part of a consensus mechanism 4cm, to respond to 3msg' before responding to 2msg' and 1msg', perhaps since 3msg' was received in 3cpu11 via the respective RPC before 2msg' and 1msg'. Now, the other nodes of 1dcss1, e.g., node 3cpu1N, may agree to such a suggestion, perhaps because they also observe that they have received 3msg', via their respective RPCs, before 2msg' and 1msg', or perhaps they observe that they have received 3msg' slightly after 2msg' and 1msg', but still accept node 3cpu11 supposition that it has observed 3msg' to have been received first. The consensus mechanism 4cm is then executed further by the nodes of 1dcss1 completing the phases of 4cm under the supposition that 3msg' is to be handled first, in accordance with some embodiments, and pending reaching a consensus, the nodes 3cpu11, 3cpu1N of distributed computing sub-system 1dcss1 go ahead with executing the microservice 7T requested in 3msg', and consequently sending the resultant RPCs 4msg1, 4msgN with a consequent request 4msg' for 1dcss1 to execute another microservice 8T. A further consensus mechanism may be now executed in 1dcss1 to decide which of the remaining requests 2msg', 1msg' to handle next, thereby determining which of the microservices 9T, 10T is next in line for processing. It is noted that the executable codes 7code1, 9code1, 10code1 operative to execute microservices 7T, 9T, 10T are delivered 7deliver, 9deliver, 10deliver to be stored in the respective data memory spaces 3mem11, 3mem1N of nodes 3cpu11, 3cpu1N (and additional nodes of 1dcss1 not depicted) prior to reception of the activation requests 3msg', 2msg', 1msg', or perhaps as a payload of the RPCs conveying the activation requests 3msg', 2msg, 1msg.

In embodiments, the microservice computing nodes 3cpu21, 3cpu2N of distributed computing sub-system 1dcss2 (and additional nodes of 1dcss2 not depicted) need to reach a consensus regarding which of the pending requests 4msg', 11msg' to execute first, in which 11msg' is an internal request/interrupt/event generated inside 1dcss2. The order in which to execute the pending requests 4msg', 11msg' is critical in some embodiments, since a state of the system may depend on the order of executing the requests. In one embodiment, the lead node 5lead, e.g., node 3cpu21, makes a suggestion, as part of a consensus mechanism 5cm, to respond to 4msg' before responding to 11msg', perhaps since 4msg' was received in 3cpu21 via the respective RPC before 11msg' was generated internally. Now, the other nodes of 1dcss2, e.g., node 3cpu2N, may agree to such a suggestion, perhaps because they also observe that they have received 4msg', via their respective RPCs, before 11msg' was generated internally, or perhaps they observe that they have received 4msg' slightly after 11msg' was generated, but still accept node 3cpu21 supposition that it has observed 4msg' to have been received first. The consensus mechanism 5cm is then executed further by the nodes of 1dcss2 completing the phases of 5cm under the supposition that 4msg' is to be handled first, in accordance with some embodiments, and pending reaching a consensus, the nodes 3cpu21, 3cpu2N of distributed computing sub-system 1dcss2 go ahead with executing the microservice 8T requested in 4msg'. After execution of microservice 8T by the nodes of 1dcss2, they can now go ahead with handling the internal request by executing a related executable code 11internal which is stored in the respective data storage spaces 3mem21, 3mem2N of nodes 3cpu21, 3cpu2N.

In embodiments, the agreement regarding processing request 3msg' before processing the other pending requests 2msg', 1msg' in 1dcss1, and the agreement regarding processing request 4msg' before processing the other pending requests 11msg' in 1dcss2, are reached together, and not as two separate agreements made in conjunction with the two separate consensus mechanisms 4cm, 5cm. For example, the lead nodes 4lead/3cpu11, 5lead/3cpu21 may signal to the other nodes in 1dcss1 and 1dcss2 regarding an assumption that request 3msg' is to be processed before processing the other pending requests 2msg', 1msg' in 1dcss1, and regarding an assumption that request 4msg' is to be processed before processing the other pending requests 11msg' in 1dcss2. The nodes in 1dcss1 and 1dcss2 listening to the signals from the lead node/s start executing the microservice 7T in 1dcss1 and the follow-up microservice 8T in 1dcss2, before responding to 2msg', 1msg', 11msg', and without executing any consensus mechanism, as a "leap of faith" and under a supposition that the lead nodes have made a reasonable assumption. After the execution sequence 7T+8T is done by the nodes in 1dcss1 and 1dcss2, a single consensus is made, in retrospect, for the entire sequence. 7T+8T, in which the nodes reach an agreement that execution of the sequence 7T+8T prior to serving 2msg', 1msg', 11msg' was indeed warranted. If such a retrospective consensus was not reached, then the nodes may decide to "undo the entire sequence. 7T+8T", and instead go with serving 2msg', 1msg', 11msg' first. If such a retrospective consensus was successfully reached, then the "leap of faith" execution of the sequence 7T+8T is made final/immutable/blockchained by the nodes in 1dcss1 and 1dcss2, in accordance with some embodiments. In one embodiment, only the lead nodes, e.g., 4lead/3cpu11, 5lead/3cpu21, execute the sequence 7T+8T to conclusion, thereby gaining a "lookahead" understanding that the sequence 7T+8T can be treated as a "single and finite execution event" to be validated by the other nodes in conjunction with a single "aggregated" consensus mechanism for 7T+8T, and only then followed-up by the other nodes that execute the same sequence 7T+8T prior to serving 2msg', 1msg', 11msg'. In one embodiment, the aggregated consensus mechanism for 7T+8T in 1dcss1 and 1dcss2 is executed in parallel to other consensus mechanisms, aggregated or not-aggregated, running in distributed computing sub-systems other than 1dcss1 and 1dcss2. In one embodiment, the decision to aggregate consensus mechanisms, e.g., to aggregate 4cm and 5cm into one consensus mechanism for sequence 7T+8T, is done based on timing, e.g., every 1 to 100 milliseconds, for example, every "system tick" of 10 milliseconds.

Figure 3D:
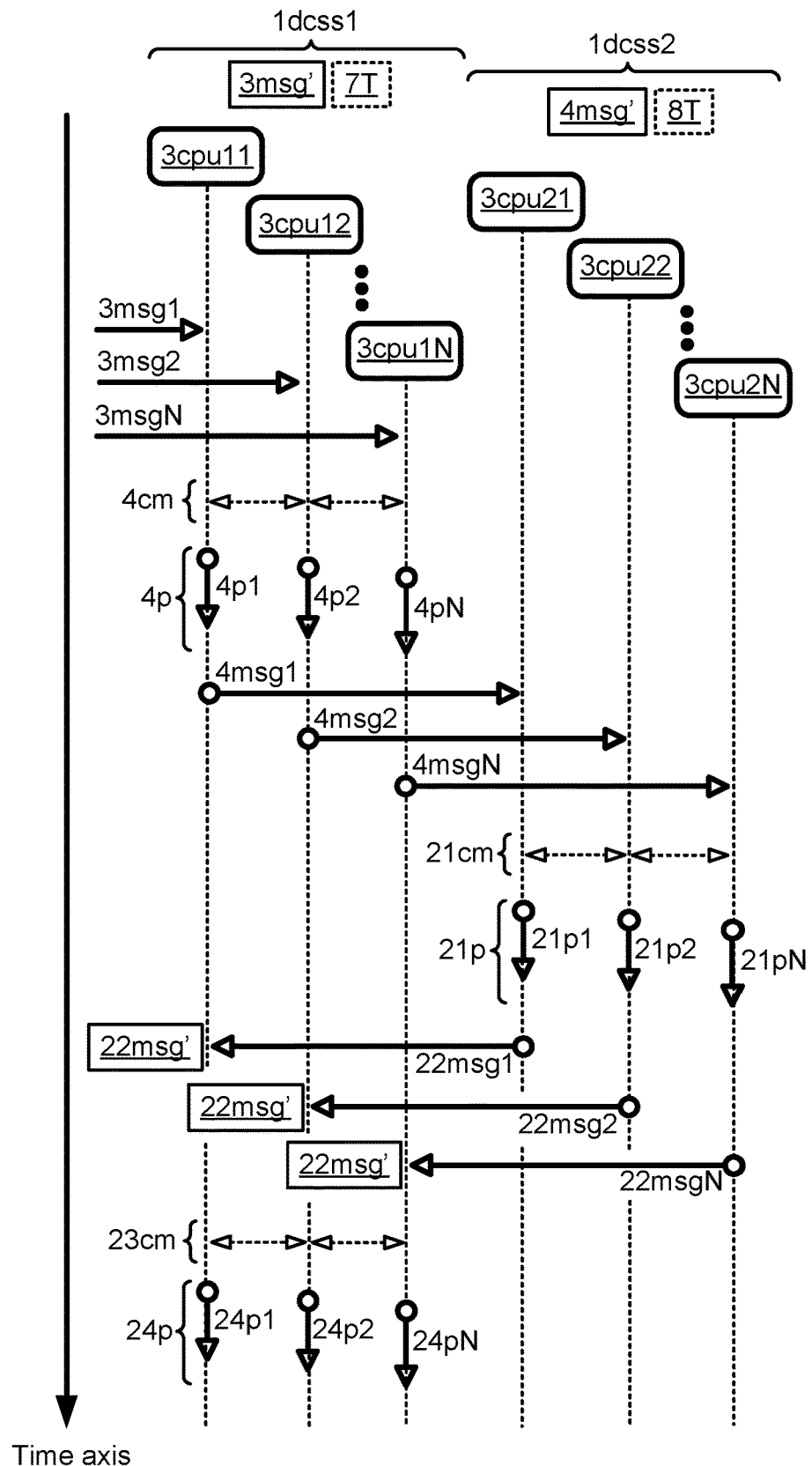
FIG. 3D illustrates two distributed computing sub-systems made in accordance with embodiments interacting with each other in the context of activating and processing a single microservice while showing back-and-forth signal propagation between the two sub-systems as well as various processes executed inside the two sub-systems.

FIG. 3D illustrates two distributed computing sub-systems 1dcss1, 1dcss1 made in accordance with embodiments interacting with each other in the context of activating and processing a single microservice 8T while showing back-and-forth signal propagation between the two sub-systems as well as various processes executed inside the two sub-systems.

In embodiments, computing sub-system 1dcss1 is made aware 3msg1, 3msg2, 3msgN of a trigger 3msg' to activate a certain process 7T. A mechanism 4cm is in place to assure coherent behavior of the computing nodes 3cpu11, 3cpu12, 3cpu1N of 1dcss1 in responding to trigger 3msg' to execute process 7T, in which such mechanism may be a consensus mechanism in accordance with some embodiments. After a consensus have been achieved regarding execution of process 7T, each of the different nodes 3cpu11, 3cpu12, 3cpu1N executes independently 4p1, 4p2, 4pN the process 7T, so as to produce several identical/redundant results. After executing the same process 7T several times by the several computing nodes 3cpu11, 3cpu12, 3cpu1N of the computing sub-system 1dcss1, the results of executing the same process 7T may require an activation of a microservices, e.g., the activation of microservice 8T. In that case, each of the nodes 3cpu11, 3cpu12, 3cpu1N may independently send a procedure call 4msg1, 4msg2, 4msgN, which may be a remote procedure call (RPC), to the microservice nodes 3cpu21, 3cpu22, 3cpu2N of another computing sub-system 1dcss2, instructing them 4msg' to execute the microservice 8T.

In embodiments, computing sub-system 1dcss2 receives the single activation message 4msg' multiple times respectively via the multiple procedure calls 4msg1, 4msg2, 4msgN, in which the single message 4msg' is an instruction to activate microservice 8T. The message 4msg' is made available 4msg1, 4msg2, 4msgN to several microservice computing nodes 3cpu21, 3cpu22, 3cpu2N of the computing sub-system 1dcss2, with the intention of executing 21p the same microservice 8T several times 21p1, 21p2, 21pN as a way to achieve redundancy and consequently fault tolerance. However, execution of the same microservice 8T several times 21p1, 21p2, 21pN respectively by the several microservice computing nodes 3cpu21, 3cpu22, 3cpu2N can be done in a way that assures consistent results by hopefully all, or at least most, of the microservice computing nodes 3cpu21, 3cpu22, 3cpu2N, and therefore a consensus mechanism 21cm is used again.

In embodiments, a mechanism 21cm is in place to assure coherent behavior of the different microservice computing nodes 3cpu21, 3cpu22, 3cpu2N in responding to a request 4msg' to execute microservice 8T, in which such mechanism may be a consensus mechanism similar to mechanism 4cm. In one embodiment, consensus mechanism 21cm includes three phases that are designed to achieve, in a decentralized fashion, a consensus regarding how/when to handle execution of microservice 8T, in a similar fashion to phases 4cm1, 4cm2, 4cmK. In the first phase of 21cm, the different nodes 3cpu21, 3cpu22, 3cpu2N of computing sub-system 1dcss2 are informed of an assumption according to which microservice 8T is to be executed, in which such assumption may be suggested in a supposition produced by a node, e.g., 3cpu21, that was selected, optionally in a decentralized fashion, as a lead node. In the second phase of 21cm, each of the nodes of computing sub-system 1dcss2 checks with the other nodes that they have received and validated the supposition, and in the third phase of 21cm, each of the nodes of computing sub-system 1dcss2 checks with the other nodes that they have completed successfully the second phase, and if so, then the system is in a state of consensus, in which each of the nodes 3cpu21, 3cpu22, 3cpu2N knows for sure that each of the other nodes of computing sub-system 1dcss2 also knows for sure that the supposition is known and accepted by all, or at least a majority, of the nodes 3cpu21, 3cpu22, 3cpu2N of computing sub-system 1dcss2.

In embodiments, after a consensus have been achieved regarding the way/order to execute microservice 8T, each of the different nodes 3cpu21, 3cpu22, 3cpu2N executes independently 21p1, 21p2, 21pN the microservice 8T, so as to produce several results 22msg' that are, hopefully, a same single result or at least predominantly a same single result.

In embodiments, after executing the same microservice 8T several times by the several microservice computing nodes 3cpu21, 3cpu22, 3cpu2N of the computing sub-system 1dcss2, the results 22msg' of executing the same microservice 8T are fed back to computing nodes 3cpu11, 3cpu12, 3cpu1N of 1dcss1 that await a response/result of 8T. In that case, each of the nodes 3cpu21, 3cpu22, 3cpu2N may independently send a message 22msg1, 22msg2, 22 msgN conveying the result 22msg' to the nodes 3cpu11, 3cpu12, 3cpu31N of computing sub-system 1dcss1.

In embodiments, computing sub-system 1dcss1 is made aware 22msg1, 22msg2, 22 msgN of result 22msg'. A mechanism 23cm is in place to assure coherent behavior of the computing nodes 3cpu11, 3cpu12, 3cpu1N of 1dcss1 in responding to response 22msg', in which such mechanism may be a consensus mechanism in accordance with some embodiments. After a consensus have been achieved regarding how/when to respond to response 22msg', each of the different nodes 3*cpu*11, 3*cpu*12, 3*cpu*1N processes independently 24*p*1, 24*p*2, 24*p*N the same response to 22msg', so as to produce several identical/redundant results. After processing the same response to 22msg' several times by the several computing nodes 3*cpu*11, 3*cpu*12, 3*cpu*1N of the computing sub-system 1*dcss*1, the results may require an activation of additional microservices or internal processes, or the entire process may come to an end.

In embodiments, a resilient microservice system comprises: a plurality of microservice computing nodes 3*cpu* (FIG. 1A); a first distributed computing sub-system 1*dcss*1 (FIG. 1A) comprising a respective combination of at least some of the microservice computing nodes 3*cpu*11, 3*cpu*12, 3*cpu*1N (FIG. 1A); and a second distributed computing sub-system 1*dcss*1 (FIG. 1A), comprising a respective different combination of at least some of the microservice computing nodes 3*cpu*21, 3*cpu*22, 3*cpu*2N (FIG. 1A).

In embodiments, as a result of at least some procedure-calls 3msg1, 3msg2, 3msgN (FIG. 3A) all conveying a same first message 3msg' (FIG. 3B) that were made available to the first distributed computing sub-system 1*dcss*1, each of at least some of the nodes 3*cpu*11, 3*cpu*12, 3*cpu*1N in the first distributed computing sub-system 1*dcss*1 is configured to: execute, in conjunction with at least some of the other nodes of the first distributed computing sub-system 1*dcss*1, a consensus mechanism 4*cm* (FIG. 3A) associated with the first message 3msg'; process 4*p* (FIG. 3A) the first message; and provided that an agreement has been reached in conjunction with said consensus mechanism 4*cm*, send a remote-procedure-call (RPC) 4msg1, 4msg2, 4msgN (FIG. 3A) conveying a second message 4msg', which is consequent on said processing 4*p*, to at least one of the nodes 3*cpu*21, 3*cpu*22, 3*cpu*2N of the second distributed computing sub-system 1*dcss*2; so as to result in the second distributed computing sub-system 1*dcss*2 receiving at least some of the RPCs 4msg1, 4msg2, 4msgN conveying the same second message 4msg'.

In embodiments, as a result of at least some of the RPCs 4msg1, 4msg2, 4msgN conveying the same second message 4msg' that have arrived in the second distributed computing sub-system 1*dcss*2, each of at least some of the nodes 3*cpu*21, 3*cpu*22, 3*cpu*2N in the second distributed computing sub-system 1*dcss*2 is configured to: execute, in conjunction with at least some of the other nodes of the second distributed computing sub-system 1*dcss*2, a consensus mechanism 5*cm* (FIG. 3A) associated with the second message 4msg'; process 5*p* (FIG. 3A) the second message 4msg'; and provided that an agreement has been reached in conjunction with said consensus mechanism 5*cm* and the second message 4msg', send an RPC 5msg1, 5msg2, 5 msgN (FIG. 3A) conveying a third message 5msg', which is consequent on said processing 5*p* of the second message 4msg', to at least one of the nodes 3*cpu*31, 3*cpu*32, 3*cpu*3N (FIG. 3A) of a third distributed computing sub-system 1*dcss*3; so as to result in the third distributed computing sub-system 1*dcss*3 receiving at least some of the RPCs 5msg1, 5msg2, 5 msgN conveying the same third message 5msg'.

In embodiments, as a result of at least some of the RPCs 5msg1, 5msg2, 5 msgN conveying the same message 5msg' that have arrived in the third distributed computing sub-system 1dscss3, each of at least some of the nodes 3*cpu*31, 3*cpu*32, 3*cpu*3N in the third distributed computing subsystem 1*dcss*3 may be configured to: execute, in conjunction with at least some of the other nodes of the third distributed computing sub-system 1*dcss*3, a consensus algorithm (not depicted) associated with the third message 5msg'; process the third message 5msg'; and provided that an agreement has been reach in conjunction with said consensus algorithm and third message 5msg', send an RPC message conveying a fourth message, which is consequent on said processing of the third message 5msg', to at least one of the nodes of a fourth distributed computing sub-system 1*dcss*4; so as to the result in the fourth distributed computing sub-system 1*dcss*4 receiving at least some of the RPCs conveying the same fourth message. In embodiments, the message may be propagated to any number (e.g., five, ten, fifty, one-hundred, one thousand, ten thousand, to name a few examples) of distributed computing sub-systems.

In embodiments, the microservice computing nodes 3*cpu*11, 3*cpu*12, 3*cpu*1N of the first distributed computing sub-system 1*dcss*1 are associated respectively with data storage spaces 3mem11, 3mem12, 3mem1N (FIG. 3B), in which each of the data storage spaces is configured to store a same executable code 7code1 (FIG. 3B) operative to execute a same first microservice task 7T (FIG. 3B); said procedure-calls 3msg1, 3msg2, 3msgN conveying the first message 3msg' are remote-procedure calls (RPCs) received in the first distributed computing sub-system 1*dcss*1 and associated with activation of the first microservice task 7T; and said processing 4*p* of the first message 3msg', by each of at least some of the nodes 3*cpu*11, 3*cpu*12, 3*cpu*1N in the first distributed computing sub-system 1*dcss*1, comprises executing the respective executable code 7code1 in the respective data storage space 3mem11, 3mem12, 3mem1N, thereby performing the same first microservice task 7T at least several times respectively by several of the nodes 3*cpu*11, 3*cpu*12, 3*cpu*1N in the first distributed computing sub-system 1*dcss*1 as a reaction to said RPCs 3msg1, 3msg2, 3msgN conveying the first message 3msg'.

In embodiments, the microservice computing nodes 3*cpu*21, 3*cpu*22, 3*cpu*2N of the second distributed computing sub-system 1*dcss*2 are associated respectively with data storage spaces 3mem21, 3mem22, 3mem2N (FIG. 3B), in which each of the data storage spaces of the second distributed computing sub-system 1*dcss*2 is configured to store a same executable code 8code1 (FIG. 3B) operative to execute a same second microservice task 8T (FIG. 3B); said RPCs 4msg1, 4msg2, 4msgN conveying the second message 4msg' are associated with activation of the second microservice task 8T; and said processing 5*p* of the second message 4msg', by each of at least some of the nodes 3*cpu*21, 3*cpu*22, 3*cpu*2N in the second distributed computing sub-system 1*dcss*2, comprises executing the respective executable code 8code1 of the second microservice task 8T in the respective data storage space 3mem21, 3mem22, 3mem2N, thereby performing the same second microservice task 8T at least several times respectively by several of the nodes 3*cpu*21, 3*cpu*22, 3*cpu*2N in the second distributed computing sub-system 1*dcss*2 as a reaction to said RPCs 4msg1, 4msg2, 4msgN conveying the second message 4msg'; in which the first and second microservice tasks 7T, 8T are designed to run in a sequence, and in conjunction with said consensuses 4*cm*, 5*cm* in the first and second distributed computing sub-system 1*dcss*1, 1*dcss*2, thereby achieving at least an initial execution of a single operation 7T+8T that comprises at least the first and second microservice tasks 7T, 8T.

In embodiments, said (i) consensus mechanisms 4*cm*, 5*cm* and agreements in the first and second distributed computing sub-system 1*dcss*1, 1*dcss*2, in conjunction with (ii) said execution of the first and second microservice tasks 7T, 8T multiple times respectively by the nodes of first and second distributed computing sub-systems 1dcss1, 1dcss2, and further in conjunction with (iii) said multiple RPCs 3msg1, 3msg2, 3msgN, 4msg1, 4msg2, 4msgN associated with the first and second messages 3msg', 4msg', are together operative to assure fault tolerance in face of failure/s occurring in some of the nodes, thereby assuring resiliency in conjunction with said at least an initial execution of the single operation 7T+8T that comprises at least the first and second microservice tasks 7T, 8T.

In embodiments, said fault tolerance is a byzantine-fault-tolerance (BFT), in which some of the nodes 3cpu11, 3cpu12, 3cpu1N, 3cpu21, 3cpu22, 3cpu2N operate maliciously against proper operation of the microservice system.

In embodiments, said agreement reached in the first distributed computing sub-system 1dcss1 is an agreement to perform the first microservice task 7T as identified in the RPCs 3msg1, 3msg2, 3msgN conveying the first message 3msg'; and said agreement reached in the second distributed computing sub-system 1dcss2 is an agreement to perform the second microservice task 8T as identified in the RPCs 4msg1, 4msg2, 4msgN conveying the second messages 4msg'.

In embodiments, said agreement reached in the first distributed computing sub-system 1dcss1 is an agreement regarding an order in which the RPCs 3msg1, 3msg2, 3msgN conveying the first message 3msg' have been received in the first distributed computing sub-system 1dcss1 relative to other messages 1msg', 2msg' (FIG. 3C) received in the first distributed computing sub-system; and said agreement reached in the second distributed computing sub-system 1dcss2 is an agreement regarding an order in which the RPCs 4msg1, 4msg2, 4msgN conveying the second message 4msg' have been received in the second distributed computing sub-system 1dcss2 relative to other messages 11msg' (FIG. 3C) received in the second distributed computing sub-system.

In embodiments, said agreement reached in the first distributed computing sub-system 1dcss1 is an agreement regarding an authority of an entity, e.g., 1entityM, that has generated the first message 3msg', to do so.

In embodiments, said agreement reached in the first distributed computing sub-system 1dcss1 is an agreement regarding a result of said processing 4p of the first message 3msg', and consequently an agreement regarding a content conveyed in the second message 4msg'.

In embodiments, at least some of the microservice computing nodes 3cpu11, 3cpu12, 3cpu1N of the first distributed computing sub-system 1dcss1 are further configured to send, in conjunction with said second message 4msg', a proof that said agreement has actually been reached; and as a result of at least some of the RPCs 4msg1, 4msg2, 4msgN conveying the same second message 4msg' that have arrived in the second distributed computing sub-system 1dcss2, each of at least some of the nodes 3cpu21, 3cpu22, 3cpu2N in the second distributed computing sub-system is configured to process 5p the second message 4msg' provided at least that said proof is present in conjunction with said second message.

In embodiments, said consensus mechanism 4cm is associated with a byzantine-fault-tolerance (BFT) consensus mechanism, in which as part of reaching said agreement, said at least some of the nodes 3cpu11, 3cpu12, 3cpu1N in the first distributed computing sub-system 1dcss1 are configured to participate in an iterative multi-phase process comprising: a first phase 4cm1 (FIG. 3A), in which said nodes 3cpu11, 3cpu12, 3cpu1N are configured to communicate among themselves at least a certain suggested detail related to the first message 3msg'; a second phase 4cm2 (FIG. 3A), in which said nodes 3cpu11, 3cpu12, 3cpu1N are configured to concur regarding said certain suggested detail, by further communicating among themselves; and a third phase 4cmK (FIG. 3A), in which said nodes 3cpu11, 3cpu12, 3cpu1N are configured to commit, by still further communicating among themselves, about said concurring regarding said certain suggested detail.

In embodiments, said certain suggested detail is a certain suggested order in which the first message 3msg' should be processed relative to other incoming messages 1msg', 2msg'.

In embodiments, said consensus mechanism 4cm is associated with a practical-byzantine-fault-tolerance (PBFT) consensus mechanism, in which as part of reaching said agreement, said at least some of the nodes 3cpu11, 3cpu12, 3cpu1N in the first distributed computing sub-system 1dcss1 are configured to participate in an iterative multi-phase process comprising: a pre-prepare phase 4cm1, in which said nodes 3cpu11, 3cpu12, 3cpu1N are configured to communicate among themselves at least a certain suggested detail related to the first message 3msg'; a prepare phase 4cm2, in which said nodes 3cpu11, 3cpu12, 3cpu1N are configured to concur regarding said certain suggested detail, by further communicating among themselves; and a commit phase 4cmK, in which said nodes 3cpu11, 3cpu12, 3cpu1N are configured to concur, by still further communicating among themselves, regarding a content of the second message 4msg' that is consequent on said certain suggested detail.

In embodiments, said certain suggested detail is a certain suggested order in which the first message 3msg' should be processed relative to other incoming messages 1msg', 2msg'.

In embodiments, as a result of at least some of the RPCs 4msg1, 4msg2, 4msgN conveying the same second message 4msg' that have arrived in the second distributed computing sub-system 1dcss2, each of at least some of the nodes 3cpu21, 3cpu22, 3cpu2N in the second distributed computing sub-system 1dcss2 is configured to: execute, in conjunction with at least some of the other nodes 3cpu21, 3cpu22, 3cpu2N of the second distributed computing sub-system 1dcss2, a consensus mechanism 21cm (FIG. 3D) associated with the second message 4msg'; process 21p (FIG. 3D) the second message 4msg'; and provided that an agreement has been reached in conjunction with said consensus mechanism 21cm and the second message 4msg', send back a response 22msg1, 22msg, 22msgN (FIG. 3D) conveying a third message 22msg', which is consequent on said processing 21p of the second message 4msg', to at least one of the nodes 3cpu11, 3cpu12, 3cpu1N of a first distributed computing sub-system 1dcss1; so as to result in the first distributed computing sub-system 1dcss1 receiving back at least some of the responses 22msg1, 22msg, 22msgN conveying the same third message 22msg'.

In embodiments, as a result of at least some of the responses 22msg1, 22msg, 22msgN conveying the same third message 22msg' that have arrived in the first distributed computing sub-system 1dcss1, each of at least some of the nodes 3cpu11, 3cpu12, 3cpu1N in the first distributed computing sub-system is configured to: execute, in conjunction with at least some of the other nodes 3cpu11, 3cpu12, 3cpu1N of the first distributed computing sub-system 1dcss1, a consensus mechanism 23cm (FIG. 3D) associated with the third message 22msg'; process 24p (FIG. 3D) the third message 22msg' as being a response to the second message 4msg'; and provided that an agreement has been reached in conjunction with said consensus mechanism 23cm and the third message 22msg', use a result of said processing 24p of the third message 22msg' for further processing.

In embodiments, each of the microservice computing nodes 3cpu11, 3cpu12, 3cpu1N of the first distributed computing sub-system 1dcss1 is located in a different data center 2validator1, 2validator2, 2validatorN than other microservice computing nodes of the first distributed computing sub-system; each of the microservice computing nodes 3cpu21, 3cpu22, 3cpu2N of the second distributed computing sub-system 1dcss2 is located in a different data center 2validator1, 2validator2, 2validatorN than other microservice computing nodes of the second distributed computing sub-system; said agreement reached, in conjunction with the consensus mechanism 4cm, has been reached in conjunction with inter-data center communication 2validator1, 2validator2, 2validatorN between the different microservice computing nodes of the first distributed computing sub-system 3cpu11, 3cpu12, 3cpu1N, in which such inter-data center communication is facilitated using the Internet and/or dedicated communication links and in conjunction with the respective network interfaces 3c11, 3c12, 3c1N; and said agreement has been reached even under detrimental conditions affecting some of the data centers 2validator1, 2validator2, 2validatorN and/or the Internet and/or the dedicated communication links.

In embodiments, each of at least some of the microservice computing nodes 3cpu11, 3cpu12, 3cpu1N of the first distributed computing sub-system 1dcss1 is co-located, together with at least a respective one of the microservice computing nodes 3cpu21, 3cpu22, 3cpu2N of the second distributed computing sub-system 1dcss2, in the same data center; and said RPCs 4msg1, 4msg2, 4msgN conveyed between the first distributed computing sub-system 1dcss1 and the second distributed computing sub-system 1dcss2 are intra-data center RPCs, in which such intra-data center RPCs are facilitated using data networks internal to the data centers 2validator1, 2validator2, 2validatorN.

In embodiments, each of at least some of the microservice computing nodes 3cpu11, 3cpu12, 3cpu1N of the first distributed computing sub-system 1dcss1, together with at least a respective one of the microservice computing nodes 3cpu21, 3cpu22, 3cpu2N of the second distributed computing sub-system 1dcss2, constitute a part of a same validation cluster, e.g., 3cpu11 and 3cpu21 constitute a part of the same validation cluster 2validator1; and each of at least some of the validation clusters 2validator1, 2validatorN belongs to a respective ownership entity 2entity1, 2entityN, in which each of the ownership entities is configured to participate in a PoS mechanism, in which said PoS mechanism comprises each of the respective ownership entities 2entity1, 2entityN putting down a stake that is collected by the system in conjunction with events in which nodes controlled by specific ownership entity misalign with the agreement reached in conjunction with the consensus mechanism 4cm and/or with other agreed behavior of the nodes, thereby acting as a penalty mechanism.

In embodiments, one of the microservice computing nodes of the first distributed computing sub-system 1dcss1, e.g., 3cpu11, is designated 4LS (FIG. 3A) a lead node 4lead (FIG. 3A) after providing a respective stake in conjunction with a PoS mechanism; and as part of said consensus mechanism 4cm, each of the other microservice computing nodes, e.g., 3cpu12, 3cpu1N, of the first distributed computing sub-system 1dcss1 is configured to obtain, from the lead node 4lead, an indication confirming and/or informing which verifiable assumptions associated with the first message 3msg' are to be agreed upon in conjunction with the consensus mechanism 4cm.

In embodiments, the lead node 4lead, e.g., 3cpu11, contrary to the other nodes of the first distributed computing sub-system 1dcss1, is configured to go ahead with said sending of the respective RPCs, e.g., 4msg1, before reaching said agreement, thereby providing a fast hint regarding a probable content of the second message 4msg'.

In embodiments, said first message 3msg' is associated with an action request 4tran; said first distributed computing sub-system 1dcss1 is associated with a first entity 1entity1 affected by the action request 4tran; said second distributed computing sub-system 1dcss2 is associated with a second entity 1entity2 affected by the action request 4tran; the microservice computing nodes 3cpu11, 3cpu12, 3cpu1N, 3cpu21, 3cpu22, 3cpu2N are validator computing nodes; said processing 4p is associated with a change of a state 4cTS, 4nTS to reflect an initial effect of executing the action as perceived by the first entity; and said second message 4msg' is a message from the first entity 1entity1 to the second entity 1entity2 triggering the second entity to change a local state 5cTS, 5nTS to reflect a further effect of executing the action as perceived by the second entity.

In embodiments, said first message 3msg' is associated with a request made by a user of the first distributed computing sub-system 1dcss1; said processing 4p is associated with serving said request; and said second message 4msg' is at least one consequent of said serving of the request.

In embodiments, said respective combination of the microservice computing nodes 3cpu11, 3cpu12, 3cpu1N of the first distributed computing sub-system 1dcss1, comprises a combination of at least 5 (five) of the microservice computing nodes; said respective combination of the microservice computing nodes 3cpu21, 3cpu22, 3cpu2N of the second distributed computing sub-system 1dcss2, comprises a combination of at least 5 (five) different ones of the microservice computing nodes; said agreement, among the microservice computing nodes 3cpu11, 3cpu12, 3cpu1N of the first distributed computing sub-system 1dcss1, is a consensus of the microservice computing nodes of the first distributed computing sub-system; and therefore, the second message 4msg', that have been sent multiple times 4msg1, 4msg2, 4msgN via RPCs, had done so even under detrimental conditions comprising at least one of: (i) malfunction of one or more of the microservice computing nodes 3cpu, (ii) a malicious attack on one or more of the microservice computing nodes, (iii) a communication outage affecting one or more of the microservice computing nodes, and/or (iv) a malicious behavior of one or more of the microservice computing nodes that is facilitated by an entity having access to the computing node and having a malicious intent.

In embodiments, said respective combination of the microservice computing nodes 3cpu11, 3cpu12, 3cpu1N of the first distributed computing sub-system 1dcss1, comprises a combination of at least 100 (one hundred) of the microservice computing nodes; said respective combination of the microservice computing nodes 3cpu21, 3cpu22, 3cpu2N of the second distributed computing sub-system 1dcss2, comprises a combination of at least 100 (one hundred) different ones of the microservice computing nodes; said agreement, among the microservice computing nodes 3cpu11, 3cpu12, 3cpu1N of the first distributed computing sub-system 1dcss1, is a majority consensus of at least 51 (fifty one) of the microservice computing nodes of the first distributed computing sub-system; and therefore, the second message 4msg', that has been sent multiple times 4msg1, 4msg2, 4msgN via RPCs, had done so even under extreme malicious conditions comprising a distributed denial of service attack on the sub-systems 1$dcss$1, 1$dcss$2.

In embodiments, each of the microservice computing nodes 3$cpu$11, 3$cpu$12, 3$cpu$1N of the first distributed computing sub-system 1$dcss$1 is located in a different geographical region than other microservice computing nodes of the first distributed computing sub-system; each of the microservice computing nodes 3$cpu$21, 3$cpu$22, 3$cpu$2N of the second distributed computing sub-system 1$dcss$2 is located in a different geographical region than other microservice computing nodes of the second distributed computing sub-system; and therefore, the second message 4msg', that has been sent multiple times 4msg1, 4msg2, 4msgN via RPCs, had done so even under extreme detrimental conditions comprising at least one of: (i) a natural catastrophic event such as floods and/or fire and/or (ii) global war events, affecting one or more of the geographical locations.

In embodiments, a resilient microservice system comprises: a plurality of microservice computing nodes; a first distributed computing sub-system comprising at least a first group of microservice computing nodes of the plurality of microservice computing nodes; and a second distributed computing sub-system, comprising at least a second group of microservice computing nodes of the plurality of microservice computing nodes, the second group of microservice computing nodes being different from the first group of microservice computing nodes.

In embodiments, as a result of a first message made available in the first distributed computing sub-system, each microservice computing node of the first group of microservice computing nodes may be configured to: execute, in conjunction with at least some of the other microservice computing nodes of the first group of microservice computing nodes, a consensus scheme associated with the first message; process the first message; and when a first agreement has been reached among the first group of microservice computing nodes in conjunction with said consensus scheme, send a remote procedure call conveying a second message, which is consequent on said processing of the first message, to at least one of the microservice computing nodes of the second group of microservice computing nodes of the second distributed computing sub-system. In embodiments, the second distributed computing sub-system may receive at least the remote procedure call conveying the second message.

In embodiments, as a result of receiving the remote procedure call conveying the second message in the second distributed computing sub-system, each microservice computing node of the second group of microservice computing nodes in the second distributed computing sub-system may be configured to: execute, in conjunction with at least some other microservice computing nodes of the second group of microservice computing nodes, a consensus scheme associated with the second message; process the second message; and when a second agreement has been reached among the second group of microservice computing nodes in conjunction with said consensus scheme and the second message, send a second remote procedure call conveying a third message, which is consequent on said processing of the second message, to at least one microservice computing node of a third group of microservice computing nodes of a third distributed computing sub-system; so as to result in the third distributed computing sub-system receiving at least the second procedure call conveying the third message.

In embodiments, the first group of microservice computing nodes of the first distributed computing sub-system may be associated respectively with data storage spaces and each of the data storage spaces is configured to store first executable code operative to execute a first microservice task; said first message may be associated with activation of the first microservice task; and processing of the first message by each microservice computing node of the first group of microservice computing nodes in the first distributed computing sub-system may comprise executing respective first executable code in the respective data storage space, thereby performing the first microservice task by the first group of microservice computing nodes in the first distributed computing sub-system.

In embodiments, the first message may be conveyed via a plurality of first remote procedural calls.

In embodiments, the second group of microservice computing nodes of the second distributed computing sub-system are associated respectively with second data storage spaces, in which each of the second data storage spaces of the second distributed computing sub-system may be configured to store second executable code operative to execute a second microservice task; said second remote procedure call conveying the second message is associated with activation of the second microservice task; and processing the second message, by each of the microservice computing nodes of the second group of microservice computing nodes in the second distributed computing sub-system, comprises executing the second executable code of the second microservice task in the respective second data storage space, thereby performing the second microservice task by the second group of microservice computing nodes in the second distributed computing sub-system. In embodiments, the first microservice task and the second microservice task may run in a sequence, and in conjunction with said consensuses in the first distributed computing sub-system and second distributed computing sub-system, thereby achieving at least an initial execution of a single operation that comprises at least the first and second microservice tasks.

In embodiments, the second message may be conveyed via a plurality of second remote procedural calls.

In embodiments, said first agreement reached in the first distributed computing sub-system may be an agreement to perform the first microservice task as identified in the first remote procedure call conveying the first message; and said second agreement reached in the second distributed computing sub-system may be an agreement to perform the second microservice task as identified in the second remote procedure call conveying the second message.

In embodiments, said first agreement reached in the first distributed computing sub-system may be an agreement regarding an order in which a first set of remote procedure calls conveying the first message have been received in the first distributed computing sub-system relative to other messages received in the first distributed computing sub-system; and said second agreement reached in the second distributed computing sub-system may be an agreement regarding an order in which a second set of remote procedure calls conveying the second message have been received in the second distributed computing sub-system relative to other messages received in the second distributed computing sub-system.

In embodiments, the first group of microservice computing nodes of the first distributed computing sub-system may be further configured to send, in conjunction with said second message, a proof that said first agreement has actually been reached; and as a result of the second remote procedure call conveying the second message arriving in the second distributed computing sub-system, each microservice computing node of the second group of microservice computing nodes in the second distributed computing sub-system may be configured to process the second message provided at least that said proof is present in conjunction with said second message.

Figure 4:
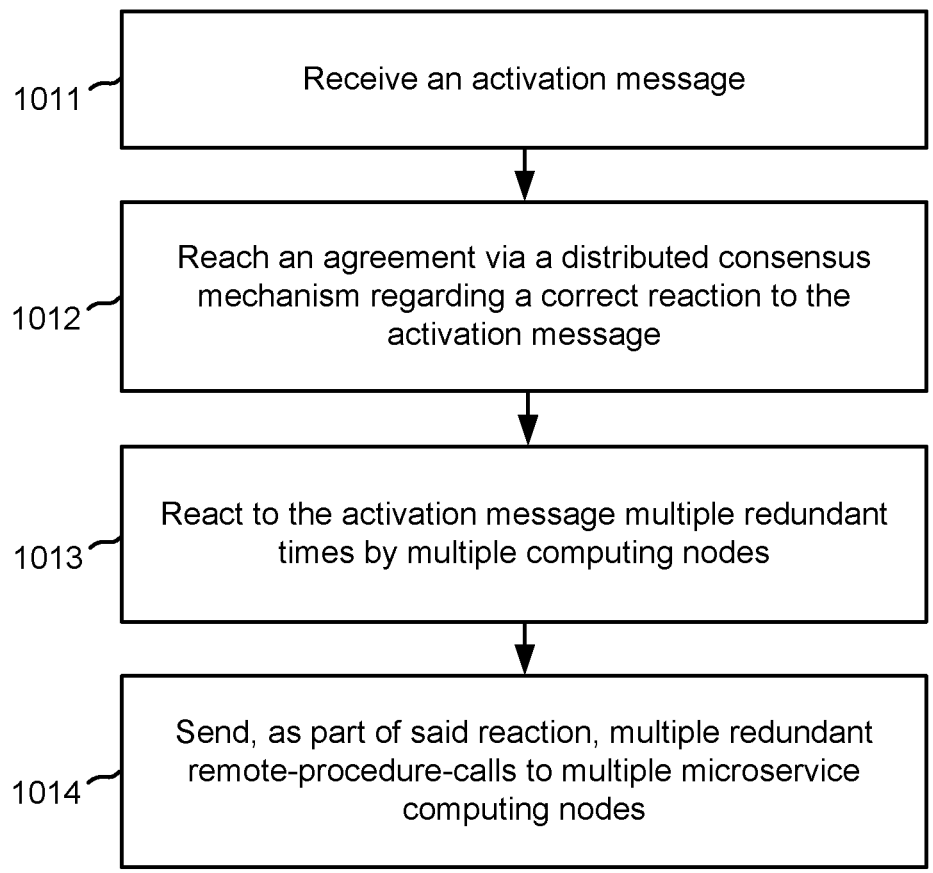
FIG. 4 illustrates a method in accordance with embodiments for achieving resiliency and fault tolerance including Byzantine Fault Tolerance (BFT) in execution of microservices.

FIG. 4 illustrates a method in accordance with embodiments for achieving resiliency and fault tolerance including Byzantine Fault Tolerance (BFT) in execution of microservices, comprising: in step 1011, receiving an activation message 3msg' for a first microservice 7T. In step 1012, reaching an agreement, via a consensus mechanism 4cm, among at least a majority of a first plurality of microservice computing nodes $3cpu11$, $3cpu12$, $3cpu1N$, regarding a correct reaction to the activation message 3msg'. In step 1013, reacting, by each of at least some of the nodes $3cpu11$, $3cpu12$, $3cpu1N$, to the activation message 3msg', by at least executing 4p the first microservice 7T, so as to result in multiple redundant executions $4p1$, $4p2$, $4pN$ of the same first microservice 7T. In step 1014, pending said execution $4p1$, $4p2$, $4pN$, sending, by each of at least some of the nodes $3cpu11$, $3cpu12$, $3cpu1N$ to at least one node of a second plurality of microservice computing nodes $3cpu21$, $3cpu22$, $3cpu2N$, a remote-procedure-call (RPC) conveying an activation message 4msg' for a second microservice 8T, provided that the activation message 4msg' for the second microservice 8T complies with the correct reaction agreed upon via the consensus mechanism 4cm, so as to result in multiple redundant PRCs 4msg1, 4msg2, 4msgN all conveying the same activation message 4msg' for the second microservice 8T and received by multiple nodes $3cpu21$, $3cpu22$, $3cpu2N$ in the second plurality.

In embodiments, said agreement reached, regarding the correct reaction to the activation message 3msg' of the first microservice 7T, is associated with at least one of: (i) an agreement about a correct timing of executing the first microservice 7T, (ii) an agreement about a correct order of executing the first microservice 7T in conjunction with other pending activities 9T, 10T, (iii) an agreement about whether to execute the first microservice 7T or not, (iv) an agreement about a correctness of the activation message 4msg' for the second microservice 8T, (v) an agreement about a correctness of the identities of recipient/s of the activation message 4msg' for the second microservice 8T, (vi) an agreement about a correctness of the second microservice 8T being specifically the right microservice to activate as a result of the executing the first microservice 7T, and/or (vii) an agreement about an authenticity of a source associated with generating and/or triggering the first message 3msg'.

In embodiments, said activation message 3msg' received in conjunction with the first microservice 7T, was generated by at least one of: (i) a previously activated microservice and via respective PRC/s and/or (ii) an internal process running in conjunction with the first plurality $3cpu11$, $3cpu12$, $3cpu1N$.

In embodiments, a method for achieving resiliency in execution of microservices comprises: receiving, by a first plurality of microservice computing nodes, a first activation message for a first microservice; reaching a first agreement, via a distributed consensus scheme, among at least a majority of the first plurality of microservice computing nodes, regarding a correct reaction to the activation message; executing, by each microservice computing node of a first group of microservice computing nodes of the first plurality of microservice computing nodes, in response to receiving the activation message, the first microservice, so as to result in multiple redundant executions of the first microservice; and pending completion of the executing step, sending, by each microservice computing node of the first group of microservice computing nodes to at least one microservice computing node of a second plurality of microservice computing nodes, a remote-procedure-call conveying a second activation message for a second microservice, provided that the second activation message for the second microservice complies with a correct reaction agreed upon via the distributed consensus scheme, so as to result in multiple redundant remote procedure calls conveying the second activation message for the second microservice and received by multiple microservice computing nodes in the second plurality.

In embodiments, the first agreement may be associated with at least one of: (i) a correct timing of executing the first microservice, (ii) a correct order of executing the first microservice in conjunction with other pending activities, (iii) whether to execute the first microservice, (iv) a correctness of the activation message for the second microservice, (v) a correctness of the identities of recipients of the activation message for the second microservice, (vi) a correctness of the second microservice being specifically the right microservice to activate as a result of the executing the first microservice, and/or (vii) an authenticity of a source associated with generating and/or triggering the first message.

In embodiments, the first activation message received in conjunction with the first microservice may be generated by at least one of: (i) a previously activated microservice and via respective remote procedure calls and/or (ii) an internal process running in conjunction with the first plurality of microservice computing nodes.

Web 3.0, also known as the decentralized web, is an evolution of the World Wide Web that aims to enable greater trust, privacy, and control for users by utilizing decentralized technologies such as blockchain, distributed storage, and peer-to-peer networking. One of the key benefits of web 3.0 is the potential to create more secure and trustworthy systems. By decentralizing data storage and processing, web 3.0 can reduce the risk of single points of failure, hacking, and data breaches that are common in centralized systems. Additionally, with the use of blockchain technology, web 3.0 can enable greater transparency and immutability in actions, which can further enhance security and trust in online interactions. Web 3.0 can enable greater privacy and control for users of social networks. With decentralized social networks, users can own their data and control who has access to it, which can help reduce the risk of data misuse and breaches. Additionally, decentralized social networks can enable more transparent and democratic governance, giving users a greater say in how the network operates. Web 3.0 can also enable more efficient and secure financial actions, e.g., by utilizing blockchain technology, inter-user actions are possible without the need for intermediaries, which can reduce action fees and increase action speed. Furthermore, web 3.0 can enable greater financial inclusion by providing access to financial services to individuals who are currently underserved by traditional financial systems. With decentralized marketplaces, buyers and sellers can transact directly with each other without the need for intermediaries, which can reduce action fees and increase trust between parties. Blockchain technology can enable more secure and transparent supply chain management, which can help reduce the risk of fraud and counterfeiting. While the concept of web 3.0 promises many benefits, realizing it will require overcoming several challenges with current technologies. Current decentralized technologies such as blockchain face significant scalability limitations. As the number of users and actions on the network grows, the time and cost required for processing actions also increase. This can make it difficult to achieve the level of speed and efficiency needed to support widespread adoption. Web 3.0 relies on multiple decentralized technologies working together seamlessly. However, there is currently not much/inefficient standardization and potentially insecure interoperability between different decentralized technologies, making it difficult for them to work together effectively. Decentralized technologies can be complex and difficult for the average user to understand and navigate. Without a user-friendly interface and experience, it may be challenging to achieve widespread adoption of web 3.0 technologies. Decentralized systems require decentralized governance to ensure transparency and accountability. However, there are currently only partially established frameworks for decentralized governance, making it challenging to establish and maintain effective governance structures. Therefore, new technologies and concepts are needed to overcome these challenges and achieve the vision of web 3.0.

The embodiments of the present disclosure provide new technologies and concepts needed to overcome these challenges, providing solutions to solve issues related to bandwidth, scale and efficiency of systems implementing web 3.0.

Embodiments include systems and methods for implementing a decentralized consensus-based object-oriented platform with the scalability and bandwidth necessary to constitute a single unified infrastructure for web 3.0. Each object in the system represents a piece of data and/or an entity and/or a function and can be owned, controlled, and interacted with by its creator and/or by other objects. Messages are sent between the objects, validation clusters then reach a consensus among themselves per each of the messages received in conjunction with a respective one of the objects, and actions are finally made in conjunction with each of the messages by at least the validation clusters that are in consensus regarding the message, thereby assuring state-coherence among all objects. The platform has the capability/capacity to become "the computer", which is a computational extension of "the internet", with the potential to encompass virtually any activity, from social networks to financial systems, e-commerce and metaverse.

Figure 5A:
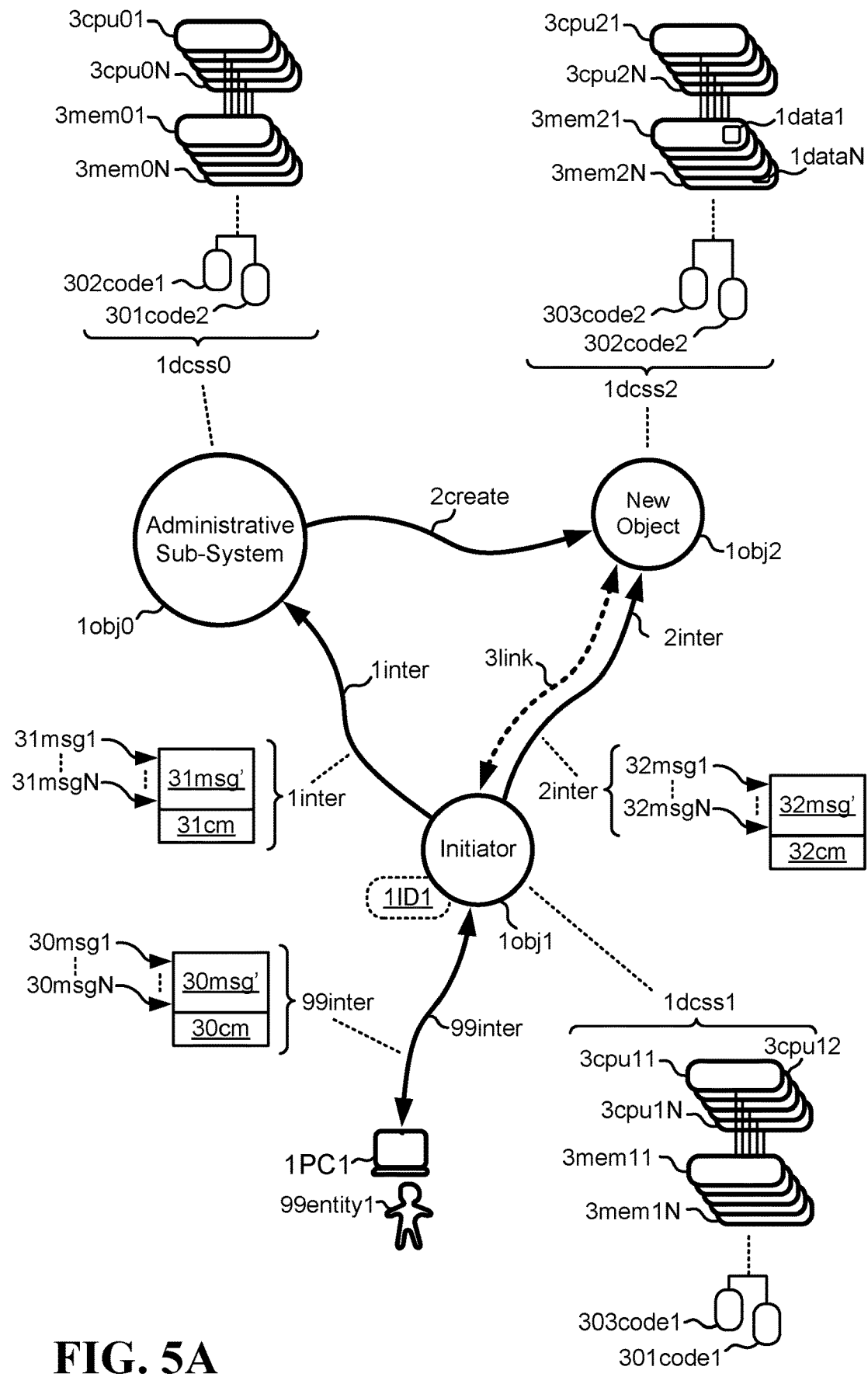
FIG. 5A illustrates existing objects defining/creating a new object and interacting therewith in the context of a decentralized consensus-based object-oriented platform having multiple distributed computing sub-systems constituting respectively the different objects in accordance with embodiments.

FIG. 5A illustrates existing objects 1obj0, 1obj1 defining/creating a new object 1obj2 and interacting therewith in the context of a decentralized consensus-based object-oriented platform having multiple distributed computing sub-systems 1dcss0, 1dcss1, 1dcss2 constituting respectively the different objects 1obj0, 1obj1, 1obj2 in accordance with embodiments.

In embodiments, distributed computing sub-system 1dcss1 includes multiple validator computing nodes 3cpu11, 3cpu1N (two are labeled, five are illustrated, but many more may be included) associated respectively with multiple storage spaces 3mem11, 3mem1N, in which each of the validator computing nodes 3cpu11, 3cpu1N may belongs to a respective different independent validation cluster 2validaor1, 2validatorN (FIG. 1A) in accordance with some embodiments. Distributed computing sub-system 1dcss1—including all code components 301code1, 303code1 used by each of the respective validator computing nodes 3cpu11, 3cpu1N and all data elements/states stored in the respective storage spaces 3mem11, 3mem1N—constitutes a respective one object 1obj1. Object 1obj1 is a logical entity/construct having a set of behaviors/rules governing it, interfaces to other objects, and data states that are kept/realized/enforced/ executed/validated by distributed computing sub-system 1dcss1. In one embodiment, the sole purpose of distributed computing sub-system 1dcss1 is to "bring to life" the logical entity/construct 1obj1 in a way that is resistant to physical and logical faults. Distributed computing sub-system 1dcss1 is the substrate on which object 1obj1 exists.

In a similar fashion, in embodiments, distributed computing sub-system 1dcss0 includes multiple validator computing nodes 3cpu01, 3cpu0N associated respectively with multiple storage spaces 3mem01, 3memON, in which each of the validator computing nodes 3cpu01, 3cpu0N belongs to the respective different independent validation cluster 2validaor1, 2validatorN. Distributed computing sub-system 1dcss0—including all code components 301code2, 302code1 used by each of the respective validator computing nodes 3cpu01, 3cpu0N and all data elements/states stored in the respective storage spaces 3mem01, 3memON—constitutes a respective different object 1obj0. Object 1obj0 is a logical entity/construct having a set of behaviors/rules governing it, interfaces to other objects, and data states that are kept/realized/enforced/executed/validated by sub-system 1dcss0, and separately from sub-system 1dcss1 and object 1obj1. Sub-system 1dcss0 is the substrate on which object 1obj0 exists.

It is noted that objects, entities, and distributed computing sub-systems are all used interchangeably throughout this disclosure, but it is generally meant that objects and entities arise out of the respective distributed computing sub-systems.

In embodiments, object 1obj0, via sub-system 1dcss0, represents an administrative sub-system. Object 1obj1 may represent a certain user entity 99entity1 interacting with and/or controlling 99inter the object 1obj1 via a computing device such as a personal computer 1PC1 or a smartphone. In a certain scenario, object 1obj1 decides to initiate the creation of a new object 1obj2, perhaps as a means to store a data element 1data1, 1dataN associated with the user 99entity1. Object 1obj1 therefore interfaces 1inter with the administrative sub-system 1dcss0 for the purpose of initiating the new object 1obj2 and consequently sends an object creation request 31msg' multiple times, via multiple remote procedure calls 31msg1, 31msgN generated in the validator computing nodes 3cpu11, 3cpu1N of the respective sub-system 1dcss1, to the administrative sub-system 1dcss0. The remote procedure calls 31msg1, 31msgN are received in the different validation nodes 3cpu01, 3cpu0N of the administrative sub-system 1dcss0, which in turn executes a consensus mechanism 31cm, in accordance with some embodiments, to establish a consensus regarding reception of the message 31msg' and/or how and/or at which order to process the message relative to other processes and requests/messages in 1dcss0. Interface 1 inter is governed by co-associated code components 301code1 and 301code2 running respectively in 1dcss1 and 1dcss0 and designed specifically to handle requests, such as 31msg', to create a new object, and in accordance with some embodiments describing interfaces between two entities engaged in an interaction. As soon as a consensus is reached in conjunction with 31cm and 31msg', the administrative sub-system 1dcss0 proceeds with defining 2create the new object 1obj2 as an interrelated set of validator computing nodes 3cpu21, 3cpu2N and storage spaces 3mem21, 3mem2N.

In embodiments, defining 2create the new object 1obj2 may involve each of the validation clusters selecting the appropriate and respective resources for creating 1obj2. For example, validator computing node 3cpu01 of administrative sub-system 1dcss0 searches inside the respective validation cluster 2validaor1 for resources that can be used in conjunction with 1obj2, and finds that the compute node 3cpu21 and storage space 3mem21 are free/can be made free/can be exploited in addition to other activities already handled by 3cpu21, for that purpose. In a similar fashion, validator computing node 3cpu0N of administrative sub-system 1dcss0 searches inside the respective validation cluster 2validaorN for resources that can be used in conjunction with 1obj2, and finds that the compute node 3cpu2N and storage space 3mem2N are free/can be made free for that purpose. After the resources are found/allocated/shared within the validation clusters 2validaor1, 2validatorN, a new distributed computing sub-system 1dcss2 is formed using the newly allocated resources 3cpu21, 3mem21, 3cpu2N, 3mem2N and is ready to serve its purpose of bringing new object 1obj2 into existence.

In embodiments, co-associated code components 302code1 and 302code2 running respectively in 1dcss0 and 1dcss2 and designed specifically to allow the new object 1obj2 to interact with the administrative sub-system 1dcss0/1obj0. For example, such interactions may include allocating additional resources/bandwidth as needed from time to time, changing the resources from time to time, deactivating the new object, and other administrative functions. The administrative interactions may exploit respective consensus mechanisms in conjunction with messages exchanged by the sub-systems 1dcss0, 1dcss2 in accordance with some embodiments.

In embodiments, once the new object 1obj2 is up and running, the initiating object 1obj1 establishes an interaction channel 2inter therewith, in which such an interaction channel 2inter may be used by 1obj1 to control 1obj2 in a case that 1obj2 was made to be subordinate to 1obj1, or it may be used for transporting a data element 1data between the objects, or may be used for any other purpose in accordance with some embodiments. In a case of a hierarchy between 1obj1 and 1obj2, 1obj2 can be made to "recognize" 1obj1 when the two objects communicate, in which such recognition may be facilitated by embedding in 1obj2 a unique identifier 1ID1 of 1obj1. Such a unique identifier may be enforced. by the validation clusters 2validaor1, 2validatorN and possibly by the administrative sub-system 1dcss0 within the clusters at a time that the respective object was created, e.g., 1obj1 is given the unique identifier 1ID1 by 1obj0 at a time that 1obj1 was created and while validating, using a respective consensus mechanism, that this specific identifier 1ID1 was never used before in conjunction with another object. Interactions tinter between 1obj1 and 1obj2 are made/validated using a redundant messaging 32msg1, 32msgN, 32msg' and respective consensus mechanisms 32cm in accordance with some embodiments, in which relevant respective co-associated code components 303code1, 303code2 are used by the objects 1obj1, 1obj2 to facilitate such interactions.

In embodiments, a link/pointer 31ink is used to associate between object 1obj1 and object 1obj2. For example, if 1obj1 is using 1obj2 to store a related data element 1 data, then an external element, such as another object, may access the pointer 31ink at 1obj2 to conclude that 1data, which is stored in 1obj2, is in fact associated with 1obj1, or perhaps originated at 1obj1. Alternatively, the external element may access the pointer 31ink at 1obj1 to conclude that 1data, which was originated at 1obj1, is in fact stored elsewhere and in conjunction with 1obj2.

In embodiments, object's 1obj1 decision to initiate the creation of the new object 1obj2 is triggered by a direct request 30msg' made by an external entity 99entity1 using redundant messaging 30msg1, 30msgN that are received in 3cpu11, 3cpu1N and a respective consensus mechanism 30cm that is executed in 1dcss1 in conjunction with reception of the message 30msg' and in accordance with some embodiments. The multiple messages 30msg1, 30msgN may be generated by a single source, e.g., in 1PC1.

In embodiments, 1obj1 creates 1obj2 directly, and not via the administrative sub-system 1dcss0, thereby requiring 1obj1 to internally possess the functionality needed to identify and allocate the necessary resources for 1obj2.

Embodiments include a decentralized consensus-based object-oriented system, comprising: a plurality of validator computing nodes 3cpu (FIG. 5A); a first distributed computing sub-system 1dcss1 (FIG. 5A) constituting a first object 1obj1 (FIG. 5A), comprising a first combination of at least some of the validator computing nodes 3cpu11, 3cpu1N (FIG. 5A); and an administrative distributed computing sub-system 1dcss0 (FIG. 5A), comprising a second combination of at least some of the validator computing nodes 3cpu01, 3cpu0N (FIG. 5A).

In embodiments, a result of a certain trigger, each of at least some of the nodes 3cpu11, 3cpu1N in the first distributed computing sub-system 1dcss1 is configured to send a procedure call 31msg1, 31msgN (FIG. 5A) conveying an object-creation message 31msg' (FIG. 5A) to at least one of the nodes 3cpu01, 3cpu0N of the administrative distributed computing sub-system 1dcss0, so as to result in the administrative distributed computing sub-system receiving at least some of the procedure calls conveying the object-creation message; as a result of said reception of the at least some of the procedure-calls 31msg1, 31msgN all conveying the same object-creation message 31msg', each of at least some of the nodes 3cpu01, 3cpu0N in the administrative distributed computing sub-system 1dcss0 is configured to execute, in conjunction with at least some of the other nodes of the administrative distributed computing sub-system, a consensus mechanism 31cm (FIG. 5A) associated with the object-creation message 31msg'; and provided that a consensus has been reached in conjunction with said consensus mechanism 31cm regarding creation of a new object, the administrative distributed computing sub-system 1dcss0 is configured to define 2create (FIG. 5A) a second distributed computing sub-system 1dcss2 (FIG. 5A) constituting the new object 1obj2 (FIG. 5A), comprising a third combination of at least some of the validator computing nodes 3cpu21, 3cpu2N (FIG. 5A).

In embodiments, as a result of at least some procedure-calls 30msg1, 30msgN (FIG. 5A) all conveying a same triggering message 30msg' (FIG. 5A) that were made available in the first distributed computing sub-system 1dcss1, each of at least some of the nodes 3cpu11, 3cpu1N in the first distributed computing sub-system 1dcss1 is configured to: execute, in conjunction with at least some of the other nodes 3cpu11, 3cpu1N of the first distributed computing sub-system 1dcss1, a consensus mechanism 30cm (FIG. 5A) associated with the triggering message 30msg'; process the triggering message 30msg', and consequently reach a conclusion that the new object 1obj2 is to be created; and reach a consensus in conjunction with said consensus mechanism 30cm regarding the triggering message, in which said consensus reached constitutes the certain trigger.

In embodiments, the first object 1obj1 is associated with and subordinate to a first entity 99entity1 (FIG. 5A) external to the system; and said triggering message 30msg' is initiated by the first entity 99entity1.

In embodiments, said first entity 99entity1 is a certain person; said first object 1obj1 is a representation of the certain person 99entity1 in the system; and said new object 1obj2 is an object created to facilitate an operation mandated by the certain person 99entity1.

In embodiments, said new object 1obj2 is a new post published by the certain person 99entity1 in conjunction with social network activity.

In embodiments, said new object 1obj2 is a new account created by the certain person 99entity1 in conjunction with a financial activity.

In embodiments, said new object 1obj2 is a new mirror data object operative to mirror and/and register activities associated with a real object, in which the real object comprises at least one of: (i) a smartphone associated with the certain person 99entity1, (ii) a personal computer 1PC1 (FIG. 5A) associated with the certain person 99entity1, and/or (iii) a bank account associated with the certain person 99entity1.

In embodiments, said first entity 99entity1 is a certain financial institution comprising at least one of: (i) a bank, (ii) an exchange, (iii) an investment vehicle, (iv) a custodian, (v) a store of value, and/or (vi) a ledger of rights and/or obligations; said first object 1obj1 is a representation of the certain financial institution in the system; and said new object 1obj2 is a new account facilitated by the financial institution in favor of a client entity.

In embodiments, said triggering message 30msg' is made and/or approved and/or permissioned in conjunction with a cryptographic signature using a private key associated with the first entity 99entity1 as an authorization, and in which the first object 1obj1 is configured to validate the cryptographic signature using a respective public key associated with said private key.

In embodiments, (i) said consensus mechanisms cm30, cm31 associated with the triggering message 30msg' and with the object-creation message 31msg', in conjunction with (ii) the administrative and first distributed computing sub-systems 1dcss0, 1dcss1, comprising multiple validator computing nodes 3cpu, and including the (iii) multiple procedure-calls 30msg, 31msg all conveying the triggering and object-creation messages 30msg', 31msg', are together operative to assure fault tolerance in face of failure/s occurring in some of the nodes 3cpu, thereby assuring resiliency in conjunction with said creation of the new object 1obj2.

In embodiments, said fault tolerance is a byzantine-fault-tolerance (BFT), in which some of the nodes 3cpu operate maliciously against proper operation of the decentralized consensus-based object-oriented system.

In embodiments, said consensus reached 30cm, regarding the triggering messages 30msg, is associated with at least one of: (i) a consensus about a correct timing of serving the triggering messages, (ii) a consensus about a correct order of serving the triggering message in conjunction with other pending triggers, (iii) a consensus about whether to actually serve the triggering messages or not, (iv) a consensus about a correctness of the triggering messages, and/or (v) a consensus about authenticity and/or authority of an entity 99entity1 responsible for said conveying of the triggering messages.

In embodiments, the system is configured to define 3link (FIG. 5A) the new object 1obj2 as subordinate to the first object 1obj1 by at least embedding a unique address/es and/or identifier/s 11D1 (FIG. 5A) of the first object 1obj1 in the second object 1obj2; and the first object 1obj1 is configured to communicate and/or interact 2inter (FIG. 5A) with the new object 1obj2 for the purpose of messaging 32msg' (FIG. 5A) and/or controlling and/or making a request from the new object, in which such communication 2inter is made and/or approved and/or permissioned in conjunction with said unique address/es and/or identifier/s 11D1 of the first object 1obj1.

In embodiments, the first object 1obj1 is configured to communicate and/or interact 2inter (FIG. 5A) with the new object 1obj2 for the purpose of messaging 32msg' (FIG. 5A) and/or controlling and/or making a request from the new object, in which such communication 2inter is facilitated using a unique address/es and/or identifier/s 11D1 (FIG. 5A) of the first object 1obj1 embedded in the second object 1obj2.

In embodiments, the first object 1obj1 is a data manager; and said new object 1obj2 is a new data object 1data (FIG. 5A) created by the data manager.

In embodiments, the new data object 1data is redundantly stored in storage spaces 3mem21, 3mem2N (FIG. 5A) associated with the different validator computing nodes 3cpu21, 3cpu2N of the second distributed computing sub-system 1dcss2, in which each replica of the data object 1data1, 1dataN (FIG. 5A) is a complete representation of the data object 1data in one of the respective storage spaces 3mem21, 3mem2N associated with the validator computing nodes 3cpu21, 3cpu2N.

In embodiments, the new data object 1data is expanded and fragmented in conjunction with a certain code rate using a data-protection/encoding function such as an erasure code and/or a forward error correction code, in which each of the fragments is stored in one of the storage spaces 3mem21, 3mem2N associated with the different validator computing nodes 3cpu21, 3cpu2N of the second distributed computing sub-system 1dcss2, in which reconstruction of the data object 1data from the fragments requires cooperation of at least a certain number of the respective validator computing nodes 3cpu21, 3cpu2N.

In embodiments, data 4nTS (FIG. 1D) associated with the first object 1obj1 is redundantly stored in the different validator computing nodes of the first distributed computing sub-system 1dcss1; and data 5nTS associated with the new object 1obj2 is redundantly stored in the different validator computing nodes of the second distributed computing sub-system 1dcss2.

In embodiments, data 4nTS (FIG. 1D) associated with the first object 1obj1 is recorded in conjunction with a respective first blockchain data structure 1BC4; and data 5nTS associated with the new object 1obj2 is recorded in conjunction with a respective second blockchain data structure 1BC5.

In embodiments, said consensus reached 31cm, regarding the creation of the new object 1obj2, is associated with at least one of: (i) a consensus about a correct timing of creating the new object, (ii) a consensus about a correct order of creating the new object in conjunction with other pending activities, (iii) a consensus about whether to actually create the new object or not, (iv) a consensus about a correctness of the object-creation message 31msg', (v) a consensus about a correctness of data 1data to be stored in conjunctions with the new object, in which the data is conveyed in the object-creation message and/or conveyed otherwise, (vi) a consensus about a correctness of the second combination of the at least some of the validator computing nodes 3cpu21, 3cpu2N constituting the second distributed computing sub-system 1dcss2 constituting the new object, and/or (vii) a consensus about an authenticity of the first distributed computing sub-system 1dcss1 to generate the object-creation messages 30msg'.

In embodiments, each of the validator computing nodes 3cpu11, 3cpu1N of the first distributed computing subsystem 1*dcss*1 is located in a different data center 2validator1, 2validatorN than other validator computing nodes 3*cpu*11, 3*cpu*1N of the first distributed computing sub-system; each of the validator computing nodes 3*cpu*01, 3*cpu*0N of the administrative distributed computing sub-system 1*dcss*0 is located in a different data center 2validator1, 2validatorN than other validator computing nodes 3*cpu*01, 3*cpu*0N of the administrative distributed computing sub-system; said consensus reached, in conjunction with the consensus mechanism 31*cm*, has been reached in conjunction with inter-data center communication between the different validator computing nodes 2validator1, 2validatorN of the administrative distributed computing sub-system 1*dcss*0, in which such inter-data center communication is facilitated using the Internet and/or dedicated communication links; and said consensus has been reached even under detrimental conditions affecting some of the data centers 2validator1, 2validatorN and/or the Internet and/or the dedicated communication links.

In embodiments, each of at least some of the validator computing nodes 3*cpu*11, 3*cpu*1N of the first distributed computing sub-system 1*dcss*1 is co-located, together with at least a respective one of the validator computing nodes 3*cpu*01, 3*cpu*0N of the administrative distributed computing sub-system 1*dcss*0, in the same data center; and said procedure calls 31msg conveyed between the first distributed computing sub-system 1*dcss*1 and the administrative distributed computing sub-system 1*dcss*0 are intra-data center procedure calls, in which such intra-data center procedure calls are facilitated using data networks internal to the data centers 2validator1, 2validatorN.

In embodiments, each of at least some of the validator computing nodes 3*cpu*11, 3*cpu*1N of the first distributed computing sub-system 1*dcss*1, together with at least a respective one of the validator computing nodes 3*cpu*01, 3*cpu*0N of the administrative distributed computing sub-system 1*dcss*0, constitute a part of a same validation cluster, e.g., 3*cpu*11 and 3*cpu*01 constitute a part of validation cluster 2validation1; and each of at least some of the validation clusters 2validator1, 2validatorN belongs to a respective ownership/operating entity 2entity1, 2entityN, in which each of the ownership entities is configured to participate in a proof of stake (PoS) mechanism, in which said PoS mechanism comprises each of the respective ownership entities putting down a stake that is collected by the system in conjunction with events in which nodes controlled by specific ownership entity misalign with the consensus reached in conjunction with the consensus mechanism 31*cm* and/or with other agreed behavior of the nodes, thereby acting as a penalty algorithm.

In embodiments, one of the validator computing nodes 3*cpu*01, 3*cpu*0N of the administrative distributed computing sub-system 1*dcss*0 is designated a lead node after providing a respective stake in conjunction with a proof of stake (PoS) mechanism; and as part of said consensus mechanism 31*cm*, each of the other validator computing nodes 3*cpu*01, 3*cpu*0N of the administrative distributed computing sub-system 1*dcss*0 is configured to obtain, from the lead node, an indication confirming and/or informing which verifiable assumptions associated with the object-creation message 31msg' are to be agreed upon in conjunction with the consensus mechanism.

In embodiments, said respective combination of the validator computing nodes 3*cpu*11, 3*cpu*1N of the first distributed computing sub-system 1*dcss*1, comprises a combination of at least 5 (five) of the validator computing nodes; said respective combination of the validator computing nodes 3*cpu*01, 3*cpu*0N of the administrative distributed computing sub-system 1*dcss*0, comprises a combination of at least 5 (five) different ones of the validator computing nodes; and therefore, said definition of a second distributed computing sub-system 1*dcss*2 constituting the new object 1obj2, comprising a respective combination of at least some of the validator computing nodes 3*cpu*21, 3*cpu*2N, was made even under detrimental conditions comprising at least one of: (i) malfunction of one or more of the validator computing nodes 3*cpu*, (ii) a malicious attack on one or more of the validator computing nodes 3*cpu*, (iii) a communication outage affecting one or more of the validator computing nodes 3*cpu*, and/or (iv) a malicious behavior of one or more of the validator computing nodes 3*cpu* that is facilitated by an entity having access to the computing node and having a malicious intent.

In embodiments, said consensus mechanism 31*cm* is associated with a practical-byzantine-fault-tolerance (PBFT) consensus mechanism, in which as part of reaching said consensus, which is also be referred to as an agreement, said at least some of the nodes 3*cpu*01, 3*cpu*0N in the administrative distributed computing sub-system 1*dcss*0 are configured to participate in an iterative multi-phase process comprising: a pre-prepare phase, in which said nodes 3*cpu*01, 3*cpu*0N are configured to communicate among themselves at least a certain suggested detail related to the object-creation message 31msg'; a prepare phase, in which said nodes 3*cpu*01, 3*cpu*0N are configured to concur regarding said certain suggested detail, by further communicating among themselves; and a commit phase, in which said nodes 3*cpu*01, 3*cpu*0N are configured to commit, by still further communicating among themselves, about said concurring regarding said certain suggested detail.

In embodiments, said certain suggested detail is suggested by one of the nodes 3*cpu*01, 3*cpu*0N in the administrative distributed computing sub-system 1*dcss*0 acting as a lead node.

Embodiments include a decentralized consensus-based object-oriented system, comprising: a plurality of validator computing nodes 3*cpu* (FIG. 5A); and a first distributed computing sub-system 1*dcss*1 constituting a first object 1obj1, comprising a first combination of at least some of the validator computing nodes 3*cpu*11, 3*cpu*12, 3*cpu*1N. In one embodiment, as a result of a certain trigger 30msg' mandating creation of a new object 1obj2, each of at least some of the nodes 3*cpu*11, 3*cpu*12, 3*cpu*1N in the first distributed computing sub-system 1*dcss*1 is configured to execute, in conjunction with at least some of the other nodes 3*cpu*11, 3*cpu*12, 3*cpu*1N of the first distributed computing sub-system, a consensus mechanism 30*cm* associated with the certain trigger; and provided that a consensus has been reached in conjunction with said consensus mechanism 30*cm* regarding the certain trigger 30msg', the first distributed computing sub-system 1*dcss*1 is configured to define a second distributed computing sub-system 1*dcss*2 constituting the new object 1obj2, comprising a second combination of at least some of the validator computing nodes 3*cpu*21, 3*cpu*2N.

Figure 5B:
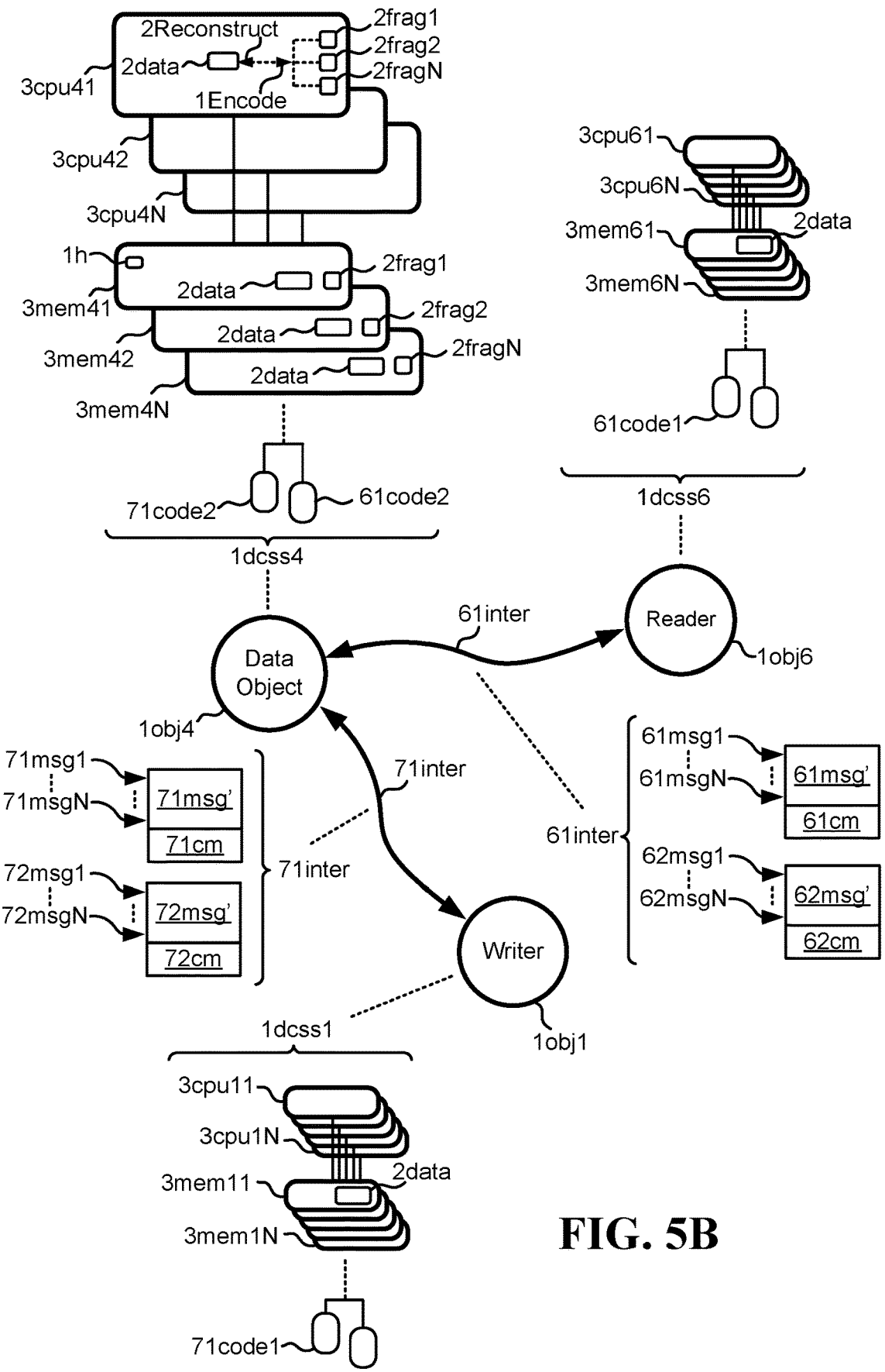
FIG. 5B illustrates a data object written to by a writer object and read from by a reader object in conjunction with the decentralized consensus-based object-oriented platform having multiple distributed computing sub-systems constituting respectively the different objects in accordance with embodiments.

FIG. 5B illustrates a data object 1obj4 written to by a writer object 1obj1 and read from by a reader object 1obj6 in conjunction with the decentralized consensus-based object-oriented platform having multiple distributed computing sub-systems 1*dcss*1, 1*dcss*4, 1*dcss*6 constituting respectively the different objects 1obj1, 1obj4, 1obj6 in accordance with embodiments.

In embodiments, distributed computing sub-system 1*dcss*1includes multiple validator computing nodes 3*cpu*11, 3*cpu*1N associated respectively with multiple storage spaces 3mem11, 3mem1N, in which each of the validator computing nodes 3*cpu*11, 3*cpu*1N may belongs to a respective different. independent validation cluster 2validaor1, 2validatorN in accordance with some embodiments. Distributed computing sub-system 1*dcss*1—including code component 71code1 used by each of the respective validator computing nodes 3*cpu*11, 3*cpu*1N and all data elements/states stored in the respective storage spaces 3mem11, 3mem1N—constitutes a respective one object 1obj1.

In a similar fashion, in embodiments, distributed computing sub-system 1*dcss*4 includes multiple validator computing nodes 3*cpu*41, 3*cpu*42, 3*cpu*4N (three are labeled and illustrated, but many more may be included) associated respectively with multiple storage spaces 3mem41, 3mem42, 3mem4N, in which each of the validator computing nodes 3*cpu*41, 3*cpu*42, 3*cpu*4N may belongs to a respective different independent validation cluster 2validaor1, 2validaor2, 2validatorN in accordance with some embodiments. Distributed computing sub-system 1*dcss*4—including all code components 61code2, 71code2 used by each of the respective validator computing nodes 3*cpu*41, 3*cpu*42, 3*cpu*4N and all data elements 2data, 2frag stored in the respective storage spaces 3mem41, 3mem42, 3mem4N—constitutes a respective one object 1obj4, which may have been created specifically for the purpose of storing data elements such as 2data, 2frag.

In embodiments, distributed computing sub-system 1*dcss*6 may also include multiple validator computing nodes 3*cpu*61, 3*cpu*6N associated respectively with multiple storage spaces 3mem61, 3mem6N, in which each of the validator computing nodes 3*cpu*61, 3*cpu*6N may belongs to a respective different independent validation cluster 2validaor1, 2validatorN in accordance with some embodiments. Distributed computing sub-system 1*dcss*6—including code component 61code1 used by each of the respective validator computing nodes 3*cpu*61, 3*cpu*6N and all data elements/ states 2data stored in the respective storage spaces 3mem61, 3mem6N—constitutes a respective one object 1obj6.

In embodiments, and perhaps as a result of a consensus reached among the validator computing nodes 3*cpu*11, 3*cpu*1N of distributed computing sub-system 1*dcss*1 in conjunction with a certain trigger associated with object 1obj1, object 1obj1 may decide to interface 71inter with object 1obj4 for the purpose of storing a certain data element 2data in 1obj4. The decision to store the data element 2data in 1obj4, and not in 1obj1, may be reached as a result of a direct instruction received in 1obj1, or perhaps as a result of a policy of 1obj1 to store data sets externally, or maybe because data element 2data is too big to be handled by the resources of 1obj1 as allocated in conjunction with distributed computing sub-system 1*dcss*1. In some cases, data element 2data is intended to be accessed by many different objects many times and so it makes sense to treat 2data as an entity that is independent of object 1obj1 and that can be accessed without directly involving 1obj1.

In embodiments, as part of said interfacing 71inter, 1obj1 sends multiple calls 71msg1, 71msgN to 1obj4, via the respective validator computing nodes 3*cpu*11, 3*cpu*1N and perhaps in the form of multiple remote procedure calls in accordance with some embodiments, all conveying a store command 71msg' that may include the data element 2data to be stored in 1obj4. Upon reception of 71msg1, 71msgN, 71msg' in the respective validator computing nodes 3*cpu*41, 3*cpu*42, 3*cpu*4N of 1obj4, a consensus mechanism 71*cm* is used to reach agreement among the nodes 3*cpu*41, 3*cpu*42, 3*cpu*4N regarding executing the store command 71msg', in which said consensus may include deciding on an order according to which the store command 71msg' is to be executed relative to other requests/commands received in 1obj4 and may include agreeing on the actual data 2data to be stored, in accordance with some embodiments.

In embodiments, upon reaching said agreement in conjunction with consensus mechanism 71*cm*, each of the validator computing nodes 3*cpu*41, 3*cpu*42, 3*cpu*4N of 1obj4, that is in consensus, proceeds with storing a complete local replica of the data element 2data in the respective storage space 3mem41, 3mem42, 3mem4N, thereby storing 2data redundantly across 3mem41, 3mem42, 3mem4N. In one embodiment, once 2data has been stored across 3mem41, 3mem42, and 3mem4N, 1obj4 sends multiple calls 72msg1, 72msgN back to 1obj1, via the respective validator computing nodes 3*cpu*41, 3*cpu*42, 3*cpu*4N and perhaps in the form of multiple remote procedure calls in accordance with some embodiments, all conveying a store-acknowledge message 72msg'. Upon reception of 72msg1, 72msgN, 72msg' in the respective validator computing nodes 3*cpu*11, 3*cpu*1N of 1obj1, a consensus mechanism 72*cm* is used to reach agreement among 3*cpu*11, 3*cpu*1N regarding reception of the store-acknowledge message 72msg', in which said agreement is used to finalize/verify that the data element 2data was indeed stored in 1obj4.

In embodiments, upon reaching said agreement in conjunction with consensus mechanism 71*cm*, each of the validator computing nodes 3*cpu*41, 3*cpu*42, 3*cpu*4N of 1obj4, that is in consensus, proceeds with storing only a respective fragment 2frag1, 2frag2, 2fragN associated with the data element 2data in the respective storage space 3mem41, 3mem42, 3mem4N, thereby storing the fragments 2frag1, 2frag2, 2fragN across 3mem41, 3mem42, 3mem4N. In one embodiment, once the fragments 2frag1, 2frag2, 2fragN have been stored across 3mem41, 3mem42, and 3mem4N, 1obj4 sends multiple calls 72msg1, 72msgN back to 1obj1, via the respective validator computing nodes 3*cpu*41, 3*cpu*42, 3*cpu*4N, all conveying a store-acknowledge message 72msg'. Upon reception of 72msg1, 72msgN, 72msg' in the respective validator computing nodes 3*cpu*11, 3*cpu*1N of 1obj1, a consensus mechanism 72*cm* is used to reach agreement among 3*cpu*11, 3*cpu*1N regarding reception of the store-acknowledge message 72msg', in which said agreement is used to finalize/verify that a representation of the data element 2data was indeed stored in 1obj4 in the form of fragments 2frag1, 2frag2, 2fragN.

In embodiments, at least one of the computing nodes 3*cpu*41, 3*cpu*42, 3*cpu*4N of 1obj4 is designated as a lead node in accordance with some embodiments. The lead node/s, e.g., 3*cpu*41, may execute an encoding procedure 1Encode in conjunction with 2data thereby producing the respective fragments 2frag1, 2frag2, 2fragN prior to distributing/storing the fragments across 3mem41, 3mem42, 3mem4N. It is noted that each of the storage spaces may store one of the fragments, or some of the fragments, or none of the fragments.

In embodiments, the encoding procedure 1Encode used to transform the data element 2data into the plurality of fragments 2frag1, 2frag2, 2fragN is associated with forward error correction (FEC) and/or with erasure coding (EC) having the property that the fragments 2frag1, 2frag2, 2fragN contain redundant information about the data element 2data, and therefore 2data can be reconstructed 2Reconstruct even if only some, and not all, of the fragments are available. For example, if a code rate of ⅔ (two thirds) is used in conjunction with the encoding procedure 1Encode, then 2data could be completely reconstructed from only 2frag1, 2frag2, from only 2frag1, 2fragN, or from only 2frag2, 2fragN.

In embodiments, the encoding procedure 1Encode used to transform the data element 2data into the plurality of fragments 2frag1, 2frag2, 2fragN is associated with creating data fragments (or blocks) and parity fragments (or blocks), and therefore 2data can be reconstructed 2Reconstruct even if only some, and not all, of the blocks are available.

In embodiments, the consensus mechanism 71*cm* is used to reach an understanding among the validator computing nodes 3*cpu*41, 3*cpu*42, 3*cpu*4N of 1obj4 that the fragments 2frag1, 2frag2, 2fragN were indeed stored across 3mem41, 3mem42, 3mem4N, and that the stored fragments 2frag1, 2frag2, 2fragN actually allow reconstructing 2Reconstruct the original data element 2data, in accordance with some embodiments.

In embodiments, the total size of all the fragments 2frag1, 2frag2, 2fragN is larger than the original data element 2data in order to facilitate said storage redundancy, however, each of the fragments 2frag1, 2frag2, 2fragN is smaller than 2data so as to allow more effective usage of the distributed storage space 3mem41, 3mem42, 3mem4N. For example, if data element 2data is a 2 MByte image/file/segment of a video, and an erasure code of rate ⅓ (one third) is used for encoding 1Encode onto 100 (one hundred) nodes 3*cpu*41, 3*cpu*42, 3*cpu*4N, and assuming each node stores a single fragment, then each fragment is only approximately 2 MByte*3/100=60 Kbytes, which is only 3 (three) percent of the original file size. It is noted that in this scenario, only about 34 (thirty four) of the 100 nodes 3*cpu*41, 3*cpu*42, 3*cpu*4N and associated storage spaces 3mem41, 3mem42, 3mem4N need to be available for successful reconstruction of 2data.

In embodiments, data element 2data may represent a small data item such as a state 4*c*TS, 4*n*TS (FIG. 1B) in accordance with some embodiments, in which the state can be reconstructed only if enough of the fragments 2frag1, 2frag2, 2fragN are available for reconstruction 2Reconstruct. In one embodiment, the data item 2data can be reconstructed only if a consensus exists among the respective nodes that reconstruction is warranted, in which the consensus is the trigger that makes >50 percent @ rate 1/2 (or >66.6 percent @ rate 2/3, depending on the consensus needed) of the fragments available for reconstruction.

In embodiments, the encoding 1Encode of data element 2data into fragments 2frag1, 2frag2, 2fragN is done using a rateless code, which is capable of incremental redundancy/variable-rate, meaning that as new nodes and storage spaces are added into 1*dcss*4, new fragments are added to the respective new storage spaces without the need to re-encode the already existing fragments 2frag1, 2frag2, 2fragN. The newly added fragments "lower" the rate in the sense that a smaller percentage of fragments is needed for successful reconstruction 2Reconstruct of 2data.

In embodiments, a cryptographic hash 1*h* of the data element 2data is kept in each of at least some of the storage spaces 3mem41, 3mem42, 3mem4N of 1obj4 as a means to verify correct reconstruction 2Reconstruct of 2data or as a means to verify that any copy of 2data, obtained from within 1*dcss*4 or externally to 1*dcss*4, is correct. The nodes 3*cpu*41, 3*cpu*42, 3*cpu*4N of 1obj4 can agree on the value of the hash 1*h* using a consensus mechanism, e.g., as part of 71*cm* and during the process of storing 2dtata and/or 2frag1, 2frag2, 2fragN.

In embodiments, Interface 71inter is governed by co-associated code components 71code1 and 71code2 running respectively in 1*dcss*1 and 1*dcss*4 and designed specifically to handle store and store-acknowledge messages, such as 71*sg*', 72msg', as well as other data-related operations and in accordance with some embodiments describing interfaces between two entities engaged in an interaction. Code component 71code2 may also handle the encoding and decoding 1Encode, 2Reconstruct of the data element 2data in accordance with some embodiments. The various consensus mechanisms 71*cm*, 72*cm* can be handled by 71code2 and 71code1, or they can be handled by other code components in 1obj1, 1obj4 working in conjunction with 71code2 and 71code1.

In embodiments, 3*cpu*6N of distributed computing subsystem 1*dcss*6 in conjunction with a certain trigger associated with object 1obj6, object 1obj6 may decide to interface 61inter with object 1obj4 for the purpose of reading a certain data element 2data from 1obj4, which may occur as a result of a consensus reached among the validator computing nodes 3*cpu*6. The decision to read the data element 2data may be reached as a result of a direct instruction received in 1obj6, or as a result of object 1obj6 requiring the data element 2data to proceed with a certain function/task/calculation, or for other reasons.

In embodiments, as part of said interfacing 61 inter, 1obj6 sends multiple calls 61msg1, 61msgN to 1obj4, via the respective validator computing nodes 3*cpu*61, 3*cpu*6N and perhaps in the form of multiple remote procedure calls in accordance with some embodiments, all conveying a read request 61msg' that may include a pointer/ID/address/description of data element 2data to be read from 1obj4. Upon reception of 61msg1, 61msgN, 61msg' in the respective validator computing nodes 3*cpu*41, 3*cpu*42, 3*cpu*4N of 1obj4, a consensus mechanism 61*cm* is used to reach agreement among the nodes 3*cpu*41, 3*cpu*42, 3*cpu*4N regarding executing the read command 61msg', in which said consensus may include deciding on an order according to which the read command 61msg' is to be executed relative to other requests/commands received in 1obj4 and may include agreeing on the actual data 2data to be read, in accordance with some embodiments. It is noted that the order according to which the read command 61msg' is to be executed relative to other requests—e.g., relative to command 71msg' ordering the storing/appending of the data element 2data—is critical for data consistency across all validator nodes, at least because reading 61 inter the data element 2data before it was appended 71inter may result in a different data in comparison to reading 61inter the data element 2data after it was appended 71inter. In order to prevent non-coherent results across the multiple storage spaces 3mem61, 3mem6N that are to receive 2data from 1obj4, the system has to agree 61*cm* on said order, and make sure that each of the nodes 3*cpu*41, 3*cpu*42, 3*cpu*4N of 1obj4 (or at least those that are in consensus) executes the read request 61msg' at the exact same order relative to 71msg'.

In embodiments, upon reaching said agreement in conjunction with consensus mechanism 61*cm*, each of the validator computing nodes 3*cpu*41, 3*cpu*42, 3*cpu*4N of 1obj4, that is in consensus, proceeds with fetching the local replica of data element 2data from the respective storage space 3mem41, 3mem42, 3mem4N. 1obj4 then sends multiple responses 62msg1, 62msgN back to 1obj6, via the respective validator computing nodes 3*cpu*41, 3*cpu*42, 3*cpu*4N and perhaps in the form of multiple remote procedure calls in accordance with some embodiments, all conveying a response message 62msg' that includes the data element 2data requested 61msg'. Upon reception of 62msg1, 62msgN, 62msg'/2data in the respective validator computing nodes 3*cpu*61, 3*cpu*6N of 1obj6, a consensus mechanism 62*cm* is used to reach agreement among 3*cpu*61, 3*cpu*6N regarding correct reception of 62msg'/2data, in which said agreement is used to finalize/verify that the data element 2data was indeed received correctly in 1obj6. 62msg' may also include the hash 1*h* of 2data, and said verification that 2data was received correctly in 1obj6 may include reaching a consensus regarding 1*h* in conjunction with 62*cm*. In one embodiment, 62msg' does not include 2data, but only the respective hash 1*h*, in which the nodes 3*cpu*61, 3*cpu*6N of 1obj6 may obtain the actual data 2data from a source that is external to 1*dcss*4, but then reach a consensus regarding the data obtained externally using the hash 1*h* obtained via 62msg' from 3*cpu*41, 3*cpu*42, 3*cpu*4N.

In embodiments, upon reaching said agreement in conjunction with consensus mechanism 61*cm*, each at least some of the validator computing nodes 3*cpu*41, 3*cpu*42, 3*cpu*4N of 1obj4 that are in consensus, and perhaps only one 3*cpu*41 of the validator nodes that is the designated lead node in accordance with some embodiment, proceeds with reconstructing 2Reconstruct the data element 2data from the fragments 2frag1, 2frag2, 2fragN that are stored across 3mem41, 3mem42, 3mem4N. 1obj4 then sends multiple responses. 62msg1, 62msgN back to 1obj6, via the respective validator computing nodes 3*cpu*41, 3*cpu*42, 3*cpu*4N, all conveying a response message 62msg' that includes the reconstructed data element 2data requested 61msg'. Upon reception of 62msg1, 62msgN, 62msg'/2data in the respective validator computing nodes 3*cpu*61, 3*cpu*6N of 1obj6, a consensus mechanism 62*cm* is used to reach agreement among 3*cpu*61, 3*cpu*6N regarding correct reception of 62msg'/2data, in which said agreement is used to finalize/verify that the reconstructed data element 2data was indeed received correctly in 1obj6. 62msg' may also include the hash 1*h* of 2data, and said verification that reconstructed 2data was received correctly in 1obj6 may include reaching a consensus regarding 1*h* in conjunction with 62*cm*.

In embodiments, 62msg' does not include the reconstructed data element 2data, but only the respective hash 1*h*, in which the nodes 3*cpu*61, 3*cpu*6N of 1obj6 may get hold of the actual data element 2data by reconstructing 2data directly from fragments 2frag1, 2frag2, 2fragN received in 1*dcss*6 from 1*dcss*4.

In embodiments, interface 61inter is governed by co-associated code components 61code1 and 61code2 running respectively in 1*dcss*6 and 1*dcss*4 and designed specifically to handle read requests and data sending messages, such as 61*sg*', 62msg', as well as other data-related operations and in accordance with some embodiments describing interfaces between two entities engaged in an action. Code component 61code2 may also handle the decoding 2Reconstruct of the data element 2data in accordance with some embodiments. The various consensus mechanisms 61*cm*, 62*cm* can be handled by 61code2 and 61code1, or they can be handled by other code components in 1obj6, 1obj4 working in conjunction with 61code2 and 61code1.

In embodiments, the reading functionality of object 1obj6, which may be referred to as a reader object, may be integrated in any other object, such as in object 1obj1 that has previously stored the data element 2data in 1obj4. In such a case, code component 61code1, or a similar code component with reading functionality, has to be added to 1obj1.

In embodiments, a decentralized consensus-based object-oriented system comprises: a plurality of validator computing nodes 3*cpu* (FIG. 5B); a first distributed computing sub-system 1*dcss*1 (FIG. 5B) constituting a first object 1obj1, comprising a first combination of at least some of the validator computing nodes 3*cpu*11, 3*cpu*1N; and a second distributed computing sub-system 1*dcss*4 (FIG. 5B) subordinate to the first object 1obj1 and created specifically to constitute at least one data object, comprising a second combination of at least some of the validator computing nodes 3*cpu*41, 3*cpu*42, 3*cpu*4N.

In embodiments, as a result of a certain trigger, each of at least some of the nodes 3*cpu*11, 3*cpu*1N in the first distributed computing sub-system 1*dcss*1 is configured to send a procedure call 71msg1, 71msgN (FIG. 5B) conveying a data-object append message 71msg' (FIG. 5B) to at least one of the nodes 3*cpu*41, 3*cpu*42, 3*cpu*4N of the second distributed computing sub-system 1*dcss*4, so as to result in the second distributed computing sub-system receiving at least some of the procedure calls 71msg1, 71msgN conveying the data-object append message 71msg'; as a result of said reception of the at least some of the procedure-calls 71msg1, 71msgN all conveying the same data-object append message 71msg', each of at least some of the nodes 3*cpu*41, 3*cpu*42, 3*cpu*4N in the second distributed computing sub-system 1*dcss*4 is configured to execute, in conjunction with at least some of the other nodes 3*cpu*41, 3*cpu*42, 3*cpu*4N of the second distributed computing sub-system 1*dcss*4, a consensus mechanism 71*cm* (FIG. 5B) associated with the data-object append message 71msg'; and provided that a consensus has been reached in conjunction with said consensus mechanism 71*cm* regarding appending of the data object 2data (FIG. 5B), the second distributed computing sub-system 1*dcss*4 is configured to redundantly store the data object 2data in storage spaces 3mem41, 3mem42, 3mem4N associated with the different validator computing nodes 3*cpu*41, 3*cpu*42, 3*cpu*4N of the second distributed computing sub-system 1*dcss*4.

In embodiments, as part of said redundant storage: each of at least some of the nodes 3*cpu*41, 3*cpu*42, 3*cpu*4N in the second distributed computing sub-system 1*dcss*4 is configured to store the data object 2data as a respective local replica in a respective storage space 3mem41, 3mem42, 3mem4N, in which each replica of the data object is a complete representation of the data object.

In embodiments, as part of said redundant storage, the system is configured to: use at least one of the nodes, e.g., 3*cpu*41 (FIG. 5B), of the second distributed computing sub-system 1*dcss*4 to encode and expand 1Encode (FIG. 5B) the data object 2data, using an erasure code and/or forward error correction and/or another data-protection mechanism, into a plurality of N fragments 2frag1, 2frag2, 2fragN (FIG. 5B), of which at least K fragments are needed to fully reconstruct the data object, in which K<N; and distribute the N fragments 2frag1, 2frag2, 2fragN among at least some of the storage spaces 3mem41, 3mem42, 3mem4N associated with the nodes 3*cpu*41, 3*cpu*42, 3*cpu*4N of the second distributed computing sub-system 1*dcss*4, e.g., 2frag1 is placed in 3mem41, 2frag2 is placed in 3mem42, and 2fragN is placed in 3mem4N.

In embodiments, as part of said consensus mechanism 71*cm*, each of at least some of the nodes 3*cpu*41, 3*cpu*42, 3*cpu*4N of the second distributed computing sub-system 1*dcss*4 is configured to validate that there are at least K fragments 2frag1, 2frag2, 2fragN available from K different nodes 3*cpu*41, 3*cpu*42, 3*cpu*4N in the second distributed computing sub-system 1*dcss*4, and therefore reconstruction 2Reconstruct (FIG. 5B) of the data object 2data is possible.

In embodiments, as part of said consensus mechanism 71*cm*, each of at least most of the nodes 3*cpu*41, 3*cpu*42, 3*cpu*4N of the second distributed computing sub-system 1*dcss*4 is configured to reconstruct 2Reconstruct the data object 2data from at least K fragments 2frag1, 2frag2, 2fragN retrieved from at least K different nodes 3*cpu*41, 3*cpu*42, 3*cpu*4N in the second distributed computing sub-system 1*dcss*4.

In embodiments, as part of said consensus mechanism 71*cm*, each of at least most of the nodes 3*cpu*41, 3*cpu*42, 3*cpu*4N of the second distributed computing sub-system 1*dcss*4 is configured to validate that said reconstruction 2Reconstruct is also reported multiple times as possible respectively by at least most of the other nodes 3*cpu*41, 3*cpu*42, 3*cpu*4N of the second distributed computing sub-system 1*dcss*4.

In embodiments, as part of said consensus mechanism 71*cm*, each of at least most of the nodes 3*cpu*41, 3*cpu*42, 3*cpu*4N of the second distributed computing sub-system 1*dcss*4 is configured to validate that said multiple reporting was validated by at least most of the other nodes 3*cpu*41, 3*cpu*42, 3*cpu*4N of the second distributed computing sub-system 1*dcss*4.

In embodiments, the erasure code has a code-rate of between ¼ (one quarter) and ¾. (three quarters); each of the storage spaces 3mem41, 3mem42, 3mem4N in the second distributed computing sub-system 1*dcss*4 stores one of the fragments 2frag1, 2frag2, 2fragN; N is equal or greater than 5 (five); and therefore each of the storage spaces 3mem41, 3mem42, 3mem4N uses less than the size of the data object 2data in conjunction with storing the respective fragment.

In embodiments, the erasure code has a code-rate of between ⅙ (one sixth) and ⅚ (five sixths).

In embodiments, the erasure code is a rateless code.

In embodiments, a decentralized consensus-based object-oriented system comprises: a plurality of validator computing nodes 3*cpu* (FIG. 5B); a first distributed computing sub-system 1*dcss*6 (FIG. 5B) constituting a first object 1obj6 (FIG. 5B), comprising a first combination of at least some of the validator computing nodes 3*cpu*61, 3*cpu*6N (FIG. 5B); and a second distributed computing sub-system 1*dcss*4 (FIG. 5B) created specifically to constitute at least one data object, comprising a second combination of at least some of the validator computing nodes 3*cpu*41, 3*cpu*42, 3*cpu*4N.

In embodiments, as a result of a certain trigger, each of at least some of the nodes 3*cpu*61, 3*cpu*6N in the first distributed computing sub-system 1*dcss*6 is configured to send a procedure call 61msg1, 61msgN (FIG. 5B) conveying a data-object read request 61msg' (FIG. 5B) to at least one of the nodes 3*cpu*41, 3*cpu*42, 3*cpu*4N of the second distributed computing sub-system 1*dcss*4, so as to result in the second distributed computing sub-system receiving at least some of the procedure calls 61msg1, 61msgN conveying the data-object read request 61msg'; as a result of said reception of the at least some of the procedure-calls 61msg1, 61msgN all conveying the same data-object read request 61msg', each of at least some of the nodes in the second distributed computing sub-system 3*cpu*41, 3*cpu*42, 3*cpu*4N is configured to execute, in conjunction with at least some of the other nodes of the second distributed computing sub-system 3*cpu*41, 3*cpu*42, 3*cpu*4N, a consensus mechanism 61*cm* (FIG. 5B) associated with the data-object read request 61msg'; and provided that a consensus has been reached in conjunction with said consensus mechanism 61*cm* regarding reading of the data object 2data (FIG. 5B), each of at least some of the nodes 3*cpu*41, 3*cpu*42, 3*cpu*4N in the second distributed computing sub-system 1*dcss*4 is configured to respond with a message 62msg1, 62msgN (FIG. 5B) conveying 62msg' (FIG. 5B) the data object 2data to at least one of the nodes of the first distributed computing sub-system 1*dcss*6, so as to result in the first distributed computing sub-system receiving multiple responses 62msg1, 62msgN conveying 62msg' the same data object 2data.

In embodiments, prior to said conveying 62msg' of the data object 2data: each of at least some of the nodes 3*cpu*41, 3*cpu*42, 3*cpu*4N in the second distributed computing sub-system 1*dcss*4. is configured to fetch a local replica of the data object 2data from a respective local storage space 3mem41, 3mem42, 3mem4N and use the replica for said conveying of the data object.

In embodiments, prior to the conveying of said requests 61msg1, 61msgN, the system is configured to: encode and expand 1Encode (FIG. 5B) the data object 2data, using an erasure code and/or another data-protection code, into a plurality of N fragments 2frag1, 2frag2, 2fragN (FIG. 5B), of which at least K fragments are needed to fully reconstruct the data object, in which K<N; and distribute the N fragments 2frag1, 2frag2, 2fragN among at least some of the storage spaces 3mem41, 3mem42, 3mem4N associated with the nodes 3*cpu*41, 3*cpu*42, 3*cpu*4N of the second distributed computing sub-system 1*dcss*4; in which prior to said conveying 62msg' of the data object 2data, each of at least some of the nodes 3*cpu*41, 3*cpu*42, 3*cpu*4N in the second distributed computing sub-system 1*dcss*4 is configured to reconstruct 2Reconstruct (FIG. 5B) the data object 2data by decoding at least K of the fragments 2frag1, 2frag2, 2fragN that are fetched from at least a respective K of the nodes 3*cpu*41, 3*cpu*42, 3*cpu*4N of the second distributed computing sub-system 1*dcss*4.

In embodiments, the erasure code has a code-rate of between ½ (one half) and ¾ (three quarters); each of the storage spaces 3mem41, 3mem42, 3mem4N in the second distributed computing sub-system 1*dcss*4 stores one of the fragments 2frag1, 2frag2, 2fragN; and therefore said reconstruction 2Reconstruct requires more than 50 (fifty) percent of the associated nodes 3*cpu*41, 3*cpu*42, 3*cpu*4N in the second distributed computing sub-system to send the respective fragments 2frag1, 2frag2, 2fragN in conjunction with said fetching; in which each of the nodes 3*cpu*41, 3*cpu*42, 3*cpu*4N in the second distributed computing sub-system agrees to participate in said fetching provided that the consensus has been reached in conjunction with the consensus mechanism 61*cm* regarding reading of the data object 2data; and therefore the data object 2data can be reconstructed 2Reconstruct only upon said consensus being reached.

In embodiments, a decentralized consensus-based object-oriented system comprises: a distributed computing sub-system 1*dcss*4 (FIG. 5B) created specifically to constitute at least one data object 2data, comprising a combination of at least some of a plurality of validator computing nodes 3*cpu*41, 3*cpu*42, 3*cpu*4N.

In embodiments, the system is configured to: encode and expand 1Encode (FIG. 5B) the data object 2data, using an erasure code, into a plurality of N fragments 2frag1, 2frag2, 2fragN (FIG. 5B), of which at least K fragments are needed to fully reconstruct the data object 2data, in which K<N; and distribute the N fragments 2frag1, 2frag2, 2fragN among at least some of storage spaces 3mem41, 3mem42, 3mem4N associated with the nodes 3*cpu*41, 3*cpu*42, 3*cpu*4N of the distributed computing sub-system 1*dcss*4; in which: the erasure code has a code-rate of between ½ (one half) and ¾. (three quarters); each of the storage spaces 3mem41, 3mem42, 3mem4N in the distributed computing sub-system 1*dcss*4 stores one of the fragments 2frag1, 2frag2, 2fragN; and therefore reconstruction 2Reconstruct of the data object from the fragments requires more than 50 (fifty) percent of the associated nodes 3cpu41, 3cpu42, 3cpu4N in the distributed computing sub-system to send the respective fragments 2frag1, 2frag2, 2fragN in conjunction with a request to obtain the fragments; wherein each of the nodes 3cpu41, 3cpu42, 3cpu4N in the distributed computing sub-system is configured to agree to send the respective fragment, as a response said request, provided that a consensus has been reached among the nodes 3cpu41, 3cpu42, 3cpu4N regarding the request; and therefore the data object 2data can be reconstructed 2Reconstruct only upon said consensus being reached.

In embodiments, a decentralized consensus-based object-oriented system comprises: a plurality of validator computing nodes; a first distributed computing sub-system associated with first object information associated with a first object, the first distributed computing sub-system including a first group of validator computing nodes of the plurality of validator computing nodes; and an administrative distributed computing sub-system, comprising a second group of validator computing nodes of the plurality of validator computing nodes.

In embodiments, in response to a trigger, each validator computing node of the first group of validator computing nodes in the first distributed computing sub-system may be configured to send a procedure call conveying a first object-creation message to at least one validator computing node of the second group of validator computing nodes, such that the administrative distributed computing sub-system receives multiple procedure calls conveying the object-creation message; after the multiple procedure calls conveying the object creation message are received, each validator computing node of the second group of validator computing nodes may be configured to execute, in conjunction with at least some other validator computing nodes of the administrative distributed computing sub-system, a consensus scheme associated with the object-creation message; and provided that a consensus has been reached in conjunction with said consensus scheme regarding creation of a new object, the administrative distributed computing sub-system may be configured to define a second distributed computing sub-system associated with second object data associated with the new object, the second distributed computing sub-system including a third group of validator computing nodes.

In embodiments, as a result of at least two procedure calls conveying a triggering message in the first distributed computing sub-system, each validator computing node of the first group of validator computing nodes in the first distributed computing sub-system may be configured to: execute, in conjunction with at least some of other validator computing nodes of the first distributed computing sub-system, a consensus scheme associated with the triggering message; process the triggering message, and consequently reach a conclusion that the new object is to be created; and reach a consensus in conjunction with said consensus scheme regarding the triggering message, in which said consensus is the trigger.

In embodiments, the first object may be associated with and subordinate to a first entity external to the system; and said triggering message may be initiated by the first entity.

In embodiments, said first entity may be a person; said first object may be a representation of the person in the system; and said new object may be an object created to facilitate an operation mandated by the person.

In embodiments, said new object may be a new post published by the person in conjunction with social network activity.

In embodiments, said new object may be a new account created by the person in conjunction with a financial activity.

In embodiments, said new object may be a new mirror data object operative to mirror and/or register activities associated with a tangible object, in which the tangible object comprises at least one of: (i) a smartphone associated with the person, or (ii) a personal computer associated with the person.

In embodiments, said new object may be a new mirror data object operative to mirror and/or register activities associated with a bank account associated with the person.

In embodiments, said first entity may be a financial institution comprising at least one of: (i) a bank, (ii) an exchange, (iii) an investment vehicle, (iv) a custodian, (v) a store of value, and/or (vi) a ledger of rights and/or obligations. In embodiments, said first object may be a representation of the financial institution in the system. In embodiments, said new object may be a new account facilitated by the financial institution in favor of a client entity.

In embodiments, the first object may be a data manager; and said new object may be a new data object created by the data manager.

In embodiments, the second object information associated with the new data object may be redundantly stored in storage spaces associated with different validator computing nodes of the second group of validator computing nodes of the second distributed computing sub-system. In embodiments, each replica of the second object information associated with the data object may be a complete representation of the data object in one of the respective storage spaces associated with the validator computing nodes.

In embodiments, the second object information associated with the new data object may be expanded and fragmented in conjunction with a certain code rate using a data-protection/encoding function in which each of the fragments is stored in one of the storage spaces associated with the different validator computing nodes of the second group of validator computing nodes of the second distributed computing sub-system. In embodiments, reconstruction of the second data information associated with the data object from the fragments may require cooperation of at least some of the respective validator computing nodes of the second group of validator computer nodes.

In embodiments, the code rate may be a number smaller than 1 (one) and bigger than 0 (zero).

In embodiments, the first object data associated with the first object may be redundantly stored in different validator computing nodes of the first group of validator computing nodes of the first distributed computing sub-system; and the second object data associated with the new object may be redundantly stored in different validator computing nodes of the third group of validator computing nodes of the second distributed computing sub-system.

In embodiments, the first object data associated with the first object may be recorded in conjunction with a respective first blockchain data structure; and the second object data associated with the new object may be recorded in conjunction with a respective second blockchain data structure.

In embodiments, a decentralized consensus-based object-oriented system comprises a plurality of validator computing nodes; and a first distributed computing sub-system associated with first object information associated with a first object, the first distributed computing sub-system including a first group of validator computing nodes.

In embodiments, as a result of a trigger mandating creation of a new object, each validator computing node of the first group of the validator computing nodes in the first distributed computing sub-system may be configured to execute, in conjunction with at least some other validator computing nodes of the first group of validator computing nodes of the first distributed computing sub-system, a consensus scheme associated with the trigger; and provided that a consensus is reached in conjunction with said consensus scheme regarding the trigger, the first distributed computing sub-system may be configured to define a second distributed computing sub-system associated with second object information associated with a new object, the second distributed computing sub-system comprising a second group of validator computing nodes.

In embodiments, a decentralized consensus-based object-oriented system comprises: a plurality of validator computing nodes; a first distributed computing sub-system associated with first object information associated with a first object, the first distributed computing sub-system comprising a first group of validator computing nodes; and a second distributed computing sub-system subordinate to the first object and associated with second object information associated with at least one data object, the second distributed computing sub-system comprising a second group of validator computing nodes.

In embodiments, as a result of a trigger, each validator computing node of the first group of validator computing nodes in the first distributed computing sub-system may be configured to send a procedure call conveying a data-object append message to at least one validator computer node of the second group of validator computer nodes of the second distributed computing sub-system, such that the second distributed computing sub-system receives at least two procedure calls conveying the data-object append message; as a result of receiving the procedure calls conveying the data-object append message, each validator computing node of the second group of validator computing nodes in the second distributed computing sub-system may be configured to execute, in conjunction with other validator computing nodes of the second group of the validator computing nodes of the second distributed computing sub-system, a consensus scheme associated with the data-object append message; and provided that a consensus has been reached in conjunction with said consensus scheme regarding appending of the data object, the second distributed computing sub-system may be configured to redundantly store the second object information associated with the data object in storage spaces associated with the different validator computing nodes of the second group of validator computing nodes of the second distributed computing sub-system.

In embodiments, each validator computing node of the second group of validator computing nodes of the second distributed computing sub-system may be configured to store the second data information associated with the data object as a respective local replica in a respective storage space. In embodiments, each replica of the second data information associated with the data object may be a complete representation of the data object.

In embodiments, the system may be configured to: use at least one validator computing node of the second group of validator computing nodes of the second distributed computing sub-system to encode and expand the second object information associated with the data object, using an erasure code and/or forward error correction and/or another data-protection scheme, into a plurality of N fragments, of which at least K fragments are needed to fully reconstruct the second object information associated with the data object, in which K<N; and distribute the N fragments among at least some of the storage spaces associated with the validator computing nodes of the second distributed computing sub-system.

In embodiments, as part of said consensus scheme, each validator computing node of the second group of validator computing nodes of the second distributed computing sub-system may be configured to validate that there are at least K fragments available from K different nodes in the second distributed computing sub-system, and therefore reconstruction of the second object information associated with the data object is possible.

In embodiments, as part of said consensus scheme, at least most of the validator computing nodes of the second group of validator computing nodes of the second distributed computing sub-system may be configured to reconstruct the second object information associated with the data object from at least K fragments retrieved from at least K different validator computing nodes of the second group of validating computing nodes in the second distributed computing sub-system.

In embodiments, as part of said consensus scheme, at least most of the validator computing nodes of the second group of validator computing nodes of the second distributed computing sub-system may be configured to validate that said reconstruction is also reported multiple times as possible respectively by at least most other validator computing nodes of the second group of validator computing nodes of the second distributed computing sub-system.

In embodiments, as part of said consensus scheme, at least most of the validator computing nodes of the second group of validator computing nodes of the second distributed computing sub-system may be configured to validate that said multiple reporting was validated by at least most other validator computing nodes of the second group of validator computing nodes of the second distributed computing sub-system.

In embodiments, the erasure code may have a code-rate of between $1/4$ (one quarter) and $3/4$ (three quarters); each of the storage spaces associated with the second distributed computing sub-system may store one of the fragments; N may be equal or greater than 5 (five); and each of the storage spaces may use less storage space than a size of the second object information associated with the data object in conjunction with storing the respective fragment.

In embodiments, the erasure code may have a code-rate of between $1/6$ (one sixth) and $5/6$ (five sixths).

In embodiments, the erasure code may be a rateless code.

In embodiments, a decentralized consensus-based object-oriented system comprises: a plurality of validator computing nodes; a first distributed computing sub-system associated with first object information associated with a first object, the first distributed computing sub-system comprising a first group of validator computing nodes; and a second distributed computing sub-system associated with second object information associated with at least one data object, the second distributed computing sub-system comprising a second group of validator computing nodes.

In embodiments, as a result of a certain trigger, each validator computing node of the first group of validator computing nodes in the first distributed computing sub-system may be configured to send a procedure call conveying a data-object read request to at least one validator computing nodes of the second group of validator computing nodes of the second distributed computing sub-system, such that the second distributed computing sub-system receives procedure calls conveying the data-object read request; as a result of said reception of the procedure calls conveying the data-object read request, each validator computing node of the second group of validating computing nodes in the second distributed computing sub-system may be configured to execute, in conjunction with at least some other validating computing nodes of the second group of validating computing nodes of the second distributed computing sub-system, a consensus scheme associated with the data-object read request; and provided that a consensus has been reached in conjunction with said consensus scheme regarding reading of the data object, each validating computing node of the second group of validating computing nodes in the second distributed computing sub-system may be configured to respond with a message conveying the second object information associated with the data object to at least one of the validator computing nodes of the first distributed computing sub-system, such that the first distributed computing sub-system received multiple responses conveying the second object information associated with the data object.

In embodiments, prior to said conveying the second object information associated with the data object: each validator computing node of the second group of validator computing nodes in the second distributed computing sub-system may be configured to fetch a local replica of the second object information from a respective local storage space and use the replica for conveying of the second object information associated with the data object.

In embodiments, prior to the conveying said requests, the system may be configured to: encode and expand the second object information associated with the data object, using an erasure code and/or another data-protection code, into a plurality of N fragments, of which at least K fragments are needed to fully reconstruct the second object information associated with the data object, in which K<N; and distribute the N fragments among at least some of the storage spaces associated with the validator computing nodes of the second distributed computing sub-system. In embodiments, prior to conveying the second object information associated with the data object, each validator computing node of the second group of validator computing nodes in the second distributed computing sub-system may be configured to reconstruct the second object information associated with the data object by decoding at least K of the fragments that are fetched from at least a respective K of the validator computing nodes of the second distributed computing sub-system.

In embodiments, the erasure code may have a code-rate of between ½ (one half) and ¾ (three quarters); each of the storage spaces associated with the second distributed computing sub-system mays tore one of the fragments; and therefore said reconstruction may require more than 50 (fifty) percent of the validator computing nodes in the second distributed computing sub-system to send the respective fragments in conjunction with said fetching; in which each of the validator computing nodes in the second distributed computing sub-system agrees to participate in said fetching provided that the consensus has been reached in conjunction with the consensus scheme regarding reading of the data object; and the data object is reconstructed only upon said consensus being reached.

In embodiments, a decentralized consensus-based object-oriented system comprises: a distributed computing sub-system associated with first object information associated with at least one data object, the distributed computing sub-system comprising a first group of validator computing nodes of a plurality of validator computing nodes.

In embodiments, the system may be configured to: encode and expand the first object information associated with the data object, using an erasure code, into a plurality of N fragments, of which at least K fragments are needed to fully reconstruct the data object, in which K<N; and distribute the N fragments among storage spaces associated with the validator computing nodes of the distributed computing sub-system; in which: the erasure code has a code-rate of between ½ (one half) and ¾ (three quarters); each of the storage spaces associated with the distributed computing sub-system stores one of the fragments; and reconstruction of the first object information associated with the data object from the fragments requires more than 50 (fifty) percent of the validator computing nodes in the distributed computing sub-system to send the respective fragments in conjunction with a request to obtain the fragments. In embodiments, each validator computing node of the first group of validator computing nodes in the distributed computing sub-system may be configured to agree to send the respective fragment, as a response to said request, provided that a consensus has been reached among the first group of validator computing nodes regarding the request. In embodiments, the data object may be reconstructed only upon said consensus being reached.

In embodiments, a decentralized consensus-based object-oriented system comprises: a plurality of computing nodes associated respectively with a plurality of data storage spaces; a plurality of objects, in which each of the objects is associated with at least one respective code component describing a respective behavior of the object and a respective data state describing a current data state of the object, in which: (i) the code components and data states of the objects are stored in at least some of the storage spaces, and (ii) each of at least some of the objects is configured to initiate a respective interaction with at least some of the other objects by sending a message to the at least some of the other objects, thereby forming a network of interacting objects; and a plurality of validation clusters, in which: (i) each validation cluster is associated with a unique sub-set of the computing nodes and associated data spaces, and (ii) each of the code components and data states is redundantly stored across at least some of the validation clusters.

In embodiments, in response to each message received by any one of the objects from another of the objects in conjunction with any one of said interactions, the system may be configured to trigger an inter-validation-cluster procedure, in which each of the validation-clusters may be configured to: execute, in conjunction with at least some of the other validation-clusters, a consensus scheme regarding at least a certain detail associated with the message; and provided that a consensus has been reached regarding said certain detail, each validator cluster associated with the consensus is configured to independently and redundantly, in respect to the other validation clusters, act on the message in conjunction with the object receiving the message and the respective code component and data state, under a constraint imposed by the certain detail that is now in consensus, such that the respective interaction has been made coherent across at least the validation clusters associated with the consensus preserving data-state coherence across the network of interacting objects.

Figure 6A:
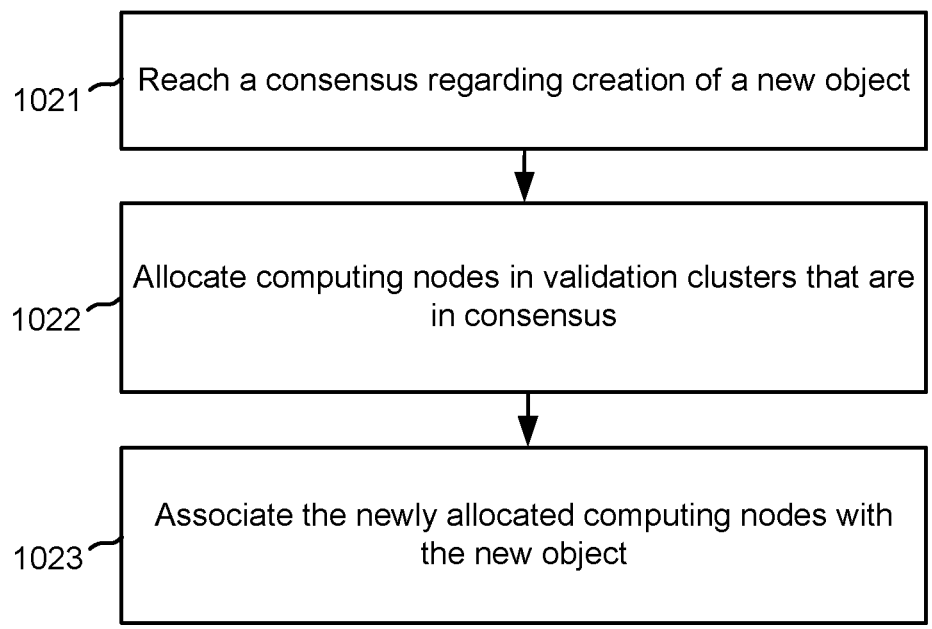
FIG. 6A illustrates a method in accordance with embodiments for creating a new object in conjunction with the decentralized consensus-based object-oriented system.

FIG. 6A illustrates a method in accordance with embodiments for creating a new object in conjunction with the decentralized consensus-based object-oriented system. The method includes: in step 1021, reaching a consensus 31*cm* (FIG. 5A), among a first plurality of computing nodes 3*cpu*01, 3*cpu*0N (FIG. 5A) belonging to a respective plurality of validation clusters 2validator1, 2validatorN (FIG. 1A), regarding a pending request 31msg' to create a new object 1obj2. In step 1022, provided that a consensus has been reached, allocating, by each of the validator clusters 2validator1, 2validatorN in consensus, a new respective computing node, thereby allocating a second plurality of computing nodes 3*cpu*21, 3*cpu*2N (FIG. 5A) belonging to the respective plurality of validation clusters 2validator1, 2validatorN. In step 1023, associating the second plurality of computing nodes 3*cpu*21, 3*cpu*2N. with the new object, thereby complying with the request to create the new object 1obj2.

Figure 6B:
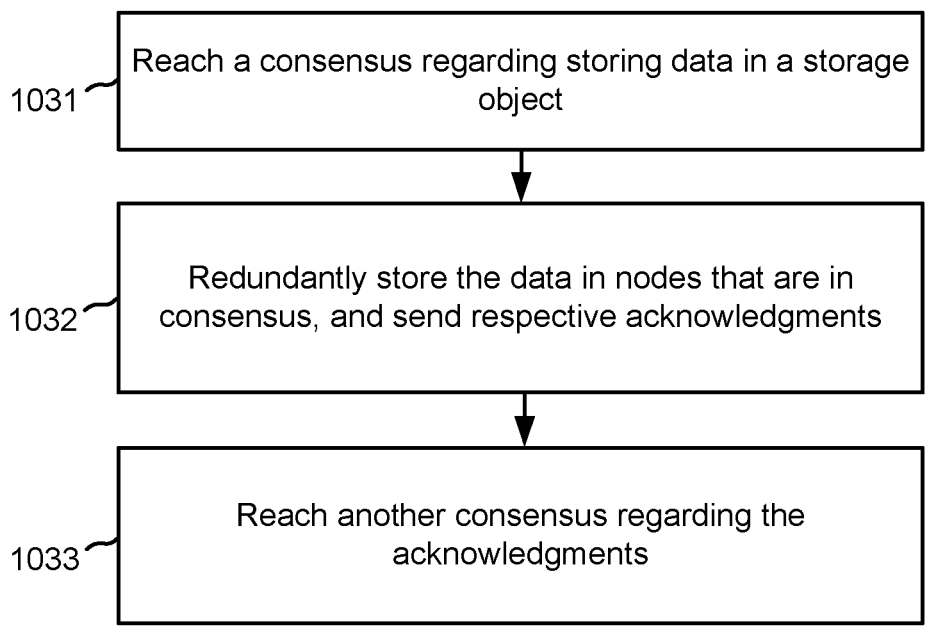
FIG. 6B illustrates a method in accordance with embodiments for writing data to an object in conjunction with the decentralized consensus-based object-oriented system.

FIG. 6B illustrates a method in accordance with embodiments for writing data to an object in conjunction with the decentralized consensus-based object-oriented system. The method includes: in step 1031, reaching a consensus 71*cm* (FIG. 5B), among a plurality of computing nodes 3*cpu*41, 3*cpu*4N (FIG. 5B) belonging to a respective plurality of validation clusters 2validator1, 2validatorN (FIG. 1A) and constituting a storage object 1obj4, regarding a pending request 71msg' from a requesting object 1obj1 to store data 2data in conjunction with the storage object. In step 1032, provided that the consensus has been reached 71*cm* regarding storing of the data 2data, redundantly storing the data 2data in storage spaces 3mem41, 3mem42, 3mem4N associated with the nodes 3*cpu*41, 3*cpu*42, 3*cpu*4N of the storage object and sending a store-acknowledge messages 72msg' to the requesting object. In step 1033, reaching another consensus 72*cm*, among a plurality of computing nodes 3*cpu*11, 3*cpu*1N (FIG. 5B) belonging to the respective plurality of validation clusters 2validator1, 2validatorN and constituting the requesting object 1obj1, regarding the store-acknowledge messages 72msg', thereby validating that the data has been successfully stored.

Figure 6C:
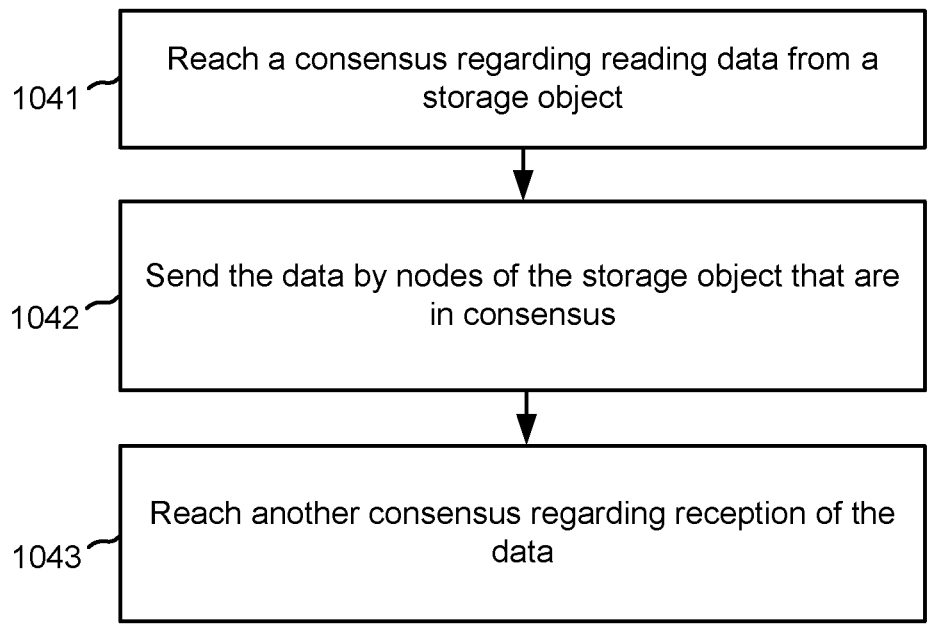
FIG. 6C illustrates a method in accordance with embodiments for reading data from an object in conjunction with the decentralized consensus-based object-oriented system.

FIG. 6C illustrates a method in accordance with embodiments for reading data from an object in conjunction with the decentralized consensus-based object-oriented system. The method includes: in step 1041, reaching a consensus 61*cm* (FIG. 5B), among a plurality of computing nodes 3*cpu*41, 3*cpu*4N (FIG. 5B) belonging to a respective plurality of validation clusters 2validator1, 2validatorN (FIG. 1A) and constituting a storage object 1obj4 (FIG. 5B), regarding a pending request 61msg' (FIG. 5B) from a requesting object 1obj6 (FIG. 5B) to read data 2data in conjunction with the storage object. In step 1042, provided that the consensus has been reached 61*cm* regarding reading the data 2data, sending, by each of at least some of the computing nodes 3*cpu*41, 3*cpu*4N in the storage object 1obj4 that are in consensus, the data 2data to at least one of a plurality of computing nodes 3*cpu*61, 3*cpu*6N (FIG. 5B) belonging to the requesting object 1obj6. In step 1043, reaching another consensus 62*cm* (FIG. 5B), among the plurality of computing nodes 3*cpu*61, 3*cpu*6N of the requesting object 1obj6, regarding reception of the data 2data, thereby validating that the data has been correctly received.

Figure 6D:
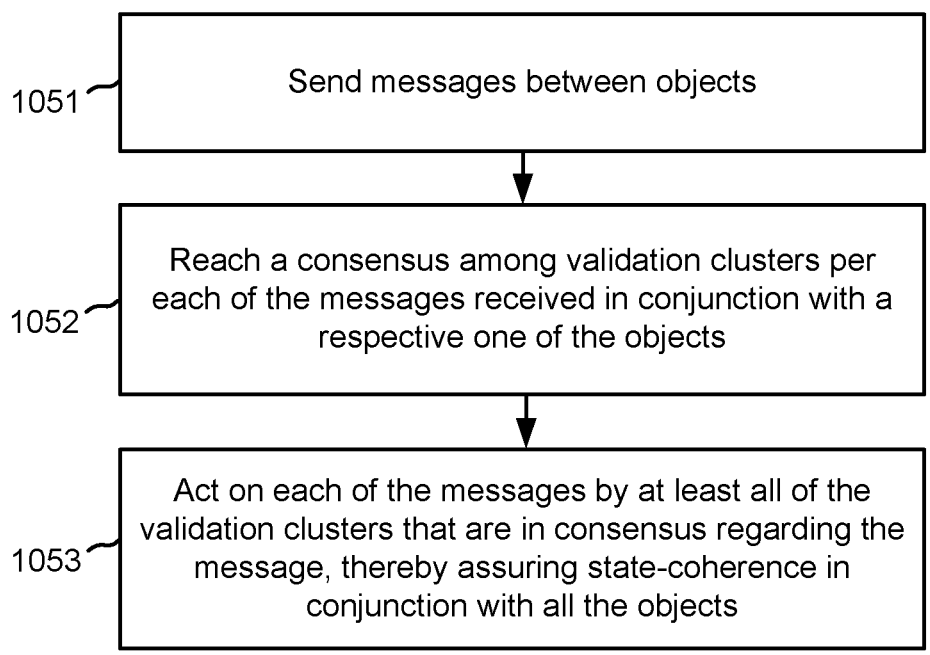
FIG. 6D illustrates a method in accordance with embodiments for preserving data-state coherence across a network of interacting objects and in conjunction with the decentralized consensus-based object-oriented system.

FIG. 6D illustrates a method in accordance with embodiments for preserving data-state coherence across a network of interacting objects and in conjunction with the decentralized consensus-based object-oriented system. The method includes: in step 1051, sending, in the network of interacting objects 1obj1, 1obj2, 1obj3, 1obj4, 1obj5, 1obj6 (FIG. 5B, FIG. 7A) and in conjunction with interactions 11inter, 21inter, 41inter, 51inter, 61 inter, 71inter between the objects, messages, e.g., 71msg', from each of at least some of the objects to one of the other objects, thereby resulting in a plurality of inter-object messages. In step 1052, per each of the messages received in conjunction with a respective one of the objects, reaching a respective consensus, e.g., 71*cm*, among a plurality of validation computing clusters 2validator1, 2validator2, 2validator3, 2validatorN (FIG. 1A), regarding the message received. In step 1053, acting, per each of the messages received in conjunction with a respective one of the objects and according to a respective content of the message, by each of the validation computing clusters in consensus regarding the message, thereby assuring that any change of data-state, e.g., 4*c*TS to 4*n*TS (FIG. 1E), arising from acting on the message and in conjunction with the respective object, is coherent across the validation computing clusters in consensus.

Figure 6E:
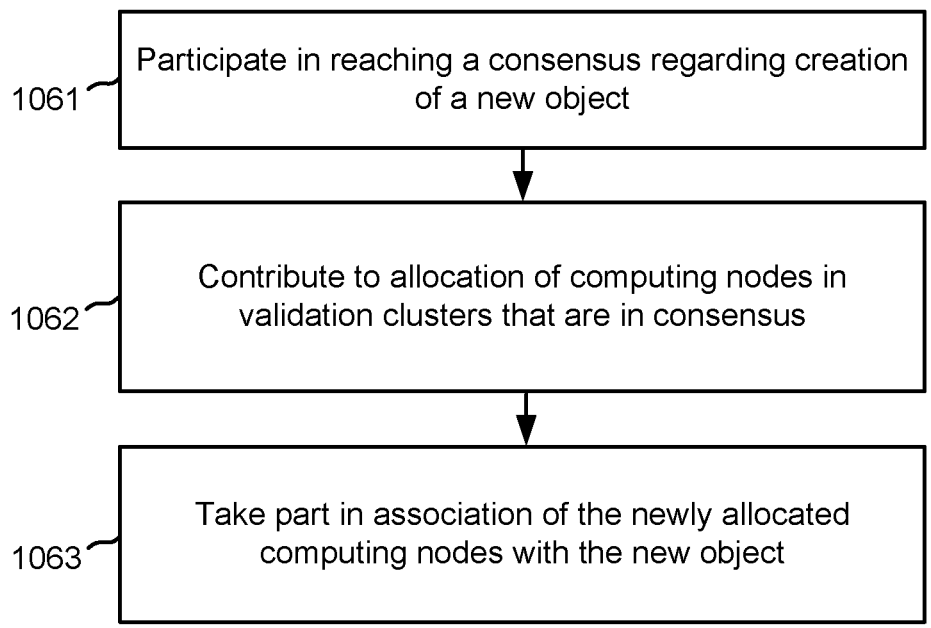
FIG. 6E illustrates a method in accordance with embodiments for creating a new object in conjunction with the decentralized consensus-based object-oriented system.

FIG. 6E illustrates a method in accordance with embodiments for creating a new object in conjunction with the decentralized consensus-based object-oriented system. The method includes: in step 1061, participating, e.g. by 3*cpu*01, in a consensus mechanism 31*cm* (FIG. 5A), in conjunction with a first plurality of computing nodes 3*cpu*01, 3*cpu*0N (FIG. 5A) belonging to a respective plurality of validation clusters 2validator1, 2validatorN, regarding a pending request 31msg' to create a new object 1obj2. In step 1062, provided that a consensus has been reached, allocating a new respective computing node, e.g., 3*cpu*21, in at least one of the validation clusters 2validator1, thereby contributing to an allocation of a second plurality of computing nodes 3*cpu*21, 3*cpu*2N belonging to the respective plurality of validation clusters 2validator1, 2validatorN. In step 1063, taking part in association of the second plurality of computing nodes with the new object, e.g., associating 3*cpu*21 with 1obj2, thereby complying with the request to create the new object.

Figure 6F:
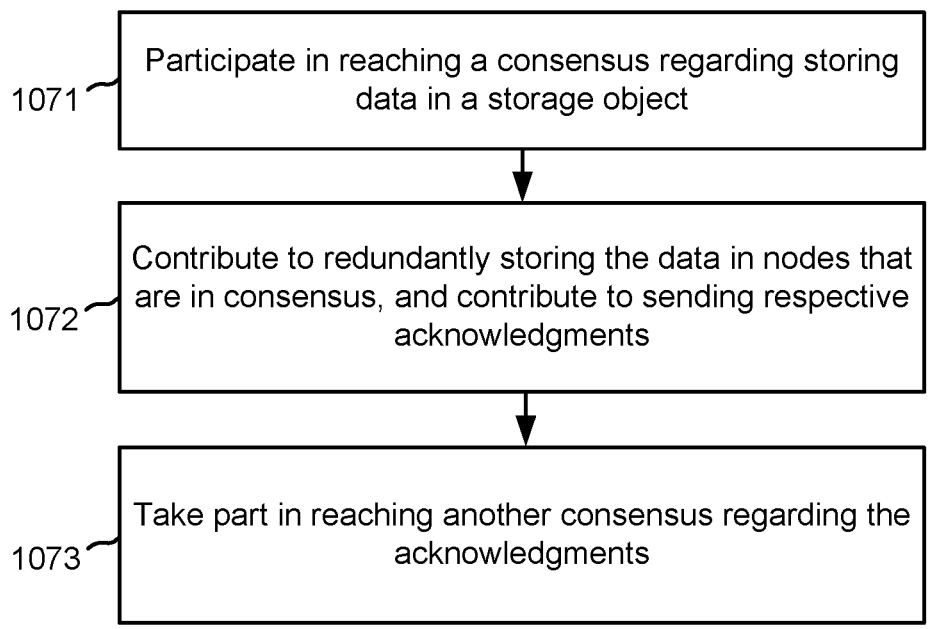
FIG. 6F illustrates a method in accordance with embodiments for writing data to an object in conjunction with the decentralized consensus-based object-oriented system.

FIG. 6F illustrates a method in accordance with embodiments for writing data to an object in conjunction with the decentralized consensus-based object-oriented system. The method includes: in step 1071, participating, e.g., by 3*cpu*41, in reaching a consensus 71*cm* (FIG. 5B), among a plurality of computing nodes 3*cpu*41, 3*cpu*4N (FIG. 5B) belonging to a respective plurality of validation clusters 2validator1, 2validatorN (FIG. 1A) and constituting a storage object 1obj4, regarding a pending request 71msg' from a requesting object 1obj1 to store data 2data in conjunction with the storage object. In step 1072, provided that the consensus has been reached 71*cm* regarding storing of the data 2data, contributing, e.g., by 3*cpu*41 in conjunction with 3mem41, to redundantly storing the data 2data in storage spaces 3mem41, 3mem42, 3mem4N associated with the nodes 3*cpu*41, 3*cpu*42, 3*cpu*4N of the storage object and contributing to sending a store-acknowledge messages 72msg' to the requesting object. In step 1073, taking part, e.g., by 3*cpu*11, in reaching another consensus 72*cm*, among a plurality of computing nodes 3*cpu*11, 3*cpu*1N (FIG. 5B) belonging to the respective plurality of validation clusters 2validator1, 2validatorN and constituting the requesting object 1obj1, regarding the store-acknowledge messages 72msg', thereby taking part in validating that the data has been successfully stored.

Figure 6G:
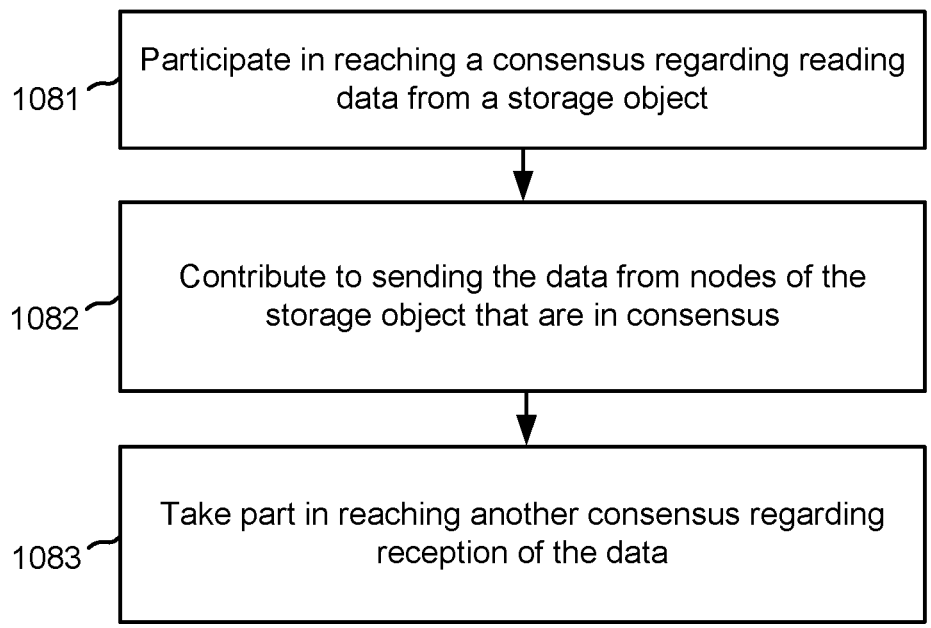
FIG. 6G illustrates a method in accordance with embodiments for reading data from an object in conjunction with the decentralized consensus-based object-oriented system.

FIG. 6G illustrates a method in accordance with embodiments for reading data from an object in conjunction with the decentralized consensus-based object-oriented system. The method includes: in step 1081, participating, e.g., by 3*cpu*41, in reaching a consensus 61*cm* (FIG. 5B), among a plurality of computing nodes 3*cpu*41, 3*cpu*4N (FIG. 5B) belonging to a respective plurality of validation clusters 2validator1, 2validatorN (FIG. 1A) and constituting a storage object 1obj4 (FIG. 5B), regarding a pending request 61msg' (FIG. 5B) from a requesting object 1obj6 (FIG. 5B) to read data 2data in conjunction with the storage object. In step 1082, provided that the consensus has been reached 61*cm* regarding reading the data 2data, contributing, e.g., by 3*cpu*41, to sending, by each of at least some of the computing nodes 3*cpu*41, 3*cpu*4N in the storage object 1obj4 that are in consensus, the data 2data to at least one of a plurality of computing nodes 3*cpu*61, 3*cpu*6N (FIG. 5B) belonging to the requesting object 1obj6. In step 1083, taking part in, e.g., by 3*cpu*61, in reaching another consensus 62*cm* (FIG. 5B), among the plurality of computing nodes 3*cpu*61, 3*cpu*6N of the requesting object 1obj6, regarding reception of the data 2data, thereby taking part in validating that the data has been correctly received.

Figure 6H:
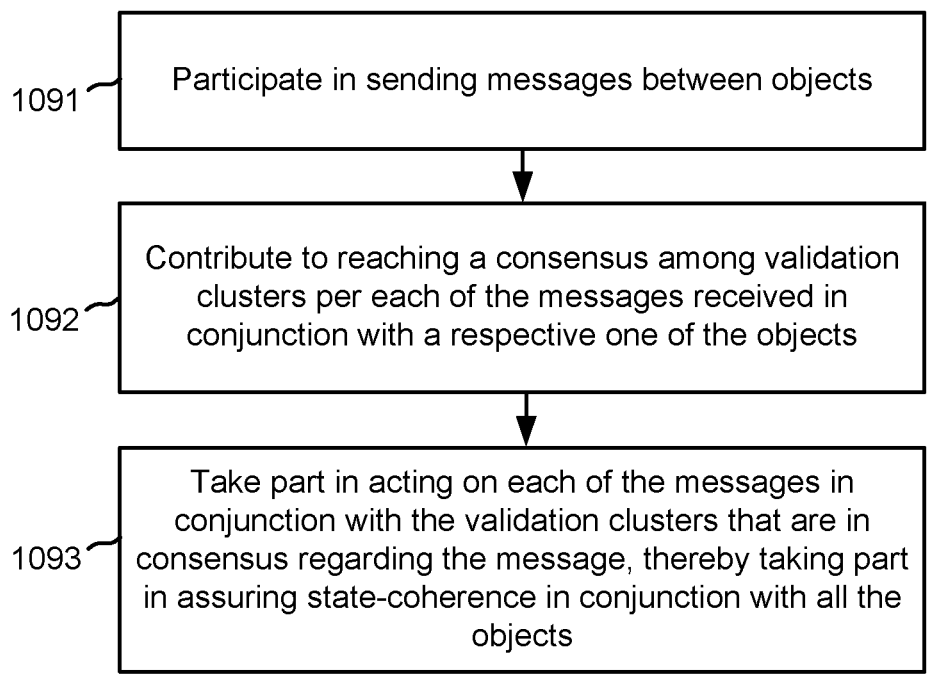
FIG. 6H illustrates a method in accordance with embodiments for preserving data-state coherence across a network of interacting objects and in conjunction with the decentralized consensus-based object-oriented system.

FIG. 6H illustrates a method in accordance with embodiments for preserving data-state coherence across a network of interacting objects and in conjunction with the decentralized consensus-based object-oriented system. The method includes: in step 1091, participating, e.g., by 2validator1, in sending, in the network of interacting objects 1obj1, 1obj2, 1obj3, 1obj4, 1obj5, 1obj6 (FIG. 5B, FIG. 7A) and in conjunction with interactions 11inter, 21inter, 41inter, 51inter, 61 inter, 71inter between the objects, messages, e.g., 71msg', from each of at least some of the objects to one of the other objects, thereby resulting in a plurality of inter-object messages. In step 1092, per each of the messages received in conjunction with a respective one of the objects, contributing, e.g., by 2validator1, to reaching a respective consensus, e.g., 71*cm*, among a plurality of validation computing clusters 2validator1, 2validator2, 2validator3, 2validatorN (FIG. 1A), regarding the message received. In step 1093, taking part, e.g., by 2validator1, in acting, per each of the messages received in conjunction with a respective one of the objects and according to a respective content of the message, and in conjunction with the validation computing clusters 2validator1, 2validator2, 2validator3, 2validatorN in consensus regarding the message, thereby taking part in assuring that any change of data-state, e.g., 4*c*TS to 4*n*TS (FIG. 1E), arising from acting on the message and in conjunction with the respective object, is coherent across the validation computing clusters in consensus.

Embodiments include a decentralized consensus-based object-oriented system, comprising: a plurality of computing nodes 3*cpu* (FIG. 5B, FIG. 7A) associated respectively with a plurality of data storage spaces 3mem (FIG. 7A); a plurality of objects 1obj1, 1obj2, 1obj3, 1obj4, 1obj5, 1obj6 (FIG. 5B, FIG. 7A), in which each of the objects, e.g., object 1obj1, comprises at least one respective code component, e.g., 11code1, 71code1, describing a respective behavior of the object and a respective data state describing a current data state of the object, in which: (i) the code components and data states of the objects, e.g., of object 1obj1, are stored in at least some of the storage spaces, e.g., 11code1, 71code1, and the data state of object 1obj1 are stored in storage spaces 3mem11 to 3mem1N, and (ii) each of at least some of the objects, e.g., object 1obj1, is configured to initiate a respective interaction, e.g., 71 inter, with each of at least some of the other objects, e.g., with object 1obj4, by sending a message to the other object, e.g., sending 71msg' to 1obj4, thereby forming a network 11inter, 21inter, 41 inter, 51 inter, 61 inter, 71 inter of interacting objects 1obj1, 1obj2, 1obj3, 1obj4, 1obj5, 1obj6; and a plurality of validation clusters 2validator1, 2validator2, 2validator3, 2validatorN (FIG. 1A), in which: (i) each of the validations clusters comprises a unique sub-set of the computing nodes 3*cpu* and associated data spaces 3mem, and (ii) each of the code components and data states is redundantly stored across at least some of the validation clusters, e.g., 11code1, 71code1, and the data state of object 1obj1 are redundantly stored in storage spaces 3mem11 to 3mem1N associated respectively with validation clusters 2validator1 to 2validatorN.

In embodiments, per each one of said messages received by any one of the objects from another of the objects in conjunction with any one of said interactions, e.g., 71msg' received in 1obj4 from 1obj1 in conjunction with 71inter, the system is configured to trigger an inter validation-cluster procedure, in which as part of said inter validation-cluster procedure, each of the validation-clusters 2validator1, 2validator2, 2validator3, 2validatorN is configured to: execute, in conjunction with at least some of the other validation-clusters 2validator1, 2validator2, 2validator3, 2validatorN, a consensus mechanism, e.g., 71*cm*, regarding at least a certain detail associated with the message, e.g., message 71msg'; and provided that a consensus has been reached regarding said certain detail, each of at least the validation-clusters that are in consensus is configured to independently and redundantly, in respect to the other validation clusters, act on the message in conjunction with the object receiving the message and the respective code component and data state, under a constraint imposed by the certain detail that is now in consensus, thereby assuring that the respective interaction, e.g., each one of hinter, 21 inter, 41 inter, 51inter, 61 inter, 71 inter, has been made coherent across at least the validation clusters in consensus and even under fault conditions affecting some of the validation clusters, thereby also preserving data-state coherence across the network 11inter, 21inter, 41inter, 51inter, 61inter, 71inter of interacting objects 1obj1, 1obj2, 1obj3, 1obj4, 1obj5, 1obj6.

In embodiments, the system further comprises a plurality of distributed computing sub-systems 1*dcss*1, 1*dcss*2, 1*dcss*3, 1*dcss*4, 1*dcss*5, 1*dcss*6 (FIG. 7A), in which each of the distributed computing sub-systems comprises a respective combination of some of the computing nodes 3*cpu* that also belong in at least some of the validation clusters, and in which each of the distributed computing sub-systems constitutes a respective one of the objects 1obj1, 1obj2, 1obj3, 1obj4, 1obj5, 1obj6; each of the code components and data states belonging to a respective one of the objects 1obj1, 1obj2, 1obj3, 1obj4, 1obj5, 1obj6 is redundantly stored across at least some of the computing nodes belonging to the respective distributed computing sub-systems 1obj1, 1obj2, 1obj3, 1obj4, 1obj5, 1obj6; and each of said messages between each one of objects to another of the objects, e.g., message 71msg', are messages passed between the respective distributed computing sub-systems; in which: said action on the message, in conjunction with the object receiving the message and the respective code component and data state, is executed independently and according to the consensus by each of at least some of the computing nodes of the respective distributed computing sub-systems belonging to the respective object receiving the message, thereby assuring intra sub-system coherence regarding any data state changes consequent upon said action.

In embodiments, each of at least some of the computing nodes, e.g., 3*cpu*11, may be a distributed processing element/computer located in a single location within the respective validation cluster, e.g., 2validator1, or distributed across multiple locations within the respective validation cluster. In one embodiment, each of at least some of the computing nodes, e.g., 3*cpu*11, comprises at least two types of processing elements, e.g., a general purpose processor and a separate dedicated purpose processor, in which tasks/microservices/code components that are executed in 3*cpu*11, e.g., in conjunction with the respective distributed sub-system 1*dcss*1 that comprises 3*cpu*11, are executed in the dedicated purpose processor that may contain specialized accelerators operative to increase efficiency of executing the tasks/microservices/code components, but the respective messaging and consensus mechanisms, e.g., 3msg'/4cm and 72msg'/72cm, are executed in the general purpose processor that may be better suited to handle associated inter-node communication. In one embodiment, one general purpose processor in a certain validation cluster, e.g., in 2validator1, may handle messaging and consensus mechanisms of several nodes in that cluster, e.g., of nodes 3cpu11, 3cpu41, and 3cpu61.

Figure 7A:
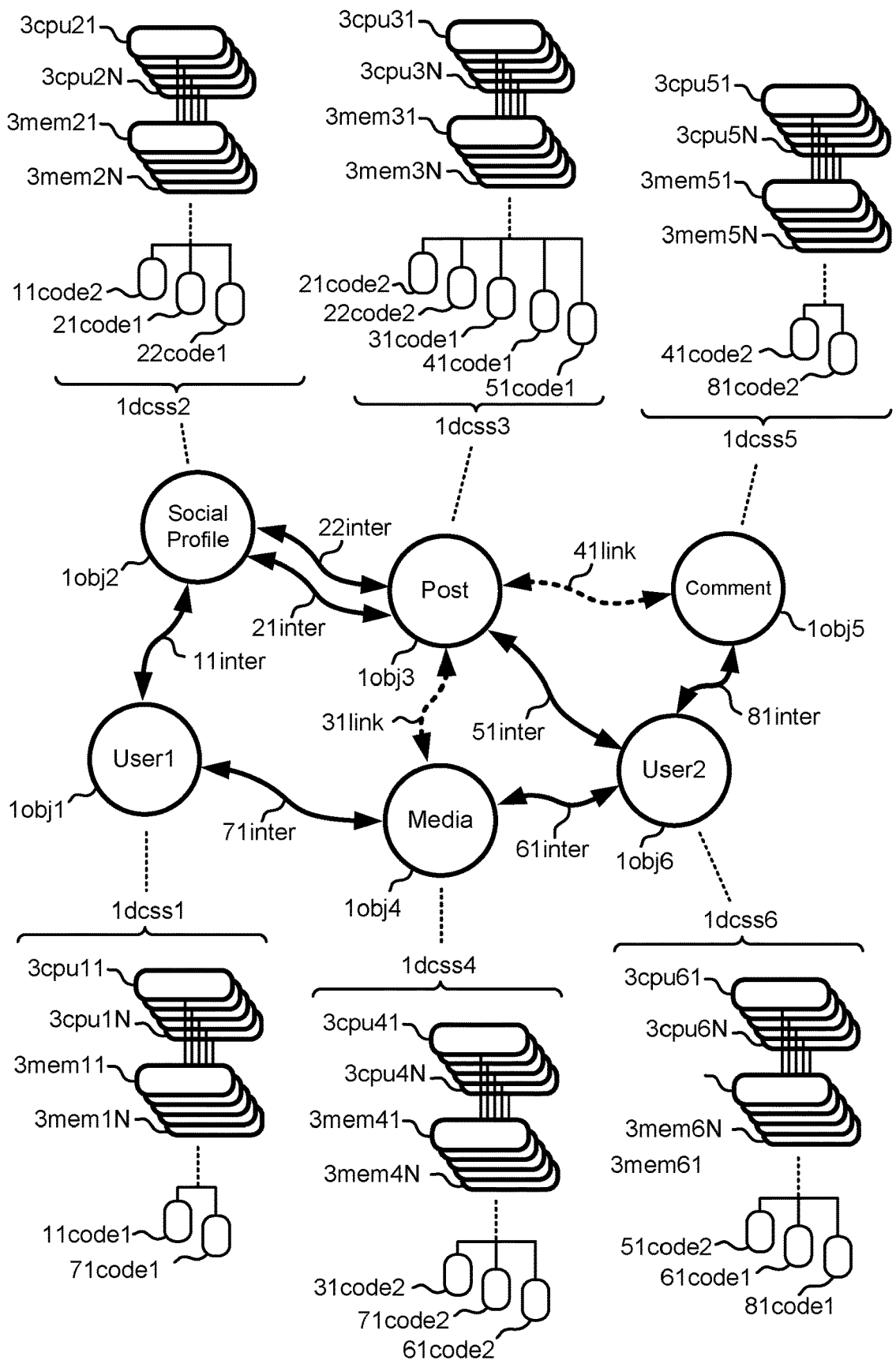
FIG. 7A illustrates a social network implemented in accordance with embodiments using various interacting objects in conjunction with the decentralized consensus-based object-oriented platform having multiple distributed computing sub-systems constituting respectively the different objects of the social network.

FIG. 7A illustrates a social network implemented using various interacting objects 1obj1, 1obj2, 1obj3, 1obj3, 1obj5, 1obj6 in accordance with embodiments in conjunction with the decentralized consensus-based object-oriented platform having multiple distributed computing sub-systems 1dcss1, 1dcss2, 1dcss3, 1dcss4, 1dcss5, 1dcss6 constituting respectively the different objects of the social network.

In accordance with embodiments, distributed computing sub-system 1dcss1 includes multiple validator computing nodes 3cpu11, 3cpu1N associated respectively with multiple storage spaces 3mem11, 3mem1N, in which each of the validator computing nodes 3cpu11, 3cpu1N may belongs to a respective different independent validation cluster 2validaor1, 2validatorN in accordance with some embodiments. Distributed computing sub-system 1dcss1—including code components 71code1 and 11code1 used by each of the respective validator computing nodes 3cpu11, 3cpu1N and all data elements/states stored in the respective storage spaces 3mem11, 3mem1N—constitutes a respective first object 1obj1 that represents/is controlled by/acts on behalf of/is an agent of a first user, e.g., a human being 99entity1, herein referred to as User1.

In embodiments, distributed computing sub-system 1dcss2 includes multiple validator computing nodes 3cpu21, 3cpu2N associated respectively with multiple storage spaces 3mem21, 3mem2N, in which each of the validator computing nodes 3cpu21, 3cpu2N may belongs to a respective different independent validation cluster 2validaor1, 2validatorN in accordance with some embodiments. Distributed computing sub-system 1dcss2—including code components 11code2, 21code1 and 22code1 used by each of the respective validator computing nodes 3cpu21, 3cpu2N and all data elements/states stored in the respective storage spaces 3mem21, 3mem2N—constitutes a respective second object 1obj2 that represents/reflects/acts as a social profile of User1.

In embodiments, distributed computing sub-system 1dcss3 includes multiple validator computing nodes 3cpu31, 3cpu3N associated respectively with multiple storage spaces 3mem31, 3mem3N, in which each of the validator computing nodes 3cpu31, 3cpu3N may belongs to a respective different independent validation cluster 2validaor1, 2validatorN in accordance with some embodiments. Distributed computing sub-system 1dcss3—including code components 21code2, 22code2, 31code1, 41code1 and 51code1 used by each of the respective validator computing nodes 3cpu31, 3cpu3N and all data elements/states stored in the respective storage spaces 3mem31, 3mem3N—constitutes a respective third object 1obj3 that represents/reflects/acts as a post associated with the social profile 1obj2 of User1.

In embodiments, distributed computing sub-system 1dcss4 includes multiple validator computing nodes 3cpu41, 3cpu4N associated respectively with multiple storage spaces 3mem41, 3mem4N, in which each of the validator computing nodes 3cpu41, 3cpu4N may belongs to a respective different independent validation cluster 2validaor1, 2validatorN in accordance with some embodiments. Distributed computing sub-system 1dcss4—including code components 31code2, 71code2 and 61code2 used by each of the respective validator computing nodes 3cpu41, 3cpu4N and all data elements/states stored in the respective storage spaces 3mem41, 3mem4N—constitutes a respective fourth object 1obj4 that acts as a storage object for a media file associated with the post 1obj3.

In embodiments, distributed computing sub-system 1dcss5 includes multiple validator computing nodes 3cpu51, 3cpu5N associated respectively with multiple storage spaces 3mem51, 3mem5N, in which each of the validator computing nodes 3cpu51, 3cpu5N may belongs to a respective different independent validation cluster 2validaor1, 2validatorN in accordance with some embodiments. Distributed computing sub-system 1dcss5—including code components 41code2 and 81code2 used by each of the respective validator computing nodes 3cpu51, 3cpu5N and all data elements/states stored in the respective storage spaces 3mem51, 3mem5N—constitutes a respective fifth object 1obj5 that acts as a storage object for a comment made by a second user regarding the post 1obj3.

In embodiments, distributed computing sub-system 1dcss6 includes multiple validator computing nodes 3cpu61, 3cpu6N associated respectively with multiple storage spaces 3mem61, 3mem6N, in which each of the validator computing nodes 3cpu61, 3cpu6N may belongs to a respective different independent validation cluster 2validaor1, 2validatorN in accordance with some embodiments. Distributed computing sub-system 1dcss6—including code components 51code2, 61code1 and 81code1 used by each of the respective validator computing nodes 3cpu61, 3cpu6N and all data elements/states stored in the respective storage spaces 3mem61, 3mem6N—constitutes a respective sixth object 1obj6 that represents/is controlled by/acts on behalf of/is an agent of the second user herein referred to as User2.

In embodiments, object 1obj1, which represents the first user, creates the new object 1obj2 in accordance with some embodiments, in which the new object 1obj2 represents a social profile of the first user. The first user then, using 1obj1, appends 1obj2 with social information via interface 11inter, e.g., adds a profile name, a list of favorites, a description of who is permitted to view the social profile, etc., in which said additions are facilitated at least by using data write operations between 1obj1 and 1obj2, in accordance with some embodiments. In one embodiment, the first user, using 1obj1, instructs 1obj2, via 11inter and co-associated code components 11code1 and 11code2, to create a new post 1obj3 and delivers, via 11inter, to 1obj2, text associated with the post. Code components 11code1 and 11code2, which are co-associated, are used by 1obj1 and 1obj2 respectively to facilitate interface 11inter and related actions. Interface 11inter, in conjunction with 1obj1 and 1obj2, includes respective distributed messaging and consensus mechanisms in accordance with some embodiments.

In embodiments, object 1obj2, which is the social profile of the first user, creates a new post object 1obj3, in accordance with some embodiments and as instructed by 1obj1. 1obj2 then transfers the text, that was obtained from 1obj1 and that is associated with the post, to 1obj3 via interface 21inter and co-associated code components 21code1, 21code2. Interface 21inter, in conjunction with 1obj2 and 1obj3, includes respective distributed messaging and consensus mechanisms in accordance with some embodiments.

In embodiments, 1obj1 then creates, in accordance with some embodiments, a new object 1obj4, which is a media object that is about to store a media file such as a video clip, to be associated with the post 1obj3. 1obj1 then transfers the video clip associated with the post to 1obj4 via 71inter and co-associated code components 71code1 and 71code2, in accordance with some embodiments related to data append operations. Interface 71inter, in conjunction with 1obj1 and 1obj4, includes respective distributed messaging and consensus mechanisms in accordance with some embodiments. 1obj1 may then instructs 1obj2 via 11inter to instruct 1obj3 via 21inter to link itself 31link to the media object 1obj4, thereby associating the media file with post 1obj3, in which such linking may include embedding a pointer in 1obj3 that points to 1obj4 using co-associated code components 31code1 and 31code2, and in which said chain of instructions and linking 31link may be achieved in accordance with some embodiments and in conjunction with a chain of inter-cluster microservice activation events facilitated by respective distributed messaging and consensus mechanisms.

In embodiments, object 1obj6, which represents a second user herein referred to as User2, reads the post 1obj3 via interface 51inter and co-associated code components 51code1 and 51code2, in accordance with some embodiments related to reading data from an object, and gets a link/pointer, via 51inter, to 1obj4. 1obj6 associated with the second user, or the second user itself User2, then streams/downloads the video clip segment-by-segment from 1obj4 via 61inter and associated code components 61code1 and 61code2, in accordance with some embodiments associated with reading media files from an object. Interfaces 51inter, 61inter in conjunction with 1obj3, 1obj4, 1obj6 include respective distributed messaging and consensus mechanisms in accordance with some embodiments.

In embodiments, 1obj6, which represents User2, creates a new object 1obj5, in accordance with some embodiments, in which 1obj5 is about to store a comment to the post 1obj3 and video clip 1obj4, and in which the comment 1obj5 is to be associated with the post 1obj3. 1obj6 then sends the comment to 1obj5 via interface 81inter and co-associated code components 81code1 and 81code2. 1obj6 then asks 1obj3 to link itself 41link to the media comment 1obj5, in which such linking is facilitated by co-associated code components 41code1 and 41code2. The Interface and link 81inter, 41link in conjunction with objects 1obj3, 1obj5, 1obj6 include respective distributed messaging and consensus mechanisms in accordance with some embodiments. The post 1obj3 may also communicate 22inter, 22code1, 22code2 with the social profile 1obj2 regarding current status of the post and/or regarding other related updates.

It is noted that the above-mentioned embodiments, while referring to the creation of a new object, may be adapted to modify, delete and otherwise affect existing objects.

It is noted that the above-mentioned social network implemented using various interacting objects 1obj1, 1obj2, 1obj3, 1obj3, 1obj5, 1obj6 is presented by way of example, and that a social network can be implemented in a similar fashion or in other ways using millions of different objects representing a very large number of different users, posts, comments, media files, images, and other objects related to social networks. The resulting social network is decentralized-yet-coherent, may support immutability/persistency in conjunction with associated data elements and states, fault tolerant/BFT and parallel in nature-all in accordance with some embodiments.

Figure 7B:
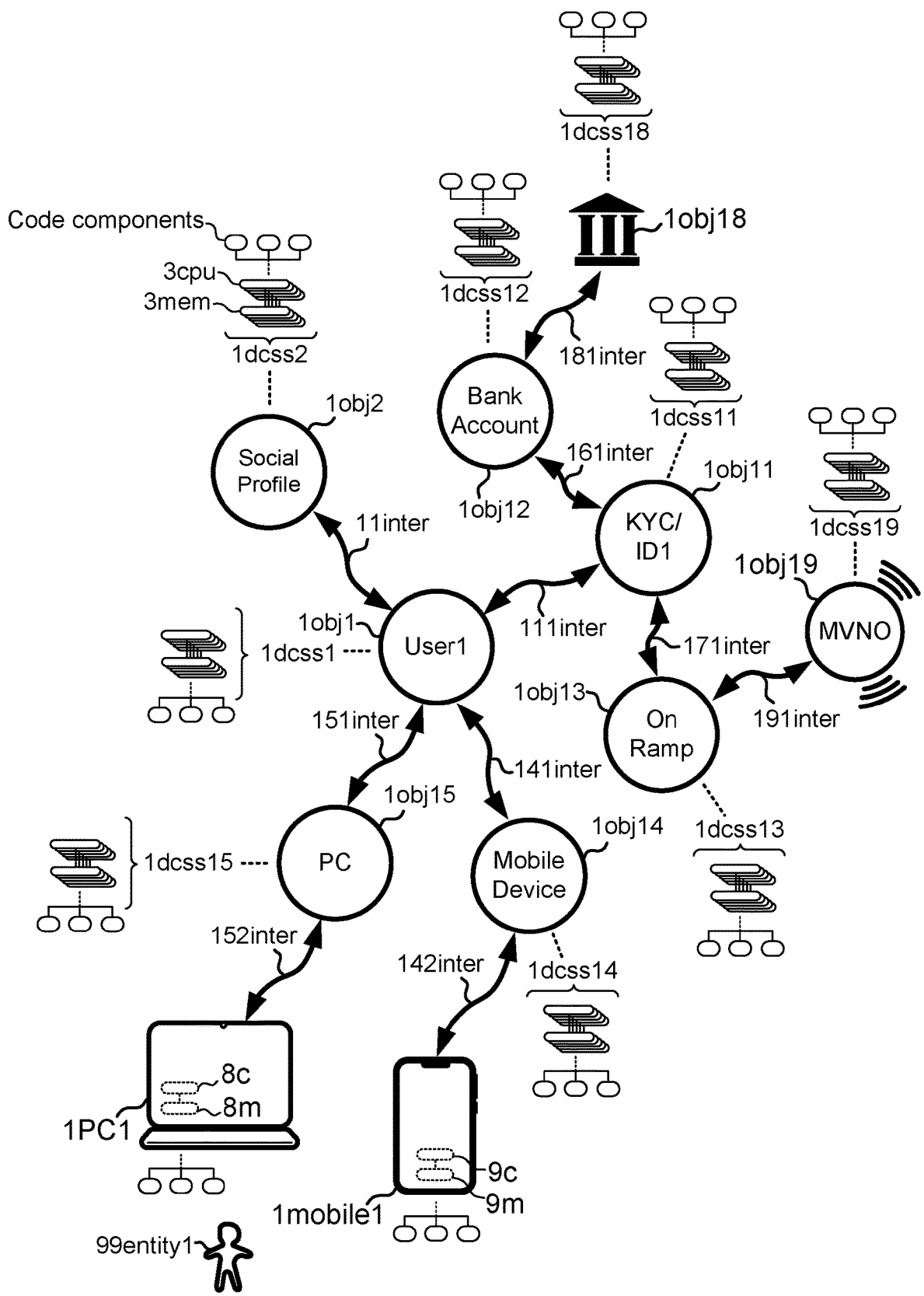
FIG. 7B illustrates an object-based ecosystem supporting a certain user object in accordance with embodiments in conjunction with the decentralized consensus-based object-oriented platform having multiple distributed computing sub-systems constituting respectively the different objects of the ecosystem.

FIG. 7B illustrates of an object-based ecosystem supporting a certain user object 1obj1in accordance with embodiments in conjunction with the decentralized consensus-based object-oriented platform having multiple distributed computing sub-systems 1dcss1, 1dcss2, 1dcss11, 1dcss12, 1dcss13, 1dcss14, 1dcss15, 1dcss18, 1dcss19 constituting respectively the different objects of the ecosystem 1obj1, 1obj2, 1obj11, 1obj12, 1obj13, 1obj14, 1obj15, 1obj18, 1obj19 in accordance with some embodiments. Each of the Interfaces 11inter, 152inter, 142inter, 151inter, 141inter, 111inter, 171inter, 191inter and 181inter is used to transport messages between validator computing nodes of a respective two of the objects in conjunction with a respective consensus mechanism and in accordance with some embodiments.

In embodiments, computing devices, such as a personal computer 1PC1 and a smartphone 1mobile1, are employed by a first user 99entity1 to interact 152inter, 142inter with the object-based ecosystem. In one embodiment, each of the computing devices 1PC1, 1mobile1 is associated with a respective object 1obj15, 1obj14 that mirrors/represents/is controlled by/acts on behalf of/is an agent of the computing device. For example, 1obj15, which is implemented using a respective distributed computing sub-system 1dcss15 including multiple validator computing nodes and storage spaces in accordance with some embodiments, may store in a decentralized/redundant/coherent fashion, in accordance with some embodiments, at least certain data elements and code components associated with 1PC1, thereby acting as an abstraction layer/intermediary of 1PC1 that is able, among other capabilities, to restore a data state of 1PC1, or to the migrate the data state of 1PC1 to another personal computer associated with 99entity1 in a case of a terminal failure in 1PC1. In a similar fashion, 1obj14, which is implemented using a respective distributed computing sub-system 1dcss14 including multiple validator computing nodes and storage spaces in accordance with some embodiments, may act as an abstraction layer/intermediary of 1mobile1. In one embodiment, any interaction 152inter of 1PC1 with 1obj15 includes sending, by a local processor $8c$ associated with a local memory $8m$, multiple procedure calls to the multiple nodes of 1dcss15 that consequently execute a respective consensus mechanism in accordance with some embodiments. In a similar fashion, any interaction 142inter of 1mobile1 with 1obj14 includes sending, by a local processor $9c$ associated with a local memory $9m$, multiple procedure calls to the multiple nodes of 1dcss14 that consequently execute a respective consensus mechanism in accordance with some embodiments. In one embodiment, each of the objects 1obj15, 1obj14 acts as an immutable representation/record of the respective computing device 1PC1, 1mobile1 and associated states/data elements in accordance with some embodiments. In one embodiment, 1obj15 and 1obj14 are subordinate to 1PC1 and 1mobile1 in conjunction with a private key/cryptographic signature of 99entity1, and other objects, such as 1obj1 that represents the user itself 99entity1, is subordinate to 1obj15 and 1obj14 by association to unique IDs/addresses of 1obj15 and 1obj14 in accordance with some embodiments and in conjunction with respective consensus mechanisms. In one embodiment, a message transported over 152inter to 1obj15 is followed-up/mirrored by a message transported over 151inter to 1obj1, and a message transported over 142inter to 1obj14 is followed-up/mirrored by a message transported over 141inter to 1obj1, in accordance with some embodiments related to chains of inter-cluster microservice activation events.

In accordance with embodiments, a mobile network operator (MNO) or a mobile virtual network operator (MVNO), which is represented by 1obj19/1dcss19, controls 191inter an on-ramp object 1obj13/1dcss13 in charge of onboarding new customers, such as user 99entity1 represented by 1obj1, onto the MVNO's network. In one embodiment, perhaps during and/or after on-ramping user 99entity1 onto MVNO 1obj19 in conjunction with 1mobile1 having a specific SIM card issued by 1obj13, on-ramp 1obj13 creates and controls 171inter, on behalf of MVNO 1obj19, a new "know-your-customer" object 1obj11/dcss11 intended specifically to identify and describe user 99entity1 in a way that can be checked and/or demonstrated to be true. For example, on-ramp 1obj13 may initiate a cellular communication session with 1mobile1 via the specific SIM card that is already associated with user 99entity1, during which the user 99entity1 is authenticated by 1obj13 as actually being user 99entity1, and then given a unique permission/access 111inter, via 1obj1, to use 1obj11 as a "formal ID of 99entity1 issued and authenticated by the MVNO".

In accordance with embodiments, after a formal identification 1obj11 of user 99entity1 was established by the MVNO 1obj19, the user may want to exploit the formal identification 1obj11 for, e.g., opening a bank account in conjunction with a certain bank represented by object 1obj18/1dcss18. Therefore, user 99entity1 may instruct 1obj11—e.g., via 1mobile1, 142inter, 1obj14, 141 inter, 1obj1 and 111inter—to send 1obj18 a request to open a new bank account. Since the request arrives at 1obj18 via the identity object 1obj11, the bank 1obj18 already knows that 1obj11 is an authentic identity of user 99entity as verified by 1obj19, and so the bank 1obj18 has no problem creating a new bank account 10bj12/1dcss12 specifically for user 99entity1 to directly access/control 161inter via 1obj11, which is controlled 111inter via 1obj1. In one embodiment, the bank account 10bj12 can be used by user 99entity1 to transfer/receive cryptocurrency to/from other accounts/objects in accordance with some embodiments, in which said cryptocurrency transferred/received may be associated with stablecoins that represent financial obligation denominated in "fiat" currencies. In one embodiment, the bank account 10bj12 may be used to mirror a traditional bank account of user 99entity1 that is managed outside the object-based ecosystem by the bank. In one embodiment, the bank account 10bj12 may be the main record used by the bank 1obj18 to keep account of/manage the funds of user 99entity1, in which 1obj18 and associated states are distributed, fault resistant and immutable in accordance with some embodiments.

In accordance with embodiments, the bank 1obj18 and MVNO 1obj19 may access the social profile 1obj2 of user 99entity1 in order to get better acquainted using social information from 1obj2 complementing formal information from 1obj11.

Figure 7C:
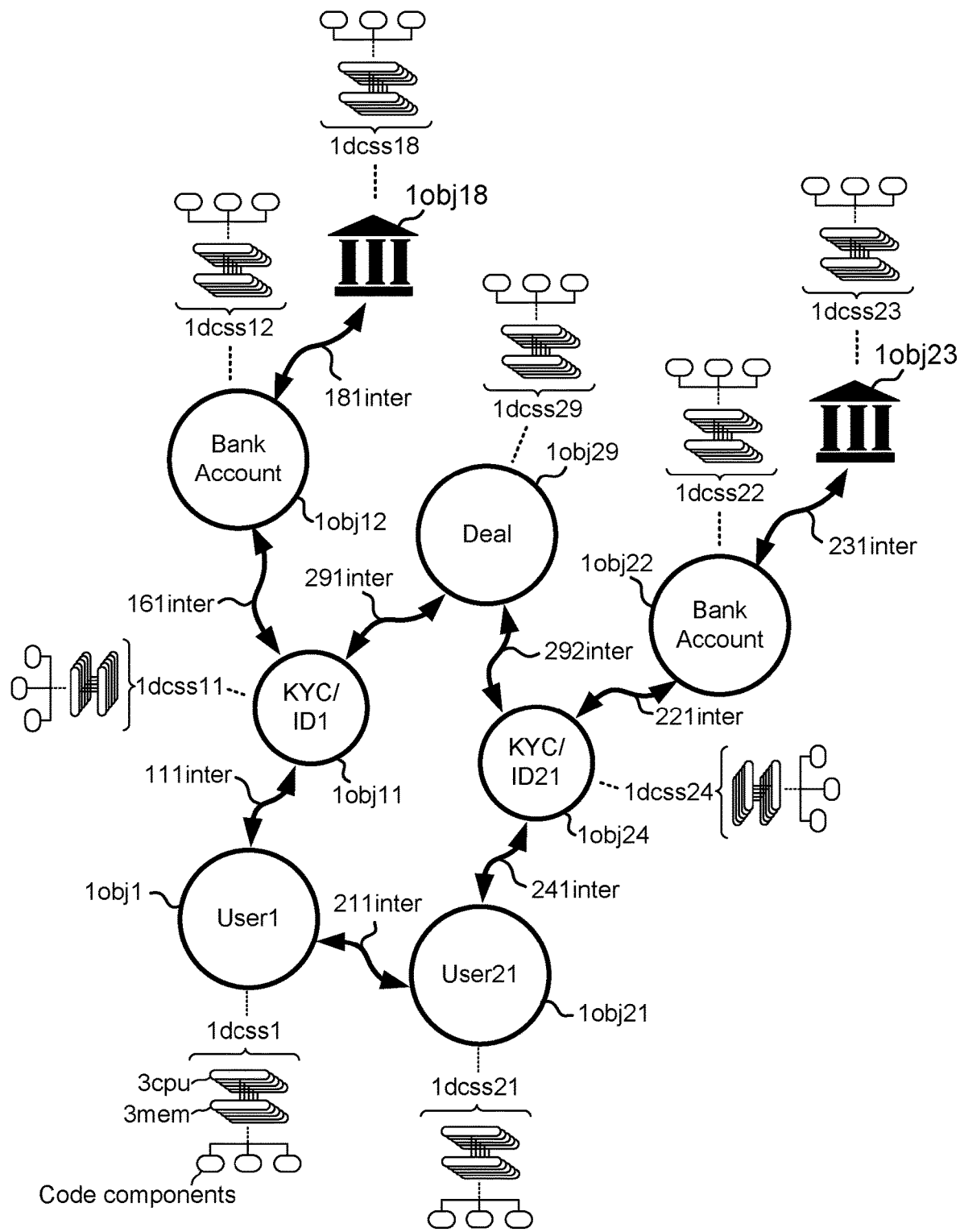
FIG. 7C illustrates interrelated objects interacting with each other in the context of executing a deal between two objects representing respectively two users in accordance with embodiments and in conjunction with the decentralized consensus-based object-oriented platform having multiple distributed computing sub-systems constituting respectively the different interrelated objects.

FIG. 7C illustrates interrelated objects 1obj1, 1obj11, 1obj12, 1obj18, 1obj21, 1obj22, 1obj23, 1obj24, 1obj29 interacting with each other in the context of executing a deal 1obj29 between two objects 1obj1, 1obj21 representing respectively two users in accordance with embodiments and in conjunction with the decentralized consensus-based object-oriented platform having multiple distributed computing sub-systems 1dcss1, 1dcss11, 1dcss12, 1dcss18, 1dcss21, 1dcss22, 1dcss23, 1dcss24, 1dcss29 constituting respectively the different interrelated objects, in accordance with some embodiments. Each of the Interfaces 111inter, 161inter, 181inter, 211inter, 231inter, 221inter, 241inter, 291inter, 292inter is used to transport messages between validator computing nodes of a respective two of the objects in conjunction with a respective consensus mechanism and in accordance with some embodiments.

In embodiments, a first user, represented by object 1obj1/1dcss1, interacts 211inter with a second user, represented by object 1obj21/1dcss21, for the purpose of negotiating a certain deal/contract. After successful negotiation 211inter of the deal/contract between the parties 1obj1, 1obj21, a new contract object 1obj29/1dcss29 is created, in which the terms/conditions of the deal/contract are embedded in the contract object 1obj29. In one embodiment, and in order for the contract object 1obj29 to become "active", an identity object 1obj11 of the first user 1obj1, which controls a bank account 1obj12 of the first user, has to give the contract object 1obj29 an irrevocable one-time permission to send a future command 291inter ordering the identity object 1obj11 to access the bank account 1obj12 in conjunction with future execution of the deal/contract, and an identity object 1obj24 of the second user 1obj21, which controls a bank account 1obj22 of the second user, has to give the contract object 1obj29 an irrevocable one-time permission to send a future command 292inter ordering the identity object 1obj24 to access the bank account 1obj22 in conjunction with future execution of the deal/contract.

In embodiments, after the contract object 1obj29 was activated/given an irrevocable one-time permissions to tap into the bank accounts 1obj12, 1obj22 of the involved parties 1obj1, 1obj21, and after the contract object 1obj29 has come to a conclusion that the terms/conditions of the deal/contract have been met, the contract object 1obj29 executes the deal/contract in conjunction with the bank accounts 1obj12, 1obj22. For example, the deal 1obj29 may simply state that the first user 1obj1 is to buy a certain amount of cryptocurrency from user 1obj21 and pay for it using stablecoin, and in that case, upon activation of the contract object 1obj29, the contract object uses its irrevocable one-time permissions to: (i) order 291inter identity object 1obj11 to order bank account 1obj12 to transfer into bank account 1obj22 an amount of stablecoin in accordance with the terms of the deal, and (ii) order 292inter identity object 1obj24 to order bank account 1obj22 to transfer into bank account 1obj12 the certain amount of cryptocurrency in accordance with the terms of the deal. It is note that the action between the parties 1obj1, 1obj21 is enforced automatically by the contract object 1obj29, which may constitute a smart contract.

In embodiments, after execution of the smart contract 1obj29 between the involved parties 1obj1, 1obj21, the respective banks 1obj18/1dcss18, 1obj23/1dcss23 may follow-up by co-interacting, e.g., by transferring an amount of "fiat" currency from 1obj18 to 1obj23 that corresponds to the transfer of stablecoin from 1obj12 to 1obj22.

In this description, numerous specific details are set forth. However, the embodiments/cases described herein may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case described herein. Moreover, separate references to "an exemplary embodiment", "embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the embodiments may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases.

Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

As referred to in the present disclosure, the various computing nodes described herein may include some aspects of a computer.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

As used herein, a consensus mechanism may be in the form of a consensus scheme or consensus protocol executed by processors. By way of example, such consensus protocols may include, but are not limited to, Proof-of-Work (PoW) protocols, Proof-of-Stake (PoS) protocols, Delegated Proof of Stake (DPoS) protocols, Proof of Importance (PoI), Proof of Importance (PoI), Proof of Capacity (PoC), Proof Elapsed Time (PoET), Proof of Activity (PoA), Proof of Burn (PoB), and Byzantine Fault Tolerance (BFT). For example, Bitcoin uses a proof-of-work scheme.

As used herein, the use of the term "data storage spaces" refers to storage including computer readable memory (also referred to as 'memory'). For example, data storage space 3mem1N may be and/or include computer readable memory, used to store data as described in the disclosure. Memory may be embodied by suitable hardware, including but not limited to the following: hard disk drives, serial advanced technology attachment (SATA) hard drives, SATA solid state drives (SSDs), non-volatile memory express (NVMe) SSDs, tape drives.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

We claim:

1. A resilient microservice system, comprising:
a plurality of microservice computing nodes;
a first distributed computing sub-system comprising a respective combination of at least some of the microservice computing nodes; and
a second distributed computing sub-system, comprising a respective different combination of at least some of the microservice computing nodes;
wherein as a result of at least some procedure calls all conveying a same first message that were just made available in the first distributed computing sub-system, each of at least some of the nodes in the first distributed computing sub-system is configured to:
execute, in conjunction with at least some of the other nodes of the first distributed computing sub-system, a consensus mechanism associated with the first message;
process the first message; and
provided that an agreement has been reached in conjunction with said consensus mechanism, send a remote procedure call (RPC) conveying a second message, which is consequent on said processing, to at least one of the nodes of the second distributed computing sub-system;
so as to result in the second distributed computing sub-system receiving at least some of the RPCs conveying the same second message.

2. The system of claim 1, wherein:
as a result of at least some of the RPCs conveying the same second message that have just arrived in the second distributed computing sub-system, each of at least some of the nodes in the second distributed computing sub-system is configured to:
execute, in conjunction with at least some of the other nodes of the second distributed computing sub-system, a consensus mechanism associated with the second message;
process the second message; and
provided that an agreement has been reached in conjunction with said consensus mechanism and the second message, send an RPC conveying a third message, which is consequent on said processing of the second message, to at least one of the nodes of a third distributed computing sub-system;
so as to result in the third distributed computing sub-system receiving at least some of the RPCs conveying the same third message.

3. The system of claim 2, wherein:
the microservice computing nodes of the first distributed computing sub-system are associated respectively with data storage spaces, in which each of the data storage spaces is configured to store a same executable code operative to execute a same first microservice task;
said procedure-calls conveying the first message are remote-procedure calls (RPCs) received in the first distributed computing sub-system and associated with activation of the first microservice task; and
said processing of the first message, by each of at least some of the nodes in the first distributed computing sub-system, comprises executing the respective executable code in the respective data storage space, thereby performing the same first microservice task at least several times respectively by several of the nodes in the first distributed computing sub-system as a reaction to said RPCs conveying the first message.

4. The system of claim 3, wherein:
the microservice computing nodes of the second distributed computing sub-system are associated respectively with data storage spaces, in which each of the data storage spaces of the second distributed computing sub-system is configured to store a same executable code operative to execute a same second microservice task;
said RPCs conveying the second message are associated with activation of the second microservice task; and said processing of the second message, by each of at least some of the nodes in the second distributed computing sub-system, comprises executing the respective executable code of the second microservice task in the respective data storage space, thereby performing the same second microservice task at least several times respectively by several of the nodes in the second distributed computing sub-system as a reaction to said RPCs conveying the second message;

in which the first and second microservice tasks are designed to run in a sequence, and in conjunction with said consensuses in the first and second distributed computing sub-system, thereby achieving at least an initial execution of a single operation that comprises at least the first and second microservice tasks.

5. The system of claim 4, wherein said (i) consensus mechanisms and agreements in the first and second distributed computing sub-system, in conjunction with (ii) said execution of the first and second microservice tasks multiple times respectively by the nodes of first and second distributed computing sub-systems, and further in conjunction with (iii) said multiple RPCs associated with the first and second messages, are together operative to assure fault tolerance in face of failure/s occurring in some of the nodes, thereby assuring resiliency in conjunction with said at least an initial execution of the single operation that comprises at least the first and second microservice tasks.

6. The system of claim 5, wherein said fault tolerance is a byzantine-fault-tolerance (BFT), in which some of the nodes operate maliciously against proper operation of the microservice system.

7. The system of claim 4, wherein:

said agreement reached in the first distributed computing sub-system is an agreement to perform the first microservice task as identified in the RPCs conveying the first message; and said agreement reached in the second distributed computing sub-system is an agreement to perform the second microservice task as identified in the RPCs conveying the second messages.

8. The system of claim 4, wherein:

said agreement reached in the first distributed computing sub-system is an agreement regarding an order in which the RPCs conveying the first message have been received in the first distributed computing sub-system relative to other messages received in the first distributed computing sub-system; and said agreement reached in the second distributed computing sub-system is an agreement regarding an order in which the RPCs conveying the second message have been received in the second distributed computing sub-system relative to other messages received in the second distributed computing sub-system.

9. The system of claim 4, wherein said agreement reached in the first distributed computing sub-system is an agreement regarding an authority of an entity, that has generated the first message, to do so.

10. The system of claim 4, wherein said agreement reached in the first distributed computing sub-system is an agreement regarding a result of said processing of the first message, and consequently an agreement regarding a content conveyed in the second message.

11. The system of claim 1, wherein:

at least some of the microservice computing nodes of the first distributed computing sub-system are further configured to send, in conjunction with said second message, a proof that said agreement has actually been reached; and as a result of at least some of the RPCs conveying the same second message that have just arrived in the second distributed computing sub-system, each of at least some of the nodes in the second distributed computing sub-system is configured to process the second message provided at least that said proof is present in conjunction with said second message.

12. The system of claim 1, wherein:

said consensus mechanism is associated with a byzantine-fault-tolerance (BFT) consensus mechanism, in which as part of reaching said agreement, said at least some of the nodes in the first distributed computing sub-system are configured to participate in an iterative multi-phase process comprising:

a first phase, in which said nodes are configured to communicate among themselves at least a certain suggested detail related to the first message;

a second phase, in which said nodes are configured to concur regarding said certain suggested detail, by further communicating among themselves; and a third phase, in which said nodes are configured to commit, by still further communicating among themselves, about said concurring regarding said certain suggested detail.

13. The system of claim 12, wherein said certain suggested detail is a certain suggested order in which the first message should be processed relative to other incoming messages.

14. The system of claim 1, wherein:

said consensus mechanism is associated with a practical-byzantine-fault-tolerance (PBFT) consensus mechanism, in which as part of reaching said agreement, said at least some of the nodes in the first distributed computing sub-system are configured to participate in an iterative multi-phase process comprising:

a pre-prepare phase, in which said nodes are configured to communicate among themselves at least a certain suggested detail related to the first message;

a prepare phase, in which said nodes are configured to concur regarding said certain suggested detail, by further communicating among themselves; and a commit phase, in which said nodes are configured to concur, by still further communicating among themselves, regarding a content of the second message that is consequent on said certain suggested detail.

15. The system of claim 14, wherein said certain suggested detail is a certain suggested order in which the first message should be processed relative to other incoming messages.

16. The system of claim 1, wherein:

as a result of at least some of the RPCs conveying the same second message that have just arrived in the second distributed computing sub-system, each of at least some of the nodes in the second distributed computing sub-system is configured to:

execute, in conjunction with at least some of the other nodes of the second distributed computing sub-system, a consensus mechanism associated with the second message;

process the second message; and provided that an agreement has been reached in conjunction with said consensus mechanism and the second message, send back a response conveying a third message, which is consequent on said processing of the second message, to at least one of the nodes of a first distributed computing sub-system;

so as to result in the first distributed computing sub-system receiving back at least some of the responses conveying the same third message.

17. The system of claim 16, wherein:

as a result of at least some of the responses conveying the same third message that have just arrived in the first distributed computing sub-system, each of at least some of the nodes in the first distributed computing sub-system is configured to:
   execute, in conjunction with at least some of the other nodes of the first distributed computing sub-system, a consensus mechanism associated with the third message;
   process the third message as being a response to the second message; and
   provided that an agreement has been reached in conjunction with said consensus mechanism and the third message, use a result of said processing of the third message for further processing.

18. The system of claim 1, wherein:

each of the microservice computing nodes of the first distributed computing sub-system is located in a different data center than other microservice computing nodes of the first distributed computing sub-system;

each of the microservice computing nodes of the second distributed computing sub-system is located in a different data center than other microservice computing nodes of the second distributed computing sub-system;

said agreement reached, in conjunction with the consensus mechanism, has been reached in conjunction with inter-data center communication between the different microservice computing nodes of the first distributed computing sub-system, in which such inter-data center communication is facilitated using the Internet and/or dedicated communication links; and said agreement has been reached even under detrimental conditions affecting some of the data centers and/or the Internet and/or the dedicated communication links.

19. The system of claim 18, wherein:

each of at least some of the microservice computing nodes of the first distributed computing sub-system is co-located, together with at least a respective one of the microservice computing nodes of the second distributed computing sub-system, in the same data center; and said RPCs conveyed between the first distributed computing sub-system and the second distributed computing sub-system are intra-data center RPCs, in which such intra-data center RPCs are facilitated using data networks internal to the data centers.

20. The system of claim 18, wherein:

each of at least some of the microservice computing nodes of the first distributed computing sub-system, together with at least a respective one of the microservice computing nodes of the second distributed computing sub-system, constitute a part of a same validation cluster; and each of at least some of the validation clusters belongs to a respective ownership entity, in which each of the ownership entities is configured to participate in a proof of stake (PoS) mechanism, in which said PoS mechanism comprises each of the respective ownership entities putting down a stake that is collected by the system in conjunction with events in which nodes controlled by specific ownership entity misalign with the agreement reached in conjunction with the consensus mechanism and/or with other agreed behavior of the nodes, thereby acting as a penalty mechanism.

21. The system of claim 1, wherein:

one of the microservice computing nodes of the first distributed computing sub-system is designated a lead node after providing a respective stake in conjunction with a proof of stake (PoS) mechanism; and as part of said consensus mechanism, each of the other microservice computing nodes of the first distributed computing sub-system is configured to obtain, from the lead node, an indication confirming and/or informing which verifiable assumptions associated with the first message are to be agreed upon in conjunction with the consensus mechanism.

22. The system of claim 21, wherein:

the lead node, contrary to the other nodes of the first distributed computing sub-system, is configured to go ahead with said sending of the respective RPCs before reaching said agreement, thereby providing a fast hint regarding a probable content of the second message.

23. The system of claim 1, wherein:

said first message is associated with an action request;

said first distributed computing sub-system is associated with a first entity affected by the action request;

said second distributed computing sub-system is associated with a second entity affected by the action request;

the microservice computing nodes are validator computing nodes;

said processing is associated with a change of a state to reflect an initial effect of executing the action as perceived by the first entity; and said second message is a message from the first entity to the second entity triggering the second entity to change a local state to reflect a further effect of executing the action as perceived by the second entity.

24. The system of claim 1, wherein:

said first message is associated with a request made by a user of the first distributed computing sub-system;

said processing is associated with serving said request; and said second message is at least one consequent of said serving of the request.

25. The system of claim 1, wherein:

said respective combination of the microservice computing nodes of the first distributed computing sub-system, comprises a combination of at least 5 (five) of the microservice computing nodes;

said respective combination of the microservice computing nodes of the second distributed computing sub-system, comprises a combination of at least 5 (five) different ones of the microservice computing nodes;

said agreement, among the microservice computing nodes of the first distributed computing sub-system, is a consensus of the microservice computing nodes of the first distributed computing sub-system;

and therefore, the second message, that has been sent multiple times via RPCs, had done so even under detrimental conditions comprising at least one of: (i) malfunction of one or more of the microservice computing nodes, (ii) a malicious attack on one or more of the microservice computing nodes, (iii) a communication outage affecting one or more of the microservice computing nodes, and/or (iv) a malicious behavior of one or more of the microservice computing nodes that is facilitated by an entity having access to the computing node and having a malicious intent.

26. The system of claim 25, wherein:
- said respective combination of the microservice computing nodes of the first distributed computing sub-system, comprises a combination of at least 100 (one hundred) of the microservice computing nodes;
- said respective combination of the microservice computing nodes of the second distributed computing sub-system, comprises a combination of at least 100 (one hundred) different ones of the microservice computing nodes;
- said agreement, among the microservice computing nodes of the first distributed computing sub-system, is a majority consensus of at least 51 (fifty one) of the microservice computing nodes of the first distributed computing sub-system;
- and therefore, the second message, that has been sent multiple times via RPCs, had done so even under extreme malicious conditions comprising a distributed denial of service attack on the sub-systems.

27. The system of claim 25, wherein:
- each of the microservice computing nodes of the first distributed computing sub-system is located in a different geographical region than other microservice computing nodes of the first distributed computing sub-system;
- each of the microservice computing nodes of the second distributed computing sub-system is located in a different geographical region than other microservice computing nodes of the second distributed computing sub-system;
- and therefore, the second message, that has been sent multiple times via RPCs, had done so even under extreme detrimental conditions comprising at least one of: (i) a natural catastrophic event such as floods and fire and/or (ii) global war events, affecting one or more of the geographical locations.

\* \* \* \* \*